(12) United States Patent
Colvin et al.

(10) Patent No.: US 9,224,303 B2
(45) Date of Patent: Dec. 29, 2015

(54) COMPUTER BASED SYSTEM FOR TRAINING WORKERS

(75) Inventors: Richard Thurston Colvin, Pittsburgh, PA (US); William Russell Ball, Pittsburgh, PA (US); Jennifer Lynn Gauvin, Pittsburgh, PA (US); Benjamin Joseph Smith, Pittsburgh, PA (US); Nathaniel Thomas Smith, Pittsburgh, PA (US); Thomas Roy Smith, II, Pittsburgh, PA (US)

(73) Assignee: SILVERTREE MEDIA, LLC, Pittsburgh, PA (US)

( * ) Notice: Subject to any disclaimer, the term of this patent is extended or adjusted under 35 U.S.C. 154(b) by 2387 days.

(21) Appl. No.: 11/653,090

(22) Filed: Jan. 11, 2007

(65) Prior Publication Data

US 2007/0238085 A1    Oct. 11, 2007

Related U.S. Application Data

(60) Provisional application No. 60/816,394, filed on Jun. 23, 2006, provisional application No. 60/797,888, filed on May 6, 2006, provisional application No. 60/758,806, filed on Jan. 13, 2006.

(51) Int. Cl.
*G09B 19/00* (2006.01)
*G09B 5/00* (2006.01)

(52) U.S. Cl.
CPC . *G09B 5/00* (2013.01); *G09B 19/00* (2013.01)

(58) Field of Classification Search
CPC .............. G09B 7/00; G09B 7/04; G09B 5/02; G09B 19/00

USPC ........................... 434/219, 262, 365; 715/836
See application file for complete search history.

(56) References Cited

U.S. PATENT DOCUMENTS

| | | | |
|---|---|---|---|
| 3,916,444 A | 10/1975 | Alliston et al. |
| 4,100,571 A | 7/1978 | Dykes et al. |
| 4,107,780 A | 8/1978 | Grimsdale et al. |
| 4,182,053 A | 1/1980 | Allen et al. |
| 4,360,345 A | 11/1982 | Hon |
| 4,582,491 A | 4/1986 | Monteith et al. |
| 4,604,718 A | 8/1986 | Norman et al. |
| 4,940,234 A | 7/1990 | Ishida et al. |
| 4,965,753 A | 10/1990 | Kraemer |
| 5,015,189 A | 5/1991 | Wenzinger |
| 5,137,450 A | 8/1992 | Thomas |
| 5,224,861 A | 7/1993 | Glass et al. |

(Continued)

OTHER PUBLICATIONS

Steve Silberman, "The War Room", Wired Issue 12.09, URL: http://www.wired.com/wired/archive/12.09/warroom.html (3 pages) Sep. 2004.

(Continued)

*Primary Examiner* — Peter Egloff
(74) *Attorney, Agent, or Firm* — George S. Blasiak, Esq.; Heslin Rothenberg Farley & Mesiti P.C.

(57) ABSTRACT

A computer based system having one or more computers is provided. In one embodiment, the system comprises a plurality of trainee client computers. The system can include at least one controlled digital character and a non-trainee digital entity, a plurality of models, and a rendering module for rendering the models on a display. The system is usable in training workforce teams and in a wide variety of additional applications.

54 Claims, 31 Drawing Sheets

(56) References Cited

U.S. PATENT DOCUMENTS

| | | |
|---|---|---|
| 5,256,070 A | 10/1993 | Garth et al. |
| 5,273,038 A | 12/1993 | Beavin |
| 5,299,810 A | 4/1994 | Pierce et al. |
| 5,304,065 A | 4/1994 | Hurst et al. |
| 5,313,201 A | 5/1994 | Ryan |
| 5,388,990 A | 2/1995 | Beckman |
| 5,474,453 A | 12/1995 | Copperman |
| 5,503,149 A | 4/1996 | Beavin |
| 5,507,647 A | 4/1996 | Morris |
| 5,583,844 A | 12/1996 | Wolf et al. |
| 5,604,848 A | 2/1997 | Harada et al. |
| 5,607,308 A | 3/1997 | Copperman et al. |
| 5,609,485 A | 3/1997 | Bergman et al. |
| 5,618,178 A | 4/1997 | Copperman et al. |
| 5,678,910 A | 10/1997 | Martin et al. |
| 5,687,307 A | 11/1997 | Akisada et al. |
| 5,704,791 A | 1/1998 | Gillio |
| 5,717,453 A | 2/1998 | Wohlstadter |
| 5,719,598 A | 2/1998 | Latham |
| 5,720,502 A | 2/1998 | Cain |
| 5,730,654 A | 3/1998 | Brown |
| 5,755,577 A | 5/1998 | Gillio |
| 5,766,016 A | 6/1998 | Sinclair et al. |
| 5,771,181 A | 6/1998 | Moore et al. |
| 5,791,908 A | 8/1998 | Gillio |
| 5,800,177 A | 9/1998 | Gillio |
| 5,800,178 A | 9/1998 | Gillio |
| 5,800,179 A | 9/1998 | Bailey |
| 5,823,780 A | 10/1998 | Arye et al. |
| 5,853,292 A | 12/1998 | Eggert et al. |
| 5,863,203 A | 1/1999 | Bragdon |
| 5,882,206 A | 3/1999 | Gillio |
| 5,980,256 A | 11/1999 | Carmein |
| 6,008,800 A | 12/1999 | Pryor et al. |
| 6,062,825 A | 5/2000 | Chovan |
| 6,062,865 A | 5/2000 | Bailey |
| 6,126,450 A | 10/2000 | Mukai et al. |
| 6,151,404 A | 11/2000 | Pieper |
| 6,166,744 A | 12/2000 | Jaszlics et al. |
| 6,193,519 B1 | 2/2001 | Eggert et al. |
| 6,267,599 B1 | 7/2001 | Bailey |
| 6,283,763 B1 | 9/2001 | Matsuzaki et al. |
| 6,325,631 B1* | 12/2001 | Kouba et al. .................. 434/219 |
| 6,336,047 B1 | 1/2002 | Thu et al. |
| 6,343,936 B1 | 2/2002 | Kaufman et al. |
| 6,375,469 B1 | 4/2002 | Brown |
| 6,386,882 B1 | 5/2002 | Linberg |
| 6,394,811 B2 | 5/2002 | Finitzo et al. |
| 6,443,735 B1 | 9/2002 | Eggert et al. |
| 6,492,488 B1 | 12/2002 | Adams et al. |
| 6,544,041 B1 | 4/2003 | Damadian |
| 6,551,107 B1 | 4/2003 | Buckley et al. |
| 6,638,073 B1 | 10/2003 | Kazimirov et al. |
| 6,654,000 B2 | 11/2003 | Rosenberg |
| 6,692,258 B1 | 2/2004 | Kurzweil et al. |
| 6,731,268 B2 | 5/2004 | Anton et al. |
| 6,739,877 B2 | 5/2004 | Bailey et al. |
| 6,758,676 B2 | 7/2004 | Eggert et al. |
| 6,773,263 B2 | 8/2004 | Nicholls et al. |
| 6,780,017 B2 | 8/2004 | Pastrick et al. |
| 6,790,043 B2 | 9/2004 | Aboud et al. |
| 6,807,535 B2 | 10/2004 | Goodkovsky |
| 6,857,878 B1 | 2/2005 | Chosack et al. |
| 6,872,080 B2 | 3/2005 | Pastrick et al. |
| 6,918,771 B2 | 7/2005 | Arington et al. |
| 6,929,481 B1 | 8/2005 | Alexander et al. |
| 6,939,138 B2 | 9/2005 | Chosack et al. |
| 6,979,164 B2 | 12/2005 | Kramer |
| 7,017,548 B2 | 3/2006 | Sawada et al. |
| 7,021,937 B2 | 4/2006 | Simpson et al. |
| 7,021,940 B2 | 4/2006 | Morris et al. |
| 7,048,544 B2 | 5/2006 | Olsen |
| 7,052,280 B2 | 5/2006 | Miller |
| 7,058,896 B2 | 6/2006 | Hughes et al. |
| 7,098,891 B1 | 8/2006 | Pryor et al. |
| 7,116,334 B2 | 10/2006 | Kitsutaka et al. |
| 7,117,135 B2 | 10/2006 | Cull et al. |
| 7,117,136 B1 | 10/2006 | Rosedale |
| 7,121,832 B2 | 10/2006 | Hsieh et al. |
| 7,162,695 B2 | 1/2007 | Zemore et al. |
| 7,182,602 B2 | 2/2007 | Lakin et al. |
| 7,191,110 B1 | 3/2007 | Charbel et al. |
| 7,192,284 B2 | 3/2007 | Eggert et al. |
| 7,199,382 B2 | 4/2007 | Rigney et al. |
| 7,213,006 B2 | 5/2007 | Hartman et al. |
| 7,215,326 B2 | 5/2007 | Rosenberg |
| 7,229,288 B2 | 6/2007 | Stuart et al. |
| 7,236,618 B1 | 6/2007 | Chui et al. |
| 7,239,987 B2 | 7/2007 | Lundback et al. |
| 7,241,145 B2 | 7/2007 | Riener et al. |
| 7,249,951 B2 | 7/2007 | Bevirt et al. |
| 7,263,710 B1 | 8/2007 | Hummel, Jr. et al. |
| 7,266,476 B2 | 9/2007 | Coburn et al. |
| 7,272,766 B2 | 9/2007 | Sakezles |
| 7,281,219 B2 | 10/2007 | Hamilton et al. |
| 7,286,971 B2 | 10/2007 | Rappaport et al. |
| 7,289,106 B2 | 10/2007 | Bailey et al. |
| 7,295,184 B2 | 11/2007 | Suprun et al. |
| 7,300,398 B2 | 11/2007 | Chefd'hotel et al. |
| 2001/0055748 A1 | 12/2001 | Bailey |
| 2002/0076679 A1 | 6/2002 | Aman |
| 2003/0132973 A1 | 7/2003 | Hughes |
| 2004/0009459 A1 | 1/2004 | Anderson et al. |
| 2004/0015813 A1 | 1/2004 | Yerushalmy |
| 2004/0018477 A1 | 1/2004 | Olsen |
| 2004/0058304 A1 | 3/2004 | Morsy et al. |
| 2004/0072134 A1 | 4/2004 | Takahashi |
| 2004/0078225 A1 | 4/2004 | Schramm-Apple et al. |
| 2004/0104935 A1* | 6/2004 | Williamson et al. .......... 345/757 |
| 2004/0121295 A1* | 6/2004 | Stuart et al. .................. 434/262 |
| 2004/0161731 A1* | 8/2004 | Arington et al. .............. 434/262 |
| 2004/0166484 A1 | 8/2004 | Budke et al. |
| 2004/0175684 A1* | 9/2004 | Kaasa et al. .................. 434/262 |
| 2004/0191730 A1 | 9/2004 | Couder et al. |
| 2004/0201239 A1 | 10/2004 | Pellegrin |
| 2004/0221239 A1 | 11/2004 | Hachigian et al. |
| 2004/0224294 A1 | 11/2004 | Heininger et al. |
| 2004/0229685 A1 | 11/2004 | Smith et al. |
| 2004/0234933 A1 | 11/2004 | Dawson et al. |
| 2004/0257361 A1 | 12/2004 | David Tabakman et al. |
| 2005/0069839 A1 | 3/2005 | Denne |
| 2005/0084833 A1 | 4/2005 | Lacey et al. |
| 2005/0095569 A1* | 5/2005 | Franklin ....................... 434/350 |
| 2005/0100201 A1 | 5/2005 | Mayer et al. |
| 2005/0102063 A1 | 5/2005 | Bierre |
| 2005/0118557 A1 | 6/2005 | Sumner et al. |
| 2005/0170323 A1* | 8/2005 | Jarrell et al. ................. 434/262 |
| 2005/0181342 A1 | 8/2005 | Toly |
| 2005/0181348 A1 | 8/2005 | Carey et al. |
| 2005/0196739 A1 | 9/2005 | Moriyama |
| 2005/0196740 A1 | 9/2005 | Moriyama |
| 2005/0203922 A1 | 9/2005 | Uhlir et al. |
| 2005/0216243 A1 | 9/2005 | Graham et al. |
| 2005/0223327 A1 | 10/2005 | Cunningham et al. |
| 2005/0233290 A1 | 10/2005 | Jackson |
| 2005/0254702 A1 | 11/2005 | Era |
| 2005/0255434 A1 | 11/2005 | Lok et al. |
| 2005/0277096 A1 | 12/2005 | Hendrickson et al. |
| 2006/0003301 A1 | 1/2006 | Biggins |
| 2006/0004555 A1 | 1/2006 | Jones |
| 2006/0004608 A1 | 1/2006 | Rovinelli et al. |
| 2006/0040245 A1* | 2/2006 | Airola et al. .................. 434/262 |
| 2006/0114171 A1 | 6/2006 | Vascotto et al. |
| 2006/0127687 A1 | 6/2006 | Yamaguchi et al. |
| 2006/0160049 A1 | 7/2006 | Zora |
| 2006/0183095 A1 | 8/2006 | Korndorffer et al. |
| 2006/0227133 A1 | 10/2006 | Petrov et al. |
| 2006/0267963 A1 | 11/2006 | Pryor |
| 2006/0286524 A1 | 12/2006 | Boyers et al. |
| 2007/0020598 A1 | 1/2007 | Yamashita et al. |
| 2007/0099702 A1 | 5/2007 | Tupper |
| 2007/0115282 A1 | 5/2007 | Turner et al. |
| 2007/0141538 A1 | 6/2007 | Quinn et al. |
| 2007/0142749 A1 | 6/2007 | Khatib et al. |

(56) References Cited

U.S. PATENT DOCUMENTS

| | | | |
|---|---|---|---|
| 2007/0166682 | A1 | 7/2007 | Yarin et al. |
| 2007/0167801 | A1 | 7/2007 | Webler et al. |
| 2007/0172804 | A1 | 7/2007 | Allen et al. |
| 2007/0179645 | A1 | 8/2007 | Nixon et al. |
| 2007/0207448 | A1 | 9/2007 | Glaser et al. |
| 2007/0212671 | A1 | 9/2007 | Brown |
| 2007/0238081 | A1 | 10/2007 | Koh |
| 2007/0238085 | A1 | 10/2007 | Colvin et al. |
| 2007/0248937 | A1 | 10/2007 | Chen |

OTHER PUBLICATIONS

Asi Burak, Tim Sweeney, "PeaceMaker a Video Game to Teach Peace" URL: http://www.seriousgamessummit.com/conference/speaker_presentations/Asi_Burak.pdf (3 pages) Oct. 2005.

Christopher Chambers, "America's Army® Morphing the Game to Training & Mission Rehearsal Applications", URL: http://www.seriousgamessummit.com/conference/speaker_presentations/Chris_Chambers.ppt (20 pages) Oct. 2005.

A. Maricic, Hiew Pang Leang, "Biofeedback Computer Game-Based Training", URL: http://ieeexplore.ieee.org/Xplore/login.jsp?url=/iel5/10014/32158/01505673.pdf (4 pages) ELAMR 2005, 47th International Symposium, vol. 8, Issue 10, Jun. 2005.

Christopher Abbey "Games Tackle Disaster Training", Wired, URL: http://www.wired.com/science/discoveries/news/2005/12/69580#.

Randall W. Hill, Jr., James Belanich, H. Chad Lane, Mark Core, Melissa Dixon, Eric Forbell, Julia Kim, John Hart, "Pedagologically Structured Game-Based Training: Development of the Elect Bilat Simulation", URL: http://people.ict.usc.edu/~lane/papers/2006-09-ASC06-ELECT-BiLAT-FINAL.pdf (10 pages-including date reference) 2006.

Paul Lambert, Marcor, "Advanced Equipment Maintenance Training Using Revolutionary Video Game Technology", URL: http://www.navysbir.com/n06_2/n062-100.htm (2 pages). Believed to be prior to May 1, 2006.

Tricia Mautone, Alan Spiker, Ron Karp, Anacapa Sciences Inc., Santa Barbara CA, "Conventional Training Versus Game-Based Training" URL: http://stinet.dtic.mil/cgi-bin/GetTRDoc?AD=ADA464043&Location=U2&doc=GetTRDoc.pdf (84 pages) Mar. 2006.

Jana, Reena, "Taking the Pulse!! of Medical Training", Business Week, URL: http://www.businessweek.com/innovate/content/apr2006/id20060410_051875.htm Apr. 10, 2006, plus accompanying slide show (URL for slide show: http://images.businessweek.com/ss/06/04/pulse/source/1.htm) 10 pages.

Declaration of Non-Establishment of International Search Report dated Jul. 19, 2007, for International Application No. PCT/US2007/000903, filed Jan. 12, 2007, 2 pages.

Medical Education Technologies, Inc., "Human Patient Simulator", 2004, 25 pages.

Smith BE, Gaba DM: Simulators. In Clinical Monitoring: Practical Applications for Anesthesia and Critical Care, edited by Lake C, Blitt C, Hines R. Philadelphia: W. B. Saunders, 2001, pp. 26-44.

"Human Patient Simulator" URL: http://simtech.stanford.edu/pages/021303_hps.html Feb. 19, 2003, (2 pages).

Jeffrey B. Cooper, PhD, Deborah Barron, MD, Richard Blum, MD, J. Kenneth Davison, MD, David Feinstein, MD, Jordan Halasz, Daniel Raemer, PhD, Rpger Russell, MD, Center for Medical Simulation, Boston, MA, "Video Teleconferencing With Realistic Simulation for Medical Education", Jounral of Clinical Anesthesia 12:256-261, 2000 (6 pages).

David M. Gaba, Steven K. Howard, Kevin J. Fish, Brian E. Smith, Yassar A. Sowb, Stanford University, "Simulation-Based Training in Anesthesia Crisis Resource Management (ACRM): A Decade of Experience", Simulation and Gaming, vol. 32, No. 2, Jun. 2001, pp. 175-193 (19 pages).

* cited by examiner

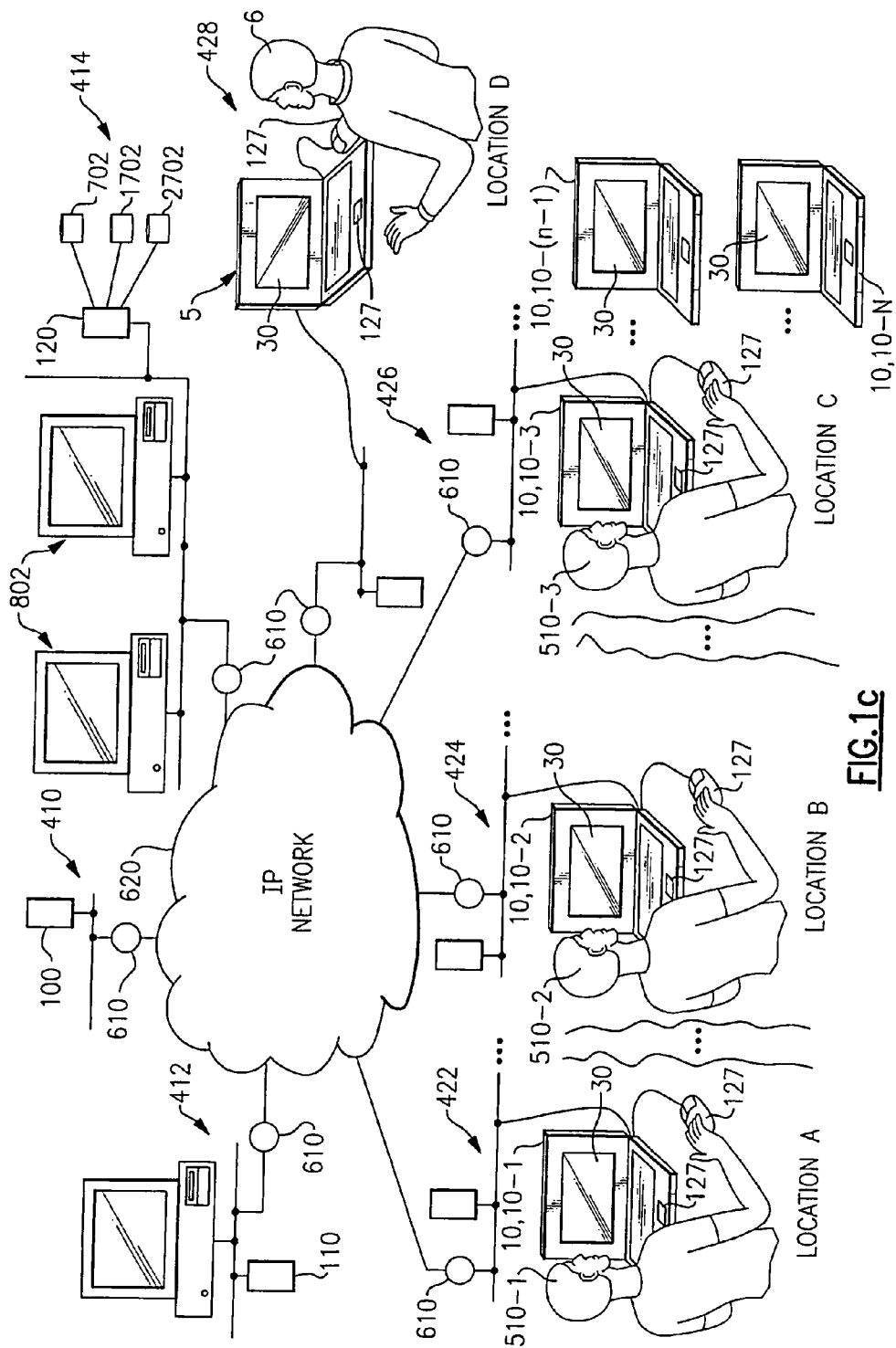

| COMMAND | ROUTINE |
|---|---|
| RUN ACTION STATE 1 ANIMATION ROUTINE | CD CHARACTER ROUTINE 1 |
| RUN ACTION STATE 2 ANIMATION ROUTINE | CD CHARACTER ROUTINE 2 |
| ⋮ | ⋮ |
| RUN ACTION STATE (N-1) ANIMATION ROUTINE | CD CHARACTER ROUTINE (N-1) |
| RUN ACTION STATE N ANIMATION ROUTINE | CD CHARACTER ROUTINE N |
| IDLE | IDLE ROUTINE (MODEL LOOPS TO LOOK AROUND ROOM) |

FIG.2a

| COMMAND | ROUTINE |
|---|---|
| RUN ADE STATE 1 ANIMATION ROUTINE | ADE STATE 1 ANIMATION ROUTINE |
| RUN ADE STATE 2 ANIMATION ROUTINE | ADE STATE 2 ANIMATION ROUTINE |
| ⋮ | ⋮ |
| RUN ADE STATE (N-1) ANIMATION ROUTINE | ADE STATE (N-1) ANIMATION ROUTINE |
| RUN ADE STATE N ANIMATION ROUTINE | ADE STATE N ANIMATION ROUTINE |
| RUN ANIMATION WAVE ARMS | ADE "WAVE ARMS" ANIMATION ROUTINE |

FIG.2b

```
2006-05-04_165039_1.log
#*****************
#*****  Rapid Response - v 1.0   *****
#*****************
# Log created Thu May 04 16:53:17 2006

Richard (avatar 20) is ready.

Lindsay (avatar 10) is ready.

Chris (avatar 30) is ready.

1.89.820 DEFIB dial Off Not_Connected
0.000 SYSTEM start_sim 16:53:49
11.094 Chris CrashCartGrabBVM 1
15.891 Lindsay ZoomFace
17.365 Richard CrashCartGrabHeadboard 1
17.919 Lindsay LiftHead 1
21.063 Lindsay ZoomFace
28.909 Chris passObject 30 BVAMask 10 HandsFree from30Nav26pass10Nav25
29.011 Lindsay passObject 30 BVAMask 10 HandsFree from30Nav26pass10Nav25
30.954 Lindsay ApplyBVM
39.710 Chris RollPatient21
43.765 Richard PlaceBoard19
47.882 Lindsay ApplyBVM
52.763 Richard CrashCartGrabPads 1
56.352 Chris squeeze 111.808
57.695 Chris squeeze 113.158
52.953 Richard ApplyDefibPads
59.063 Chris squeeze 114.524
60.056 DEFIB dial Off Connected
63.015 Chris TakeLeftCarotidPulse 0.0
65.168 Richard compress 219.513
66.168 Richard compress 220.513
66.310 Lindsay BedCorner3GrabBVM 0
67.097 Richard compress 221.451
68.137 Richard compress 222.451
69.135 Richard compress 223.482
70.246 Richard compress 224.576
74.875 Lindsay ZoomDrawers
76.952 Lindsay OpenDrawer2
78.322 Lindsay CrashCartGrabEpinephrine 1
78.468 Lindsay OpenDrawer2
80.815 Chris compress 136.284
81.720 Lindsay ZoomDrawers
81.966 Chris compress 137.35
```

Page 1

```
2006-05-04_165039_1.log
82.961 Chris compress 138.417
84.049 Chris compress 139.316
85.156 Chris compress 140.616
86.207 Chris compress 141.665
87.153 Chris compress 142.615
88.166 Chris compress 143.605
89.133 Chris compress 144.581
90.008 Chris compress 145.464
91.089 Lindsay applyMeds Epinephrine 0.5mg -294.169160.167
91.282 DEFIB dial Monitor Connected
92.247 DEFIB dial Defib Connected
93.741 Richard DefibEnergyUp 120
95.429 Richard DefibEnergyUp 150
96.275 Richard DefibCharge 150
97.082 Chris BedCornerXGrabHVM 1
98.934 Chris BedCornerXGrabBVM 0
102.676 Lindsay TakeLeftCarotidPulse 0.0
103.588 Chris compress 159.043
104.607 Chris compress 160.126
105.840 Chris compress 161.309
106.946 Chris compress 162.392
107.959 Chris compress 163.425
110.572 Richard DefibShock 150
110.699 PATIENT healthy
110.610 DEFIB dial Defib Connected
113.064 Chris TakeLeftFemoralPulse 72.0
114.501 Lindsay TakeLeftCarotidPulse 72.0
119.460 Chris TakeLeftRadialPulse 72.0
122.145 SYSTEM end_sim
122.193 PATIENT troubled
```

Page 2

FIG. 5a

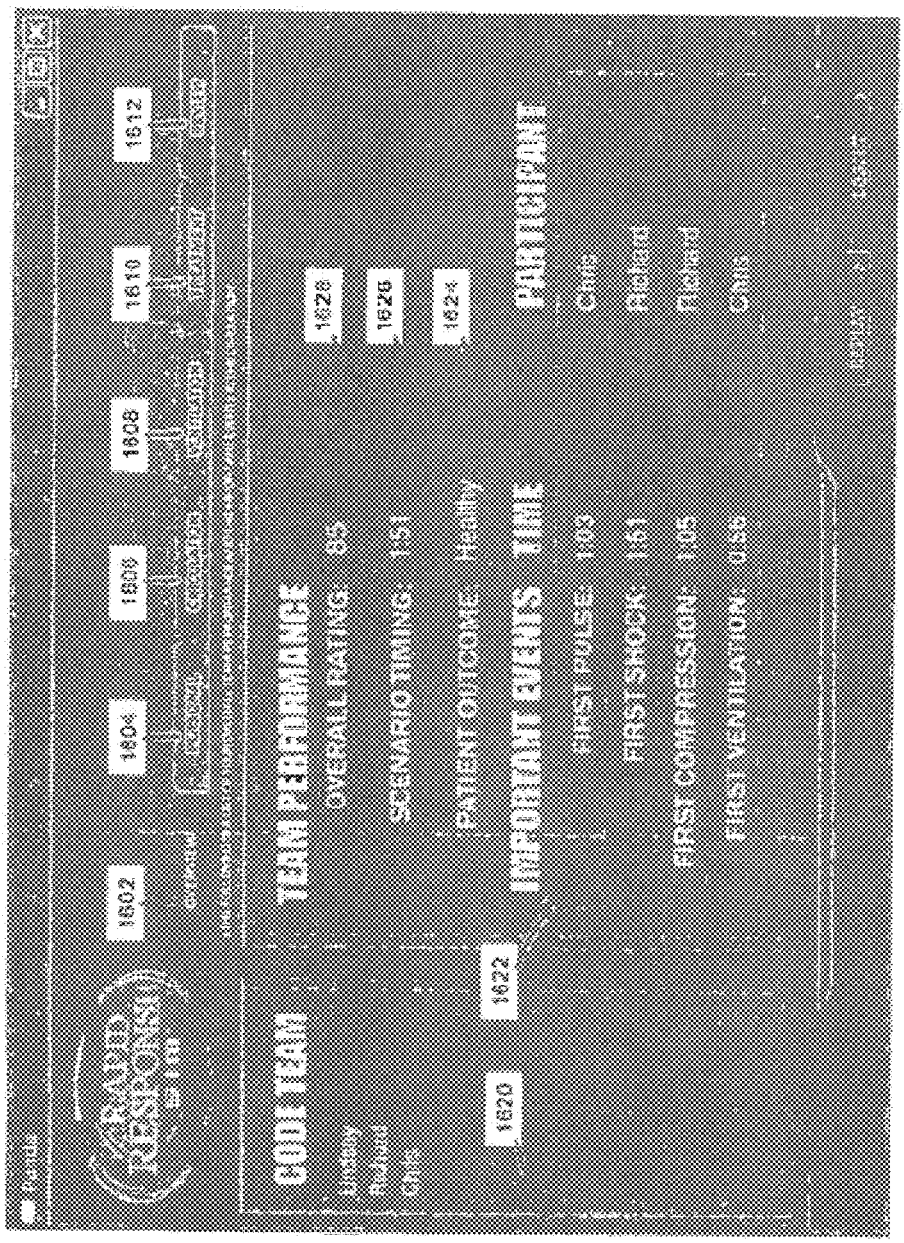

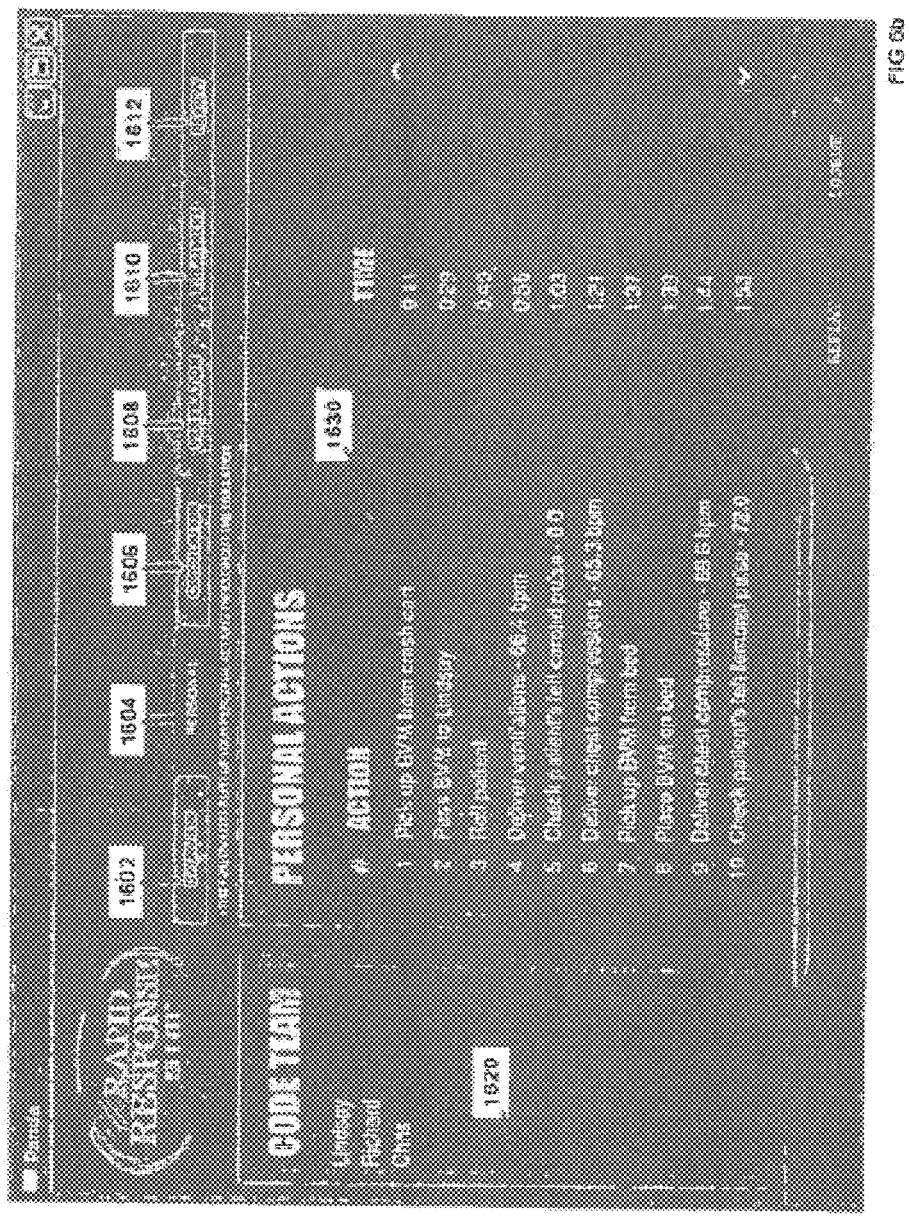

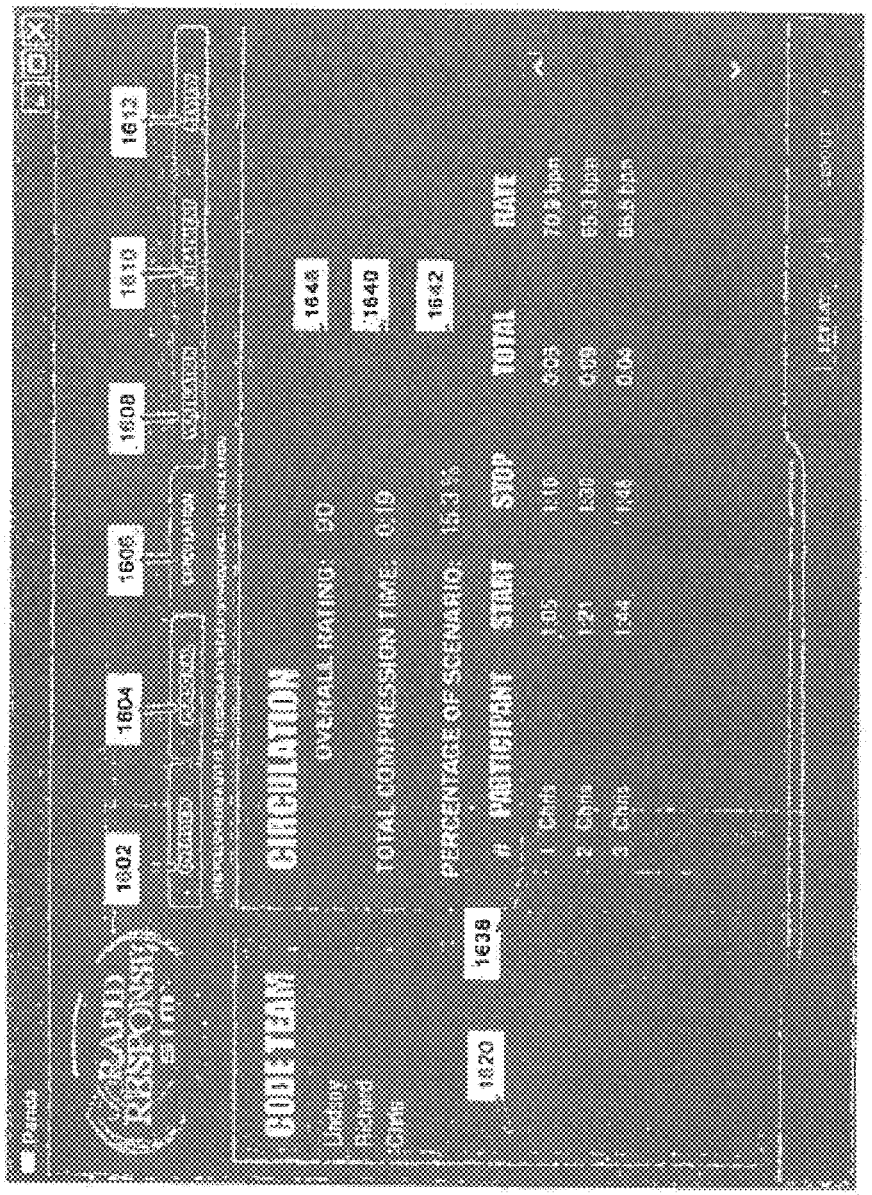

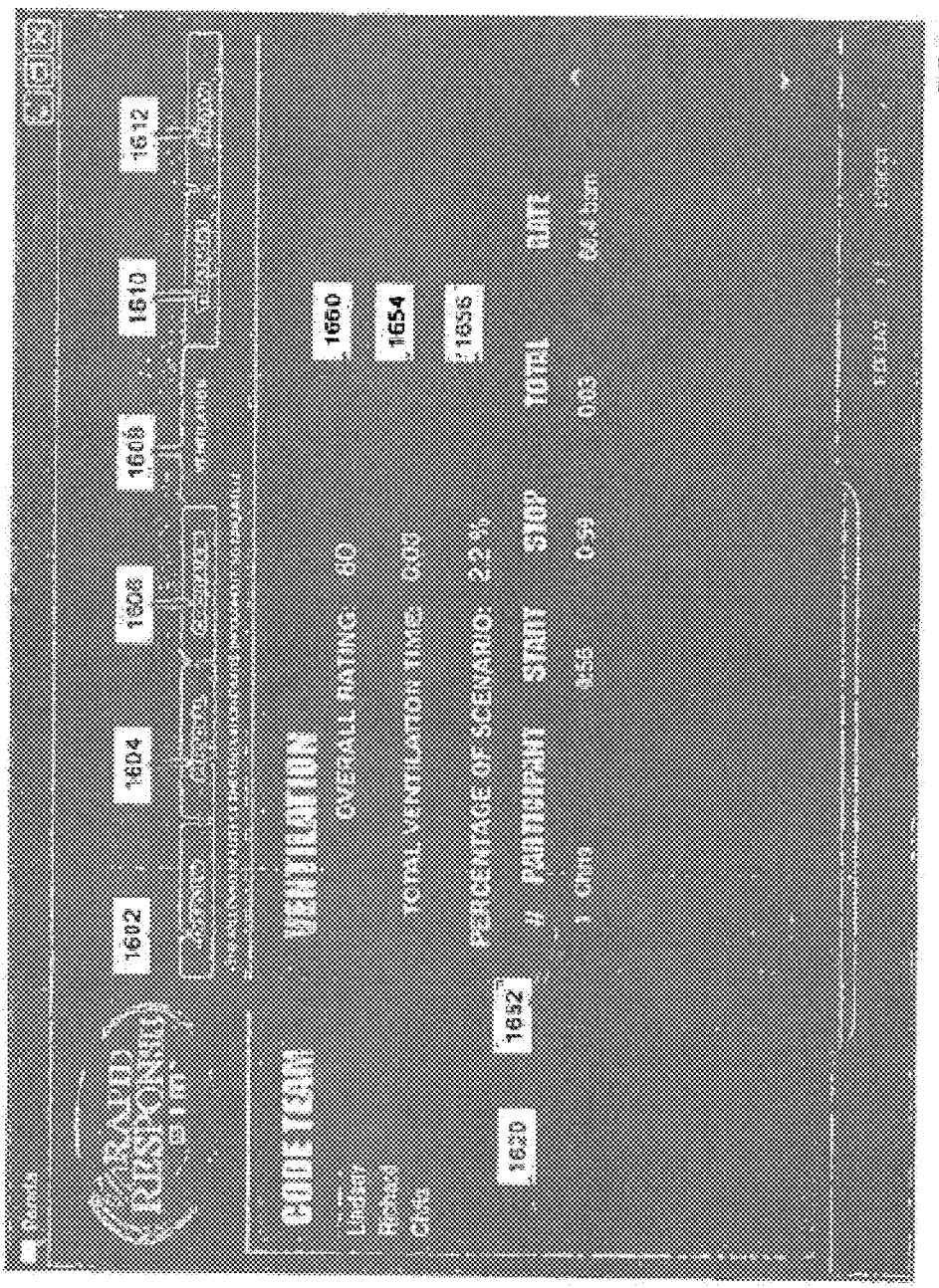

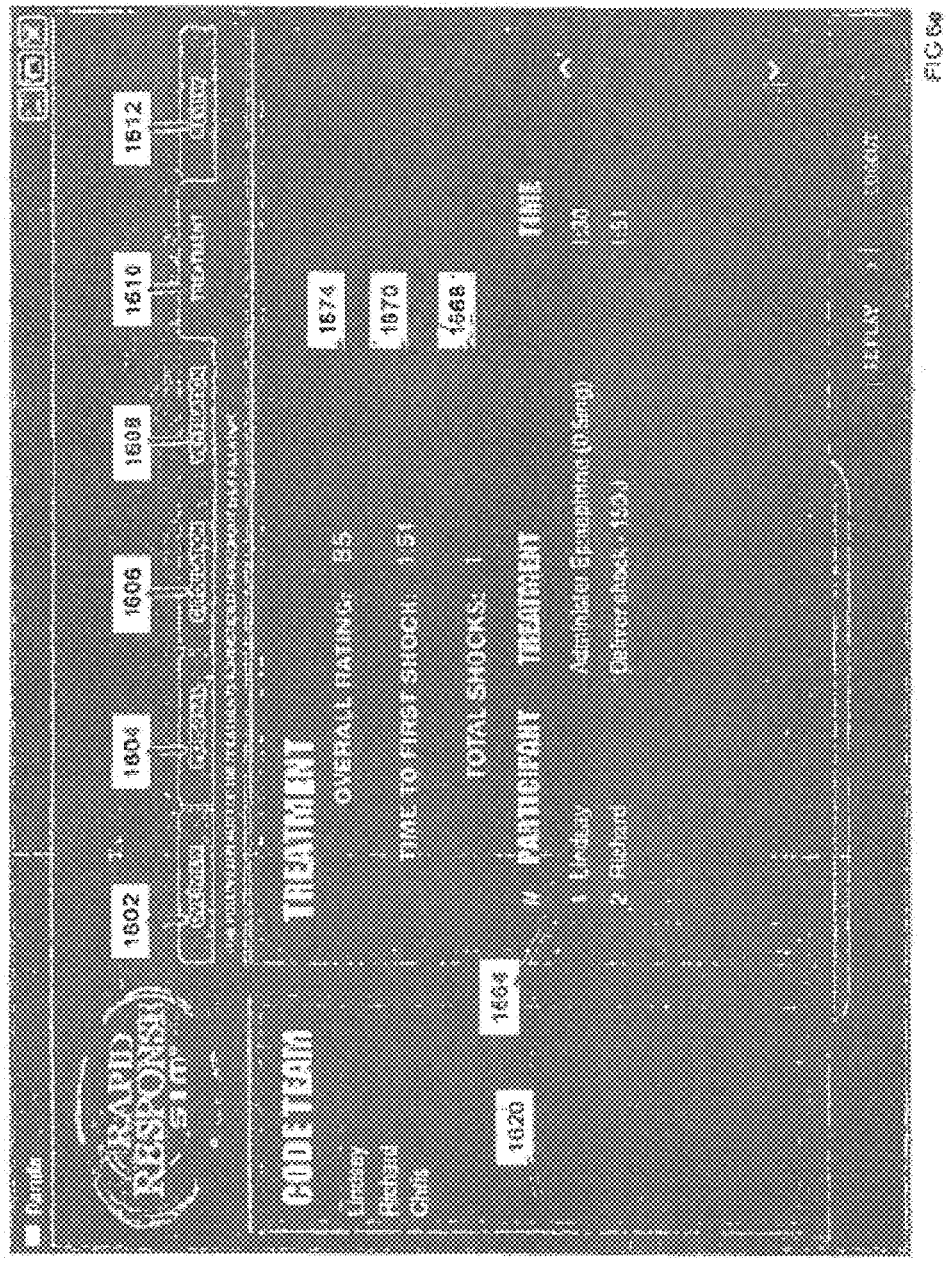

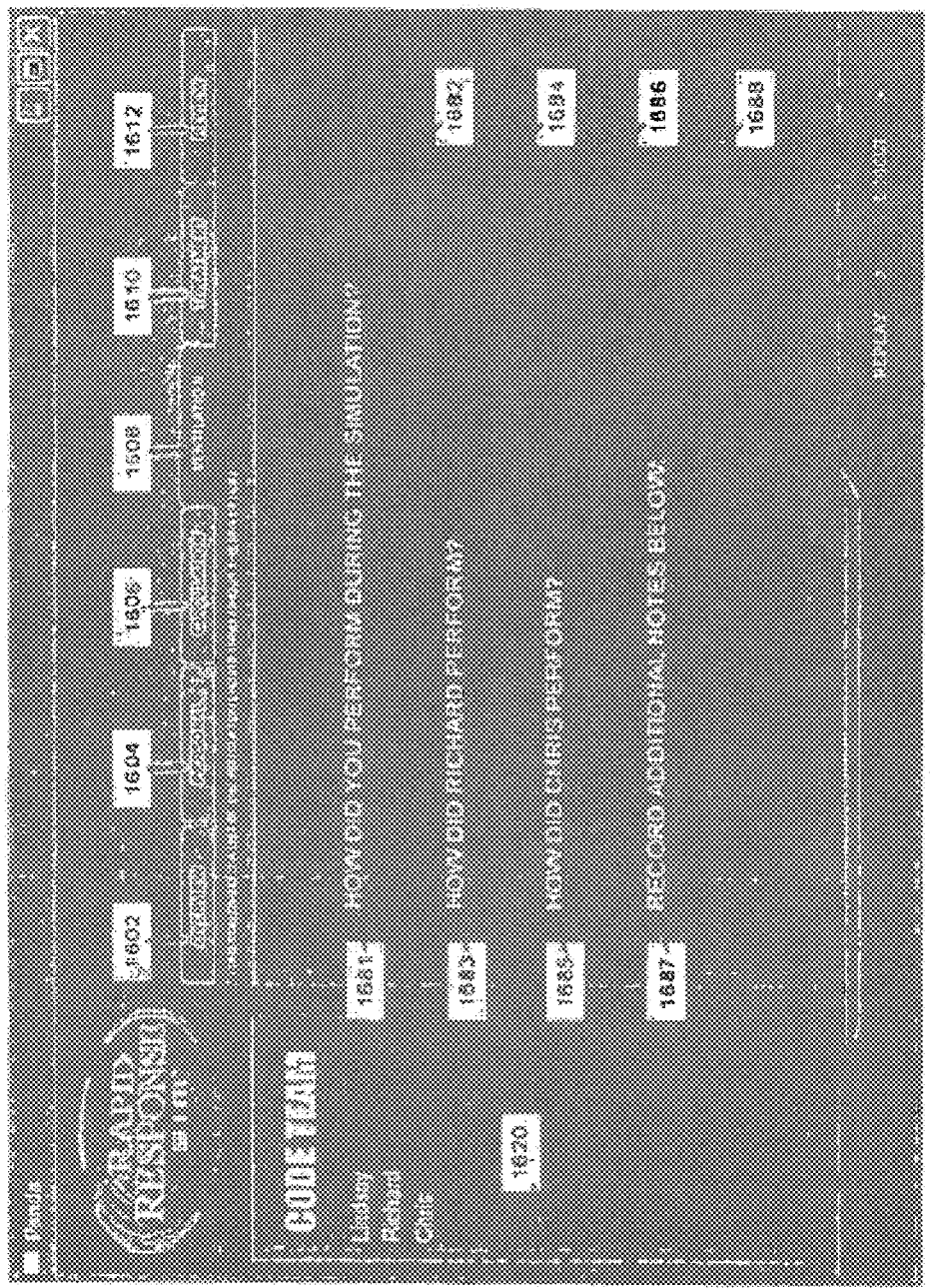

FIG.7c — 1702

| PATIENT ID | NAME | SEX | DOB | BMI | VITAL SIGN DATA | COMMENTS |
|---|---|---|---|---|---|---|
| 0047 | SMITH, JOHN | M | 10/10/60 | | | |
| 0048 | JONES, ROBERT | M | 10/5/28 | | | |
| 0049 | MURPHY, SUSAN | F | 5/5/85 | | | |

FIG.7d — 2702

| EQUIPMENT ID | MODEL # | # VALVES | POWER | HP | COMMENTS |
|---|---|---|---|---|---|
| 007771 | ACME 5418 | 4 | DC | 12 | |
| 007772 | ABC 55 | 2 | AC | 14 | |
| 007773 | BLUESTAR 170 | 2 | AC | 8 | |

FIG.7e — 802, 5

PATIENT INFORMATION — 2460
JOHN SMITH
MALE, AGE 45 — 2468
COMMENTS — 2468

FIG.7f — 802, 5

EQUIPMENT INFORMATION — 2460
ABC 55 — 2468
2 VALVE, AC, 14 HORSEPOWER — 2468
COMMENTS — 2468

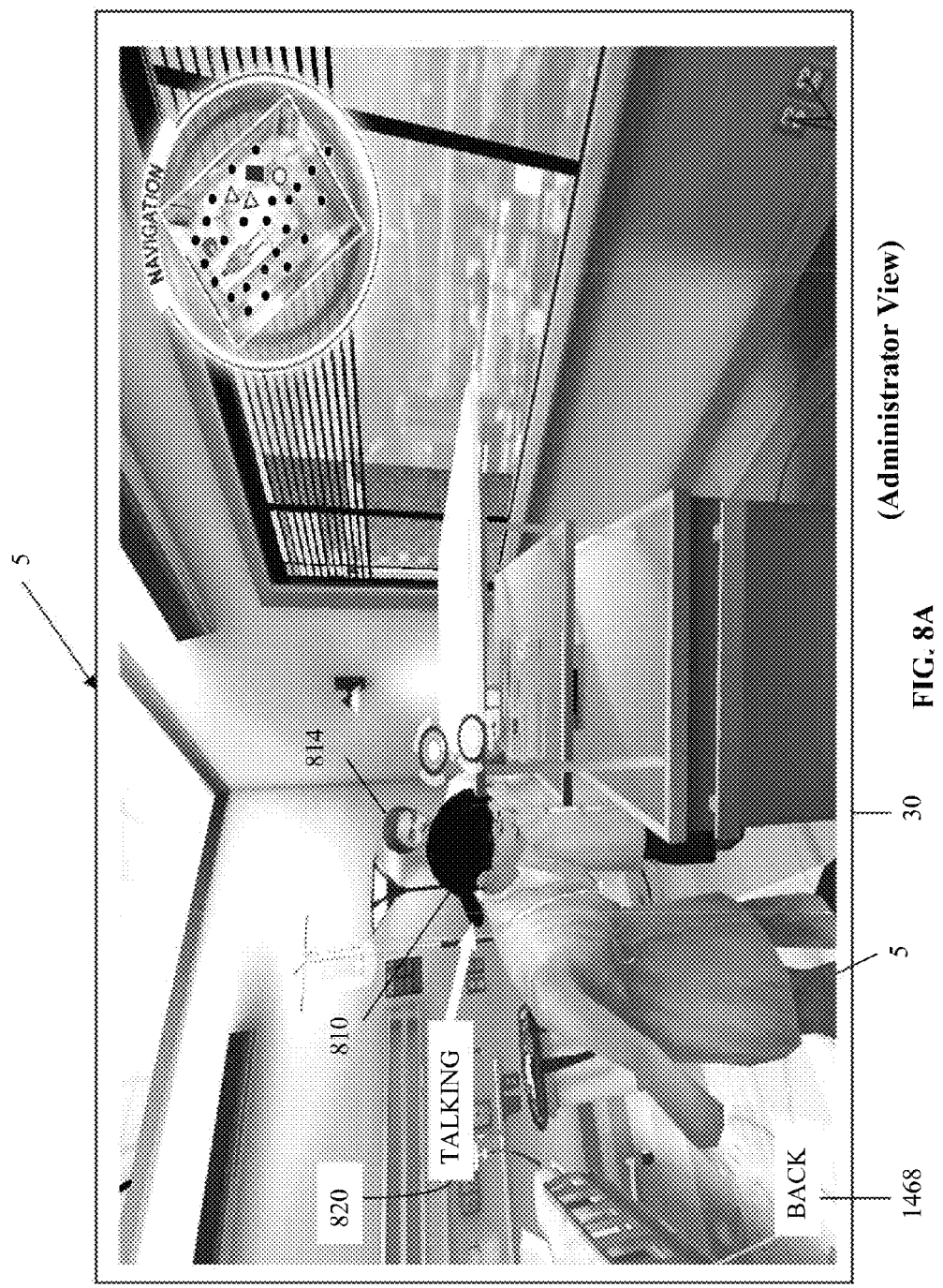

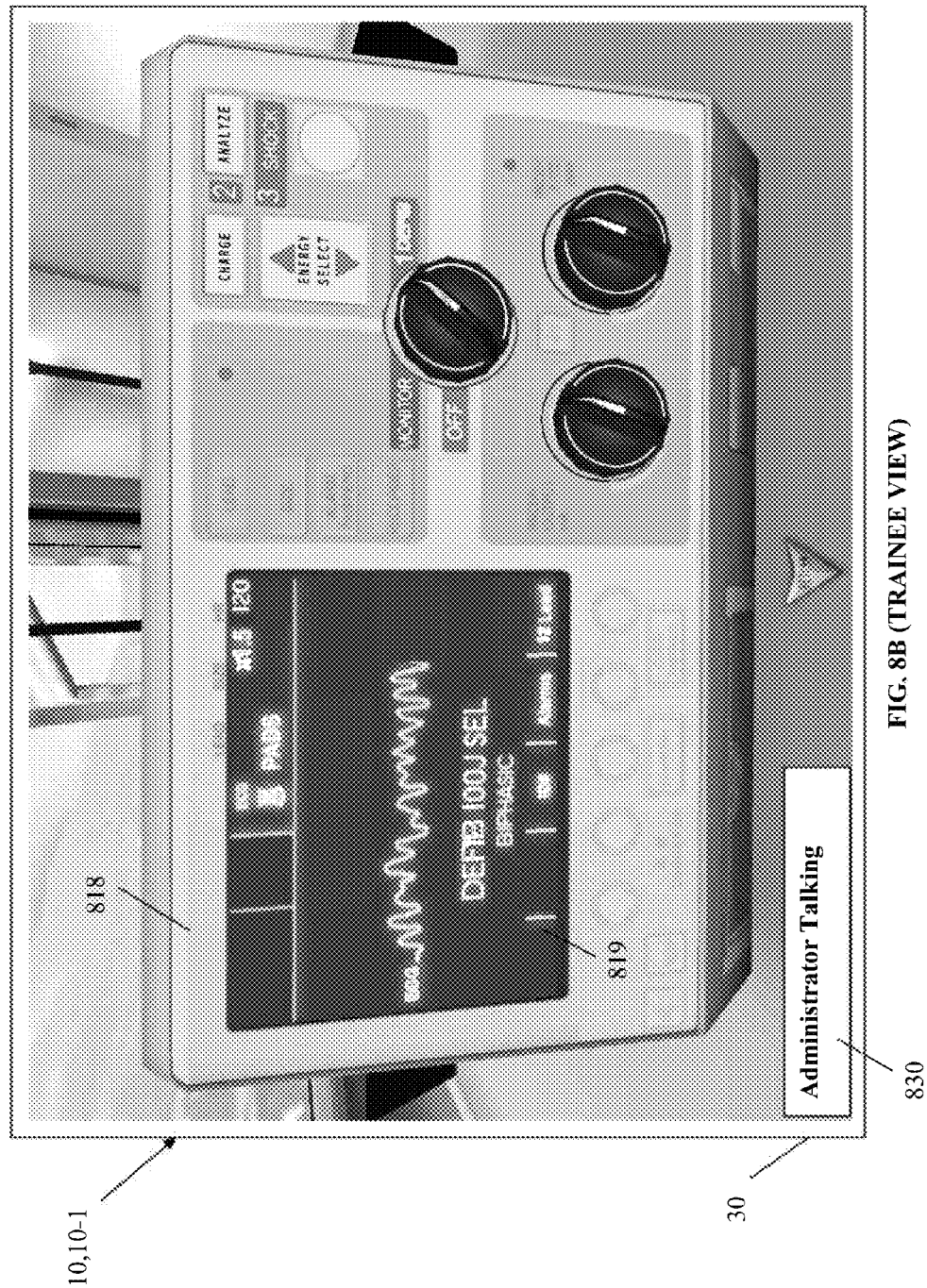
FIG. 8B (TRAINEE VIEW)

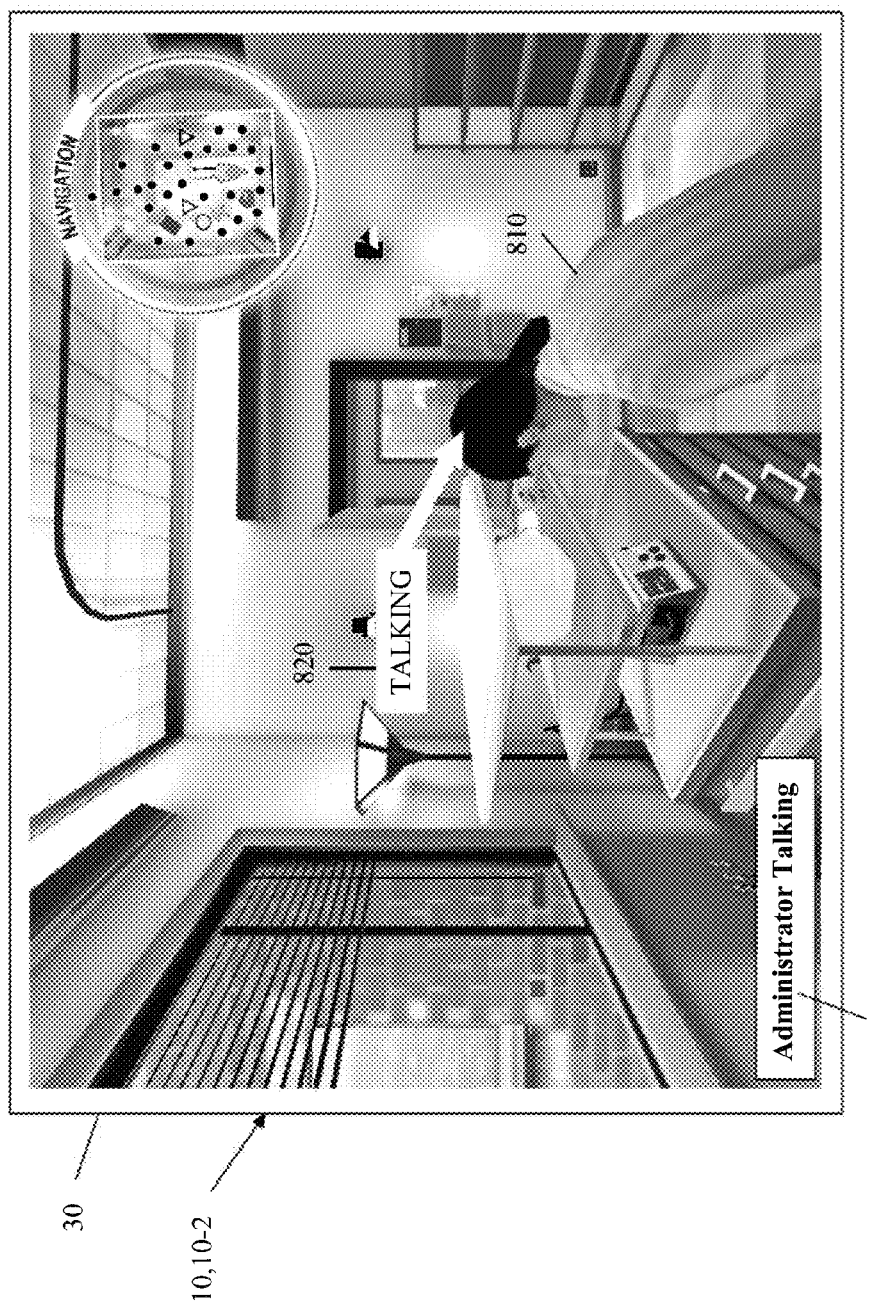
FIG. 8C (TRAINEE VIEW)

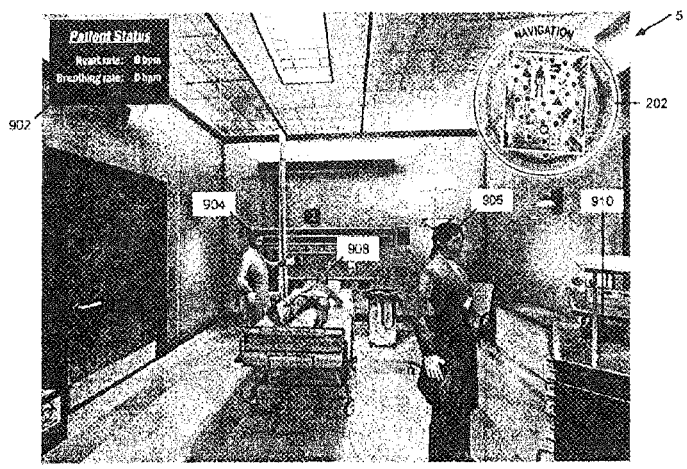
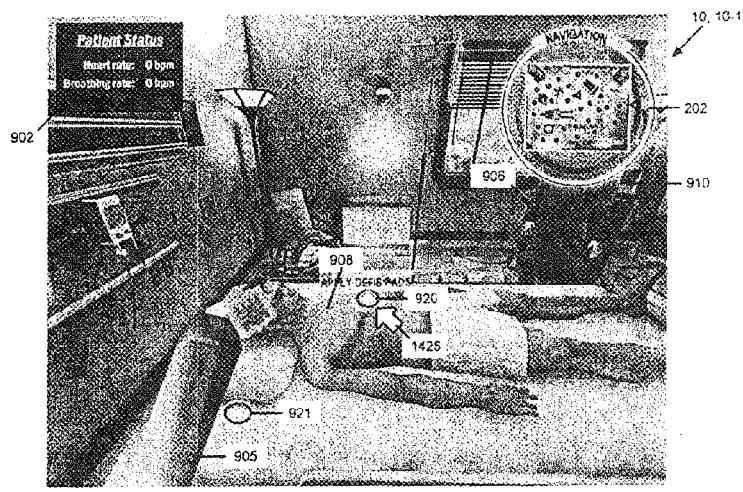
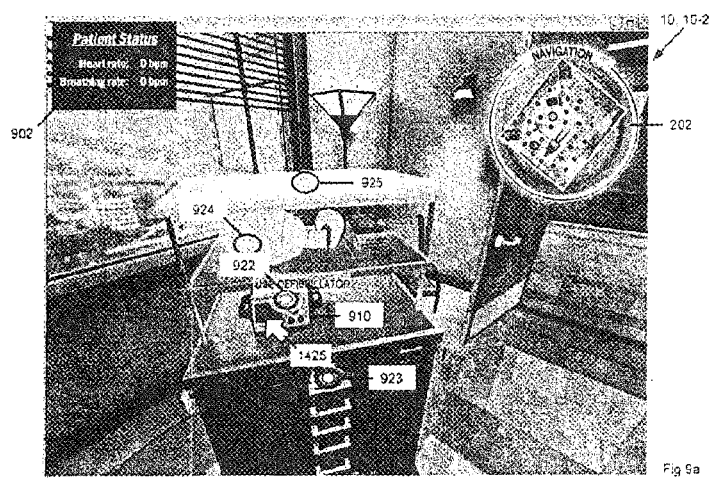
Fig 9a

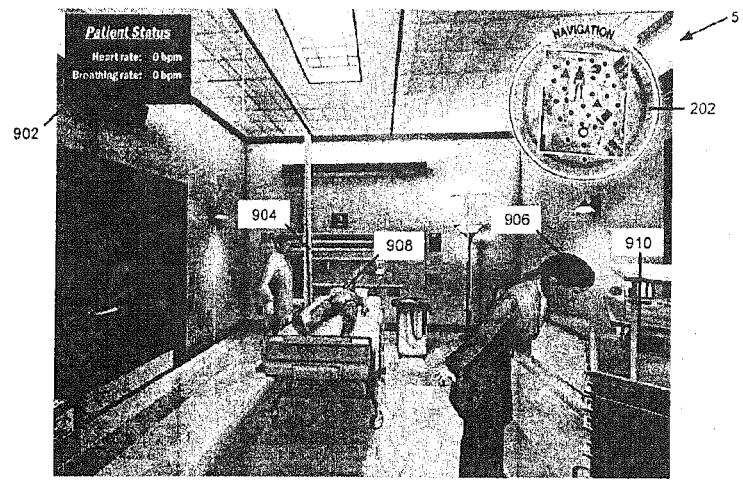
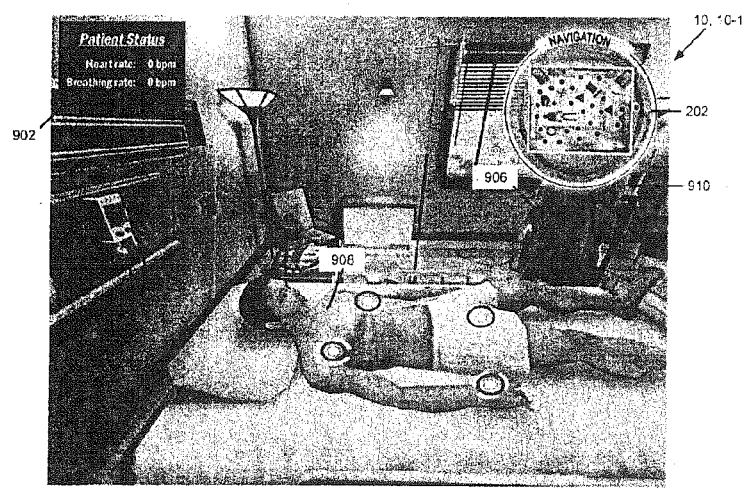
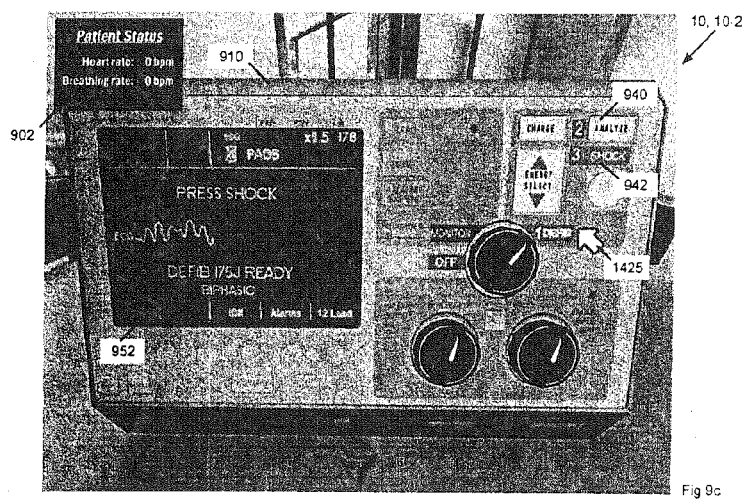
Fig 9c

COMPUTER BASED SYSTEM FOR TRAINING WORKERS

CROSS REFERENCE TO RELATED APPLICATION

This application claims priority under 35 U.S.C. §119(e) to each of U.S. Provisional Patent Application No. 60/816,394, filed Jun. 23, 2006 entitled "Computer Based System For Training Workers," U.S. Provisional Patent Application No. 60/797,888, filed May 6, 2006 entitled "Computer Based Training Apparatus For Training Workforce Teams," and U.S. Provisional Patent Application No. 60/758,806, filed Jan. 13, 2006 entitled "Computer Based Training Apparatus For Training Workforce Teams." Each of the above provisional applications is incorporated herein by reference.

FIELD OF THE INVENTION

The invention relates to computer based system and specifically a computer based system which in one embodiment can be used to train one or more workers.

BACKGROUND OF THE INVENTION

In many manufacturing environments a manufacturing of an item requires specific action of a worker and in some cases coordinated action between multiple workers. If one of the workers fails to perform a prescribed role the task may not be accomplished. Where a workforce team is commissioned to perform a task the nonperformance of one of the workers can prevent completion of a task notwithstanding flawless performance by the remaining members of the team.

Because of the potential losses attendant to the failure of an individual or of a team to perform, business entities invest considerable resources in training workforces including workforce teams. The goal of workforce training programs is to improve worker skill and efficiency. The specific goal of a workforce team training program is twofold: (1) first to improve efficiency of operation by a team and to improve coordination of action among team members of a team; and (2) to identify team members who are likely to be non-performers in a real world application so that so the likely non-performers can be removed from a team prior to a next real world application.

Training seminars for training of workforces including workforce teams are expensive for a variety of reasons. For example, the trainees often have to travel from remote locations to a central training location. Also, coordinators have to be commissioned to run the training seminar. Still further, expensive props often have to be provided.

In patient care applications, the performance of a patient often depends on the performance of a team. For example, a vital sign reading of a patient in a crisis condition might be expected to improve if a first crises team member takes a first action with respect to the patient and a second crises team member takes a second action with respect to the patient. The performance of patient also depends on the performance of individual patient care givers irrespective of the presence or absence of coordinated action between caregivers.

There is a need for improved skill and efficiency of individual workers and among team member workers in a variety of real world applications.

BRIEF DESCRIPTION OF THE DRAWINGS

For a further understanding of the invention, reference will be made to the following detailed description of the invention which is to be read in connection with the accompanying drawing, where:

FIG. 1c is an embodiment of an apparatus, wherein a central server and the trainee client computers are all located remote from one another. The apparatus further includes an administrator client computer for use by an administrator. The administrator client computer can be configured differently from the remaining trainee client computers to allow an administrator to alter a simulation without controlling a controlled digital character and without initiating commands for causing an animation routine for a model corresponding to a controlled digital character to be run. The apparatus in the view of FIG. 1c also includes and is in communication with an enterprise database in the form of a personnel database. The database, in one embodiment, can be a legacy database pre-existing the incorporation of the trainee client computers, the central server and the administrator client computer into the apparatus.

FIGS. 2a and 2b are tables illustrating a control aspect of a training apparatus in one embodiment.

FIGS. 3a and 3b are views that may be rendered at displays of first and second computers as described herein at a common time.
FIGS. 3a and 3b illustrate first and second first person views common digital world at a certain time.

FIG. 5a is a printout of an exemplary log file that can be recorded by an apparatus when executing a simulation.

FIGS. 6a-6f are screen shot screen displays illustrating displayed content of a report that can be generated by an apparatus by parsing and processing data of a log file.

FIG. 7c illustrates an exemplary structure for a patient database from which parameters may be extracted for setting up a simulation.

FIG. 7d illustrates an exemplary structure for a work subject database from which parameters may be extracted for setting up a simulation.

FIG. 7e is an exemplary formatted display screen for displaying parameters of a patient database. A formatted display screen can display parameter data at a certain position of a display screen.

FIG. 7f is an exemplary formatted display screen for display parameters of a work subject (particularly an equipment article database).

FIGS. 8a, 8b and 8c illustrate exemplary views that may be rendered concurrently by an administrator client computer, a first trainee client computer, and a second trainee client computer of an apparatus respectively.

FIG. 9a are illustrative screen shot views illustrating concurrently rendered views of a common scene by an administrative client computer, a first trainee client computer, and a second trainee client computer, respectively, at a first point in a simulation.

FIG. 9c are illustrative screen shot views illustrating concurrently rendered views of a common scene by an administrative client computer, a first trainee client computer, and a second trainee client computer, respectively, at a third point in a simulation.

DETAILED DESCRIPTION OF THE INVENTION

I. Introduction

Figure 1A:
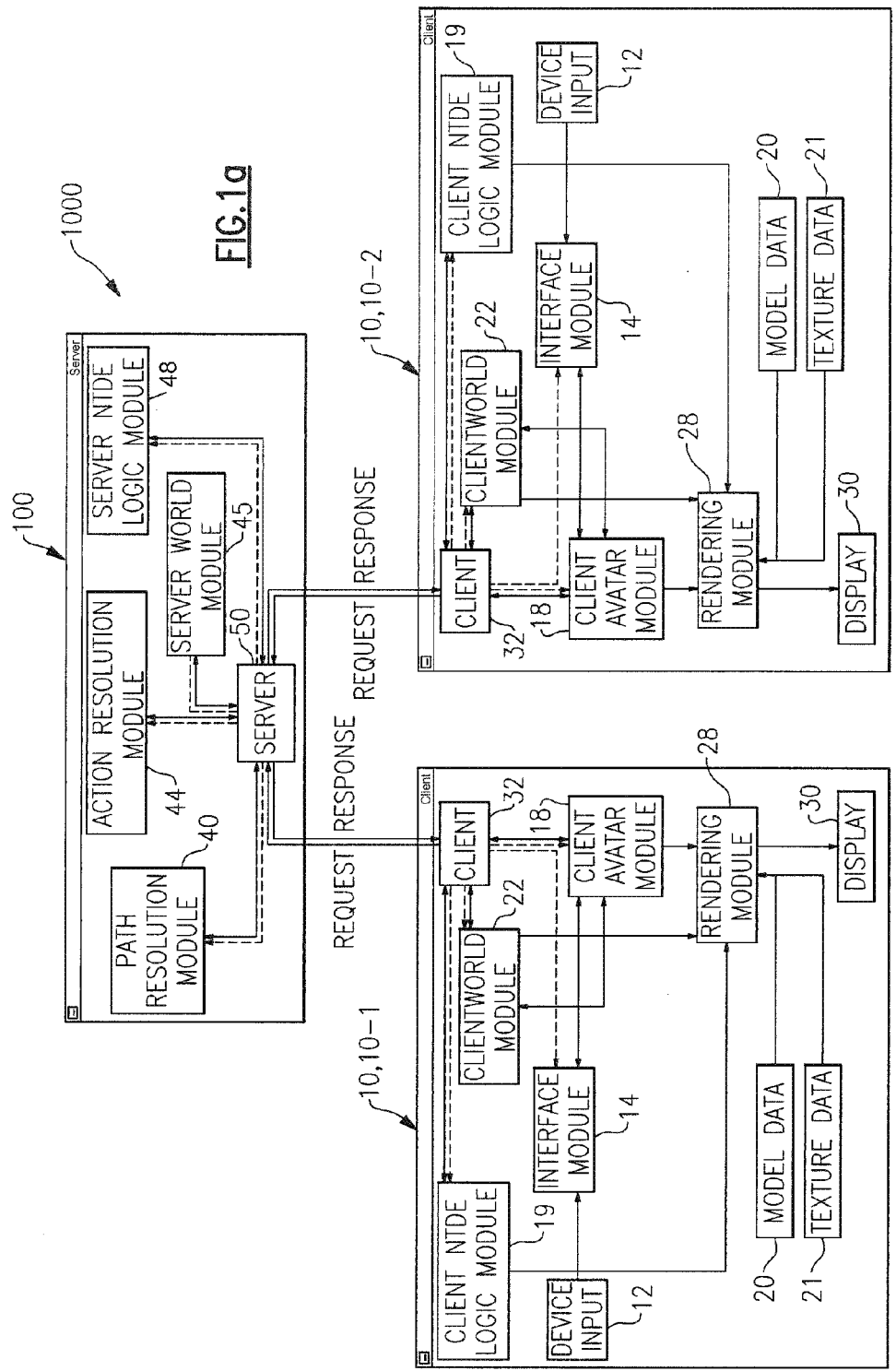
FIG. 1a is a block schematic diagram of a training apparatus.

A training apparatus in one embodiment can include a single trainee client computer for training a trainee. In another embodiment, a training apparatus can be provided that can include a plurality of networked computers, the networked computers including a plurality of trainee client computers, there being provided one trainee client computer for each trainee being trained with use of the training apparatus. A central server can be in communication with each client computer in one embodiment. In one embodiment an administrator client computer can be provided for use by an administrator. A central server can facilitate communication between an administrator client computer and one or more trainee client computers.

Each trainee client computer can have a rendering module that renders models on a display of each client. A plurality of models can be rendered including a trainee model associated with a controlled digital character for each trainee and model for each of one or more non-trainee digital entities such as digital characters having artificial intelligence (AI digital characters) and automatic digital machines. Models associated with a non-trainee digital entity can be regarded as work subject models. A work subject model can correspond to the work subject in relation to which the trainees are receiving training. For example, where trainees are receiving training relating to an equipment article in the form of a particular machine, the work subject model can correspond to the particular machine. Where trainees are receiving training in relation to a patient in a crisis condition, the work subject model can correspond to the patient in a crisis condition. Work subject models of the apparatus can also include models that are not associated with a non-trainee digital entity. Each model corresponding to a controlled digital character can have one or more associated animation routines. Each model corresponding to a non-trainee digital entity can also have one or more associated animation routines. Trainees using the apparatus can control the controlled digital characters to interact with at least one non-trainee digital entity corresponding to a real world non-trainee entity of the type the trainees are expected to interact with outside of a training session. A set of one or more computers of the apparatus can be regarded as a system of the apparatus.

For use in training a trainee respecting a work subject a trainee can be positioned at a trainee client computer configured so that the trainee can control animation routines for a model corresponding to himself or herself. On a display of the trainee client computer there can be rendered a work subject model corresponding to a work subject. If a trainee initiates a proper set of one or more commands a positive reinforcing animation routine can be run controlling rendering of the work subject model, and/or a positive reinforcing texture can be rendered for the work subject model. In addition, positive reinforcing messages can be displayed on the display screens of trainee client computers, and positive reinforcing model changes can also be rendered. A trainee is thereby trained respecting the work subject without costly investment in travel, physical props, professional lecturers and other trainers, training room rental fees and the like. More than one trainee can be trained contemporaneously utilizing the apparatus. Where first and second trainees are being trained, first and second trainee client computers can be provided. A first trainee can be positioned at the first trainee client computer and a second trainee can be positioned at the second client computer. The first and second trainees can control models corresponding to themselves utilizing user interfaces of the first and second trainee client computers. Each trainee may be presented a different first person perspective view of a common scene.

A training apparatus can include a simulation set up mode and a simulation run mode. In a simulation set up mode data can be entered into the apparatus determining operation of the apparatus in a simulation run mode. In a simulation run mode, rendering modules of the various trainee client computers can run animation routines to render various models in accordance with the animation routines. In a simulation run mode animation routines for trainee models can be responsive to commands initiated by trainees. The animation routines can include movement or action animation routines for trainee models that are run responsively to requests entered into one or more trainee client computer by one or more trainees. The animation routines can include various animation routines for one or more work subject models.

A training apparatus can include a powerful, highly featured administrator client computer for use by an administrator administering a simulation. The administrator client computer can have among other elements, a user interface, a display, and a rendering module. The administrator client computer can, in one embodiment be communicatively coupled to the central server. The administrator client computer can render on its respective display a scene of the present simulation including a rendering of trainee models corresponding to trainees being trained and/or a work subject model corresponding to a work subject for which the trainees are receiving training. The administrator client computer can be used to set up a simulation in a simulation set up mode and can also be used to alter a simulation during operation of the apparatus in a simulation run mode. The apparatus can be configured to allow an administrator, through use of the user interface of an administrator client computer to initiate commands to alter a simulation currently being run in a simulation run mode. Such functionality allows an administrator to increase the effectiveness of a training session. An administrator may wish to alter a simulation if an administrator by observation of the scene being rendered on its display determines that training of a worker or team of workers will be improved by such altering.

In one embodiment, a command initiated by an administrator for altering a simulation during operation of the apparatus in a simulation run mode can be a command resulting in a state change of a non-trainee digital entity corresponding to a work subject. Such a command may be, e.g., a command to change a state of a non-trainee digital entity or a command to change a present scenario of a simulation currently being run. When a scenario is changed, the states of several non-trainee digital entities of a simulation can be changed. When there is state change of a non-trainee digital entity, there can be run an animation routine for work subject model associated with the state change of a non-trainee digital entity. The animation routine run can be different from the most previously run animation for the work subject model and can be a certain animation routine associated with the state change. The running of an animation routine for the work subject model responsively to a command for altering a simulation at a trainee client computer alerts a trainee at the trainee client computer to the fact that a present simulation has been altered. There can also be enabled, responsively to a state change command, a set of animation routines for the work subject model different from the set of animation routines enabled for the work subject mode prior to initiation of the command to alter a simulation. Texture renderings for a model can also be differentiated between state changes.

A training apparatus can be configured so that a simulation being run can be recorded. In one embodiment an apparatus can maintain a record of state changes of a simulation, and an administrator client computer can be configured so that an administrator can alter a simulation by returning a simulation to a previous point using a user interface of the administrator client computer. A training apparatus can also incorporate live voice communication technology. When an administrator alters a simulation, the administrator can broadcast live voice messages verbally explaining the alteration to various trainees.

In one embodiment, an apparatus can include an administrator character mode of operation. In one embodiment, an apparatus can be configured so that a user administrator can enter an administrator character mode of operation initiating a command using a user interface of an administrator client computer. When the administrator character mode of operation is entered, an administrator model-corresponding to an administrator can be rendered on the trainee client computers and on the administrator client computer. The apparatus can be configured so that an administrator can control animation routines of the administrator model in a manner of a trainee controlling a trainee model. With such functionality an administrator has the capacity to demonstrate, by way of virtual demonstration, proper actions to be taken by trainees in the performance or a process relating to a work subject.

A training apparatus can be configured so that commands changing a view presented an administrator at an administrator client computer can be initiated. In one embodiment, by initiating a certain command using a user interface of an administrator client computer, an administrator can cause an administrator client computer to render on a display thereof the view currently being rendered for observation by trainee by a rendering module of one specific trainee client computer. By initiating another certain command, an administrator can cause the rendering module of the administrator trainee client computer to contemporaneously render on a display of the administrator client computer the views currently being rendered on each of the client computers of the apparatus. In one embodiment, an apparatus can be configured to record a simulation so that a simulation can be returned to any prior point.

An apparatus can also include and be in communication with a personnel database including parameters and additional information. The personnel database can include parameters such as name, sex (male or female), job title, salary, date of birth, education attainment, date of hire, simulation scores and the like. The personnel database can be a legacy database pre-existing the installation of a central server, trainee client computers and administrator client computers into the apparatus. The personnel database can be an enterprise database such as a corporation employee database, a government agency database, or other personnel database such as a hospital database for storing information respecting workers at a certain hospital, wherein workers of the hospital do not have a common corporate or government affiliation.

Information can be extracted from the personnel database and can be used by the apparatus. In one example, information extracted from the personnel database can be utilized to determine a set of possible enabled animation routines of a trainee model. In another example information extracted from a personnel database can be utilized to determine a characteristic of a trainee model and/or a texture of a model. A rendered trainee model can therefore have an appearance automatically determined by data extraction from a personnel database such that a rendered trainee model has an appearance based on the actual appearance of the trainee. A recollection of a trainee of can be expected to improve if there are rendered trainee models having appearances that resemble the actual appearance of such trainees. Animation routines and model characteristics (and/or model textures) for work subject models and administrator models can also be determined responsively to data extractions from databases in communication with the apparatus.

In one embodiment, the non-trainee digital entity can be programmed so that a desired animation change and/or attribute change of the digital non-trainee entity is yielded conditionally on the condition that one or more than one trainee controls his/her controlled digital character to interact with the digital non-trainee entity in a pre-specified manner. Trainees are thereby trained respecting the manner in which to interact with the real world entity corresponding to the digital non-trainee entity, and teamwork among the trainees is improved.

The apparatus finds use outside of a team training environment. For example, the apparatus is useful in training a single trainee, and does not have to be used for training purposes. Further, while the apparatus in one embodiment can include a plurality of computers the apparatus in another embodiment can comprise a single stand alone computer such as a single PC.

In one embodiment a rendering module of each trainee client computer is a three dimensional (3D) rendering module that renders 3D models on a display. The rendering module in another embodiment can be a 2D rendering module rendering 2D models on a display. The apparatus can further be configured so that when a trainee at a trainee client computer e.g., registers into a training session, a model corresponding to a trainee is rendered on the display of one or more of the networked trainee client computers. The controlled digital character of each trainee client computer can be represented at the camera position of the world scene displayed by each computer so that each trainee is presented a first person view of a training world. Where a trainee controlling a controlled digital character is presented with a first person view of a training world, then typically a model corresponding to that controlled digital character is not rendered or else a rendered model corresponding to the controlled digital character consists only of extremities (e.g., an arm) so that a live view the trainee will encounter in the real world is simulated. By presenting each trainee a unique first person view of a training world, an event (such as an action by a non-trainee entity) that is simulated by the apparatus is more likely to be recalled when the trainee encounters the simulated event in the real world. The rendering of 3D models on a display screen during a training session, including 3D models of human characters also increases the likelihood that an event simulated by the apparatus will be recalled by a trainee when the trainee experiences the event in the real world. Apparatus 1000 replicates the experience of a live training seminar wherein non-trainee real world entities (such as props and human actors) are provided for reinforcing lessons of the training seminar except that all of the problems typically associated with such seminars, including time and travel costs, are dramatically mitigated or eliminated.

Apparatus 1000 can be regarded as having (comprising, including) a controlled digital character where the apparatus is programmed so that animation of a particular model having one or more associated animations (e.g., action or motion animations) can be controlled by a trainee user input (e.g., an input into apparatus 1000 by a trainee using input device 12). Apparatus 1000 can be regarded as having a non-trainee digital entity where the apparatus includes programming controlling animations and/or texturing of a model other than a trainee model. In one example of such programming, such programming can include an object oriented programming object having an attribute defining a state. In one example of a non-trainee digital entity, apparatus 1000 can be regarded as having a non-trainee digital entity where the apparatus is programmed so that a digital entity of the apparatus has a multitude of possible responses to a common event. A digital entity of apparatus can represent, e.g., a character (such as a human character, humanoid character, non-humanoid character, and the like) or an article (such as articles of equipment, e.g., a tool, utensil, machine, furniture, and the like). Non-trainee digital entities can be regarded as autonomous digital entities. As explained herein, non-trainee digital entities can correspond to models other than trainee models controlled by trainees.

II. Schematic Diagram and Elements of Operation

Figure 1B:
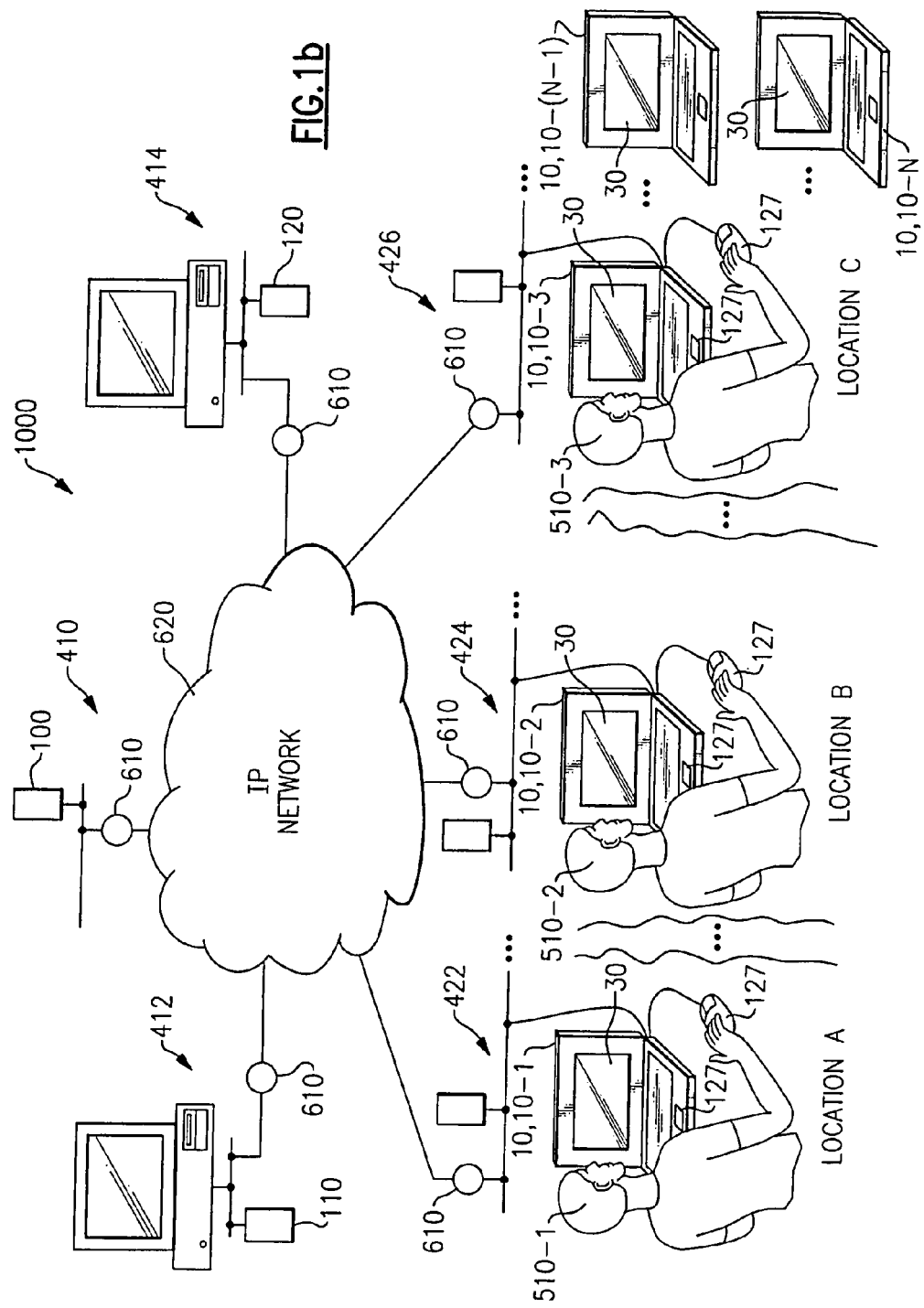
FIG. 1b is a physical schematic of a training apparatus in a wide area network implementation. In the specific embodiment of FIG. 1b, all trainee client computers and a central server are disposed externally and remotely relative to one another.
Figure 1D:
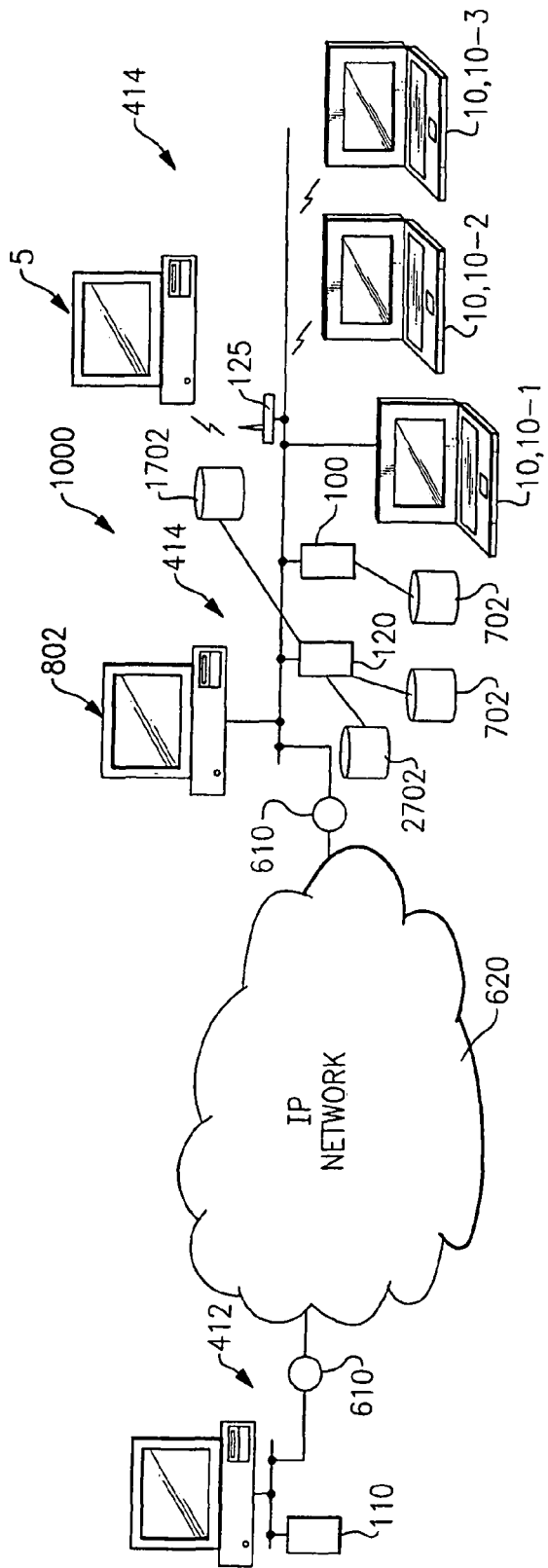
FIG. 1d illustrates another embodiment of an apparatus. In the embodiment of FIG. 1d, a central server, a plurality of trainee client computers, and an administrator client computer are all disposed as part of a common LAN disposed at a facility maintained by an enterprise, such as business entity commissioning the use of the apparatus for training workers. It is indicated in the view of FIG. 1d that computers of the apparatus can be in wireless communication with one another. In the embodiment of FIG. 1d, a central server, an administrator client computer, and several trainee client computers are disposed externally relative to one another in a common local area network.
Figure 1E:
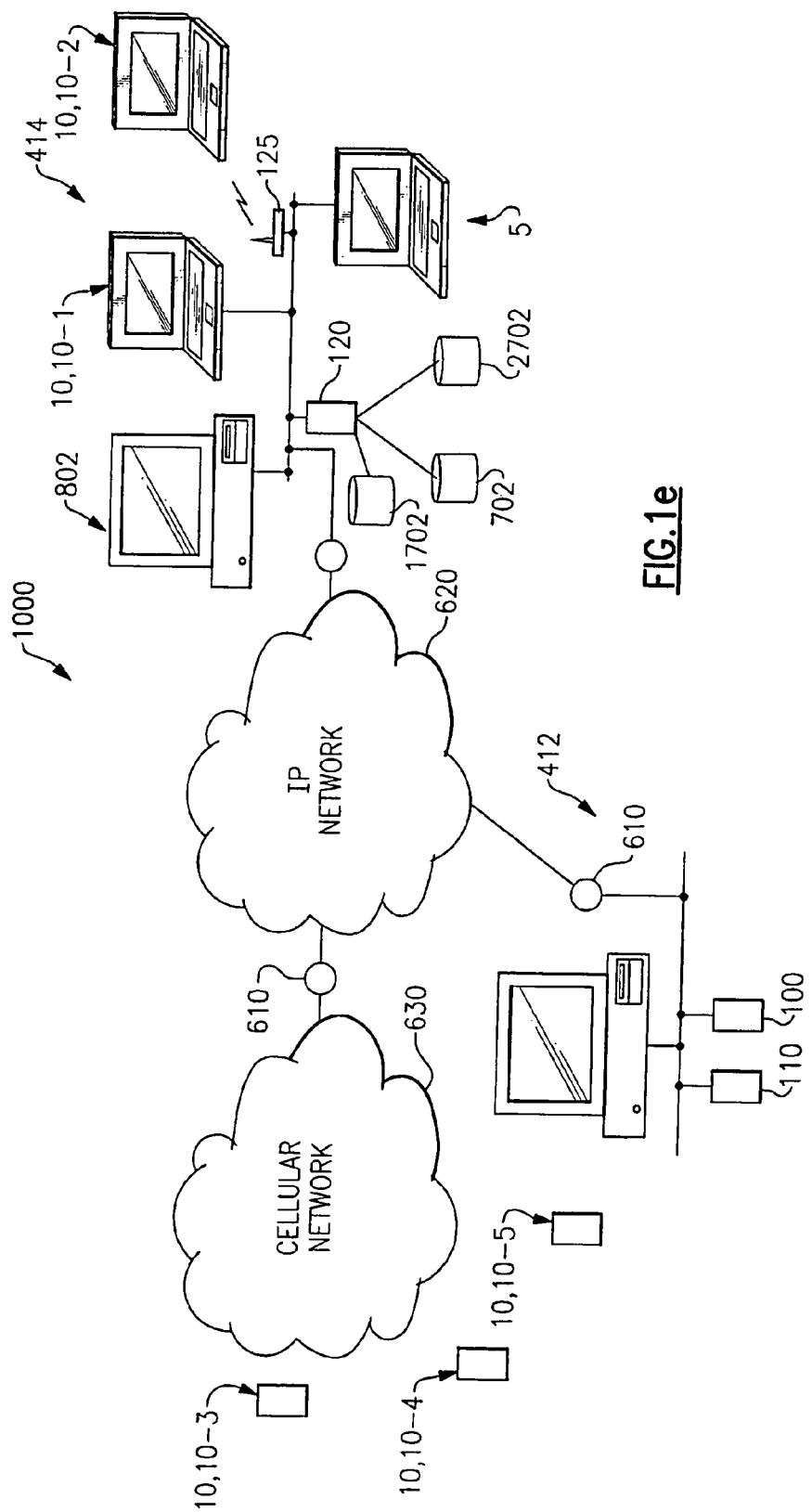
FIG. 1e illustrates another embodiment of an apparatus in which a central server is in communication with a plurality of trainee client computers through a cellular network. In the embodiment of FIG. 1e, it is illustrated that computers of the apparatus can be provided by hand held mobile cellular telephones.

A block diagram of the apparatus in one highly particularized embodiment is shown in FIG. 1a and a schematic view of apparatus 1000 in one possible implementation is shown in FIG. 1b. Apparatus 1000 can include one or more trainee client computers (clients) 10 and server 100. A workforce training network of apparatus 1000 can be regarded as including trainee client computers 10 and central server 100, sometimes referred to herein simply as "server 100." There may be provided a trainee client computer for each trainee trained with use of the apparatus. Each client 10 and server 100 can have a plurality of processing modules. Specifically, each client 10 can include an interface module 14, a client avatar module 18, a client non-trainee digital entity module 19, a client world module 22, and a rendering module 28 for rendering three dimensional images on a display 30. Referring to server processing modules, server processing modules can include path resolution module 40, action resolution module 44 and non-trainee digital entity logic module 48 (e.g., a patient logic module). Each trainee client computer 10 can also include an input device 12, a display 30 model database 20 and a texture database 21. Server 100 can have a server program 50, and each trainee client computer can have a client program 32. Dotted arrows between server program 50 and various server processing modules indicate that the server program can instantiate the various server processing modules. Dotted arrows between client program 32 and various client programming modules indicate that the client program can instantiate the various client processing modules. A brief description of several of the above modules and other components is provided herein. Where apparatus 1000 is incorporated into a single computer, all of the above processing modules can be incorporated into the single computer. In the embodiments of FIGS. 1c-1e, apparatus 1000 further includes an administrator client computer 5, a personnel database 702, and a work station computer 802 for accessing and viewing contents of database 702. Work station computer 802 has database client software allowing access and viewing of data of database 702. The database client software can format database data for viewing, e.g., present the data in a formatted display screen.

Apparatus 1000 can be implemented with use of 3D engine software toolkit (3D engine) which in addition to including rendering module 28, includes a plurality of preformed classes for use in making objects aiding in the process of rendering 3D models. One class of a typical 3D engine software toolkit is a class for making a node indicating object (node object) for use in rendering models. A node object can store a plurality of attributes associated with each model to be rendered (e.g., a coordinate position, rotation and size). A node object can also have a number of methods that are messaged during the course of a simulation. Methods of a node object include such methods as methods for getting data (e.g., "get coordinate position") and for changing data (e.g., "set x position to new position"). In rendering a model, rendering module 28 reads and processes node objects for a model in combination with model data for the model. A collection of node objects in a hierarchical structure creates a graph of the relative transformations of each node object. The above data structure is sometimes referred to as a scene graph with the root of the graph being the point of reference for all other node objects. In addition to being used by rendering module 28 during the rendering process, model data of a model is used at the time of initiating data of a node object. It has been mentioned that node objects are responsive to position update messages. For establishing of model animations, routines are run for updating a node object position over set period of time. An exemplary sample list of attributes and methods that can be associated with a node object of a 3D game engine is presented herein in Table A.

TABLE A

| Attributes: |
| --- |
| Position |
| Rotation |
| Size |
| Shear |
| Color |
| Texture |
| Scene graph parent/children |
| Rendering bin |
| Rendering effects |
| Lighting/lighting effects |
| Fog effects |
| User defined tags |

TABLE A-continued

| Methods: |
| --- |
| Get the position coordinates |
| Get the position of this relative to another |
| Get the x coordinate of the position |
| Set the y coordinate of the position to a new value |
| Set the relative rotation |
| Get the transformation |
| Get the net transformation relative to the scene graph root |
| Has the transparency flag been set? |
| Has a texture been set? |
| Change the texture |
| Compare the sorting order of this to another |
| Stop rendering in the rendering module |
| Start rendering in the rendering module |
| Remove from the scene graph |
| Change the scene graph hierarchy |

Referring to node objects with greater particularity, more than one node object is normally provided for each model to be rendered. The plurality of node objects represent a particular geometry for each model to be rendered. Each model to be rendered is normally given a parent or "root" node object and a plurality of descendant node objects such that messages to a root node object are inherited by the descendant node objects. For animations involving a full model (e.g., turning) messages can be sent to a root node object for the model and the messages can be inherited by descendant node objects. For animations involving less than a full model (e.g., movement of a limb) messages can be sent to a descendant node object (which is inherited by child node objects of the descendant node object) without sending a position update message to the root node object. In one embodiment, apparatus 1000 can be developed with use of the PANDA 3D engine originally written by WALT DISNEY. In the PANDA 3D engine, a class known as the node path class is provided as a handle to a node object. Other 3D engines can be used in the development of apparatus 1000 such as TORQUE available from GARAGE GAMES and the UNREAL ENGINE available from EPIC GAMES. 3D engines normally are provided with a command that initializes root node objects and descendant node objects for each model to be rendered.

A number of different perspective toolkits can be used to develop 3D models to be rendered by apparatus 1000. One such toolkit is the MAYA modeling toolkit available from ALIAS. Another modeling toolkit is 3D STUDIO MAX available from AUTODESK. Digital imaging software can also be used such as PHOTOSHOP by ADOBE, for use in developing model textures.

Figure 3A:
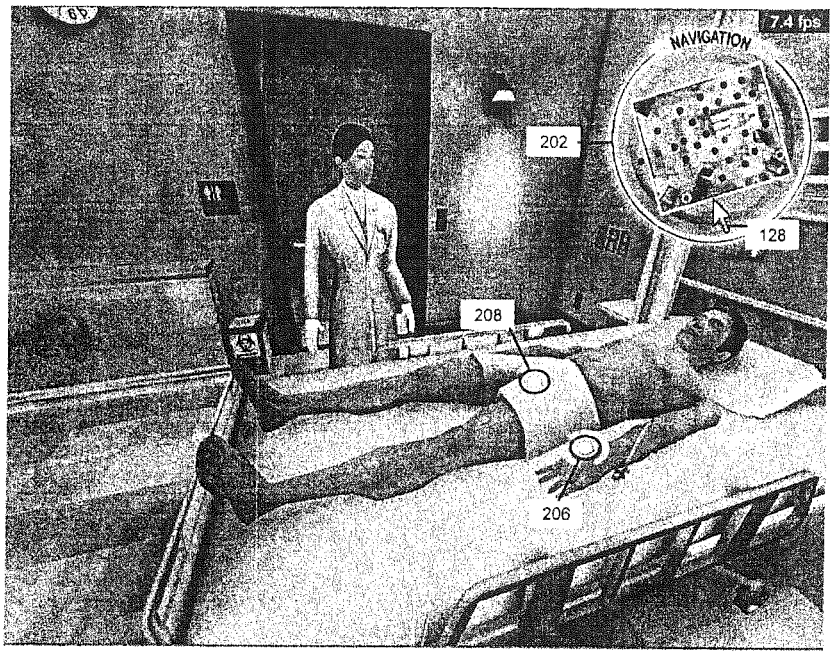
FIGS. 3a-3d are a series of screen shots illustrating rendered 3D worlds that can be rendered on displays of trainee client computers of the apparatus or on a display of single computer if the apparatus comprises a single computer.
Figure 3B:
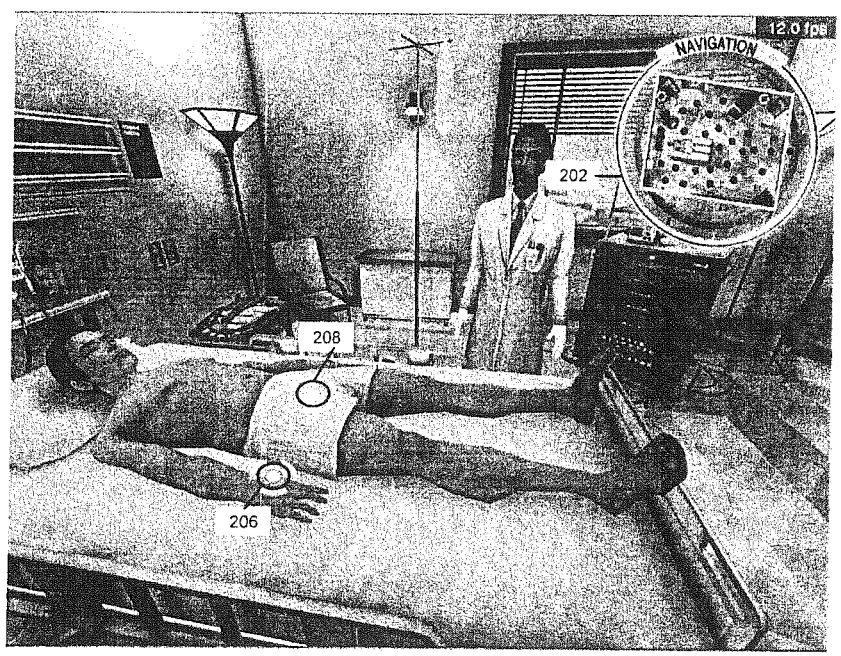

Referring again to the processing modules of FIG. 1a, interface module 14 receives trainee input from an input device 12 such as a pointer controller 127 (e.g., mouse, trackball), joystick, and keyboard to move a digital controlled character and translates such input into a destination request or an action request. A trainee client computer 10 in accordance with interface module 14 can display on display 30 a navigation window 202 enabling a trainee client computer 10 to define a destination request. Navigation window 202 in the view of FIGS. 3a, 3b and 3d shows a top down (overhead) representation of a 3D training world being rendered in a perspective view. When a trainee with use of a pointer controller 127 moves a pointer 128 (FIG. 3a) and clicks on a desired destination in navigation window 202 interface module 14 can develop a destination request in accordance with the selection. Apparatus 1000 in accordance with interface module 14 can also display "hotspots" on display 30 within a rendered 3D world. In the view of FIGS. 3a and 3b and in the view of FIG. 3c, hotspots 206, 208, 210, 212, 214, 216, 218, 220 are displayed on display 30. Apparatus 1000 can be configured so that clicking on of a specific hotspot results in a certain action request being made.

It is expected that apparatus 1000 will find use among trainees with little or no prior computer experience. Accordingly, while more complex animation controls in some embodiments are desirable, apparatus 1000, in one embodiment, can be equipped with an easily mastered and easy to use trainee client computer user interface for controlling animations of trainee models. In one embodiment, destination requests and action requests can be initiated by one or more trainees at the one or more trainee client computers by way of actuation of hotspots.

By way of example, referring to the first trainee client computer view of FIG. 9a, the first trainee client computer can display hotspots 920 and 921 and the second trainee client computer can display hotspots 922, 923, 924, 925. Apparatus 1000 can be configured so that apparatus 1000 selectively displays hotspots for enabling initiation of an action request conditionally on the condition that the action state associated with the action request is available for occupation. Thus, apparatus 1000 can be configured to remove a hotspot if an action state associated with the hotspot is currently occupied by another controlled digital character.

Each hotspot 920, 921, 922, 923, 924, 925 in the example described corresponds to one particular action state some of which are listed in Table C. An action request can be initiated with a single actuation of a hotspot (e.g., a single mouse actuation comprising a single or alternatively double mouse click). The hotspots are displayed in specific areas of a scene that indicate their associated action. Thus, hotspots for initiating action requests relating to a specific work subject can be superimposed on a rendered model corresponding to the specific subject, and in some cases a specific area of a rendered model. In the example of FIG. 9a, hotspot 920 for initiating an apply defib pad action request is superimposed on a rendered patient model at a location of the model where pads are to be applied. Hotspot 922 for initiating a use defibrillation machine is superimposed in a rendered model corresponding to a defibrillation machine. When a hotspot is actuated to initiate an action request, a complex animation routine may be run. For example, if a "use defibrillation machine" action request is initiated by a second trainee operating second trainee client computer 10, 10-2, an animation routine may be run to cause rendered model 906 corresponding to the second trainee to crouch down to look at the machine.

In the specific example described, destination requests can be initiated using navigation window 202. Navigation window 202 can display a plurality of hotspots as shown. Each hotspot corresponds to certain destination position of a controlled digital character. In one embodiment the number of possible destinations of each controlled digital character can be limited to a limited discrete number of possible destinations (in the specific example of FIG. 3e, there are 27 possible destinations). While a larger number of possible destinations are desirable in some embodiment a small limited number of possible destinations is advantageous in other embodiments. A small number (e.g., less than 50, less than 30) of possible destinations simplifies use for trainee users reduces path resolution calculation requirements, and increases speed of the apparatus. When a trainee controls a controlled digital character to move to a new destination, a new view will be rendered on the trainee's trainee client computer and the trainee may be presented with a new set of hotspots that are enabled when the controlled digital character moves to the new destination. When a destination request is initiated by actuating a destination hotspot and then granted an animation routine can be run in which a model corresponding to the moving controlled digital character is caused to walk from a first location to a second location within a scene.

Still referring to the processing modules of FIG. 1a, client avatar module 18, (which may be alternatively termed a controlled digital character module), for each model corresponding to a controlled digital character introduced into a simulation can store a table correlating a plurality of animation routines for the model correlated with a plurality of action states. Each animation defines a set of transformations for node objects for a model over a period of time and each animation routine defines a set of one or more animations. Such a table as is represented in FIG. 2a can be distributed to each trainee client computer 10 for each trainee who has entered the simulation. An action routine can message a movement method or a combination of movement methods of a node object in a pre-defined manner over a period of time. An action state of client avatar module 18 can be changed. Client avatar module 18 manages requests for action state changes that are input by a trainee. For example, a request for a new action may be made with use of an input device 12, e.g., by clicking on a hotspot as described previously herein. Apparatus 1000 can be configured so that if a trainee at a specific client e.g., client 10-1 makes a request for its corresponding controlled digital character to perform a specific action, client avatar module 18 of that trainee client computer first determines if an animation routine is being run. If an action routine is not being run (i.e., the controlled digital character is idle) client avatar module 18 sends an action state request to server 100 for resolution of the action state request by action resolution module 44. If client avatar module 18 permits a particular controlled digital character to occupy a requested action state, and action resolution module 44 permits a requested action server 100 can send commands to a client avatar module 18 of each trainee client computer to play an animation (run an animation routine) for a particular controlled digital character corresponding to requested action state. When a routine corresponding to a requested action state has been run (i.e., an animation routine has been played) trainee client computer 10 triggers an event monitored for by action resolution module 44 at server 100 indicating that the animation routine has been completed. In response to the event indicating that an animation routine has been completed, action resolution module 44 can examine an action tree to determine whether to remain in the present action state or to return to a previous action state.

In addition to retaining an action state table correlating action states with action state routines for each controlled digital character, client avatar module 18 may also retain movement animation routines. Movement animation routines are run when a client receives from server 100 a command to move from a first location to a second location within a training world.

Now referring to action resolution module 44, action resolution module 44 resolves controlled digital character action state requests made by different trainees using different trainee client computers. Action resolution module 44 can retain a plurality of action state objects, each corresponding to a one action state defined by a simulation. Apparatus 1000 in one embodiment can be configured so that only one controlled digital character can occupy a given action state at a given time. An object can be provided for each possible action state. A sample of attributes and methods of an exemplary action state object is given in Table B below.

TABLE B

Attributes:

State (occupied or unoccupied)
List of transitions to other action nodes.
Methods:

Is this action node blocked in any way?
Is this action node occupied?
What other action nodes is this action node connected to?
Does this avatar have the right equipment to enter this action node?
Occupy this action node.
Vacate this action node.
Tell the client interface to display the hotspots for this action node.
Request a transition to this action node.
Complete a transition to this action node.

In response to receiving an action state request from a particular trainee client computer, e.g., client 10-1, server 100 can, if certain conditions are satisfied, send commands to the all trainee client computers 10-1, 10-2 . . . , 10-(N−1), 10-N to run an animation routine corresponding to the action state. In particular, server 100 in accordance with action resolution module 44 can send such commands if messaging of the appropriate action state object corresponding to the requested action state indicates that occupation of the requested action state is permitted. If server 100 grants permission to a particular controlled digital character to occupy a particular action state, action resolution module 44 messages the action state object to change its occupied status and sends appropriate animation commands to all trainee client computers 10-1, 10-2 . . . , 10-(N−1), 10-N. Each trainee client computer 10-1, 10-2 . . . , 10-(N−1), 10-N can then reference the appropriate animation routine in accordance with Table 2a and then run the appropriate animation routine corresponding to the granted action state for the particular controlled digital character. When such animation routines are completed each trainee client computer can trigger an event monitored for by action resolution module 44 indicating completion of an action routine. Server 100, if determining that the action state should be vacated can message the appropriate action state object to change its state from occupied to unoccupied. It should be noted that while a pair of trainee client computers e.g., computers 10-1, 10-2 may, at a given time, be playing animations corresponding to a particular controlled digital character occupying a particular action state, the animations may appear very different on the first and second computers in one embodiment. The animations may appear different in one embodiment since, as has been mentioned, the trainee at each trainee client computer may be presented with a different first person view of a training world.

In one particular embodiment of apparatus 1000, apparatus 1000 can simulate a patient in a crisis condition. Where apparatus 1000 simulates a patient in crisis condition, a non-trainee digital entity of apparatus 1000 is a representation of a patient programmed with artificial intelligence (an AI non-trainee digital character). When trainees enter a simulation including a patient AI non-trainee digital character, trainees can be represented as patient crisis team members, i.e., "patient crisis team" controlled digital characters in the simulation. Exemplary sample action states that may be occupied by a controlled digital character in an illustrative simulation in which controlled digital characters are represented as crisis team members is given by Table C below. Apparatus 1000 can be configured to process any action state request by displaying a hotspot on a display in the manner described herein.

TABLE C

Access orange bag
Administer drugs to IV
Assess/clear airway
Check breathing
Check heartbeat
Check pupils
Chest compressions
Defibrillator interface (access of)
Defibrillate
Give/receive object
Move
Open/close crash cart drawers
Pick up chart
Pick up object from bed corner
Pick up object on crash cart
Place backboard
Place defibrillator pads
Place object on bed corner
Place object on crash cart
Read chart
Remove med from crash cart drawer
Roll patient
Squeeze BVM
Take carotid pulse
Take femoral pulse
Take radial pulse
Talk to patient
Turn in place
Turn to face bed from crash cart
Turn to face crash cart from bed
Zoom into face In some action states that can be occupied by a controlled digital character, the controlled digital character interacts with a non-trainee digital character. Such action states often cause attributes (including state) of a non-trainee digital entity to change and cause a certain animation routine of the non-trainee digital entity to be run as will be described later herein. In other action states that can be occupied by a controlled digital character, the controlled digital character interacts with an equipment article in the training world. The occupation of such an action state can result in a command to run an animation routine by a client avatar module in which a node object for the equipment article model is parented to a character model node object.

In still another action state that can be occupied by a controlled digital character, the controlled digital character can pass an article (such as an article of equipment) to another controlled digital character. For enabling a first controlled digital character to pass an article of equipment to a second controlled digital character apparatus 1000 can be configured so that apparatus 1000 examines the current action state of both controlled digital characters to determine if a passing action is permissible. If by examining the action state of a pair of controlled digital characters apparatus 1000 determines that a passing action is permissible, apparatus 1000 can send an animation command to trainee client computers 10 causing an animation routine to be run wherein controlled digital characters carry out a passing action.

By practicing passing of an article of equipment to one another in a digital training world team members of a training team learn to cooperate with one another, and are likely to cooperate with one another when encountering a real word event outside of the simulation provided by apparatus 1000.

While action resolution module 44 of server 100 is provided to resolve action state requests received from various trainee client computers 10-1, 10-2 . . . , 10-(N−1), 10-N, path resolution module 40 of server 100 resolves destination requests received from the trainee client computers of apparatus 1000. When a trainee or other person operating a trainee client computer makes a destination request, client avatar module 18 may preliminarily examine the request to determine if the request is permissible. For example, client avatar module 18 may determine that the request is not permissible if client avatar module 18 is running a movement animation for the controlled digital character associated with the trainee client computer. If client avatar module 18 preliminarily determines that destination request is permissible, client avatar module 18 sends a destination request to server 100 for resolution by path resolution module 40.

It has been mentioned that a trainee can define destination requests using navigation window 202 superimposed on a rendered training world rendered on one or more trainee client computers. Referring to the view of FIG. 4a, an aspect of use of navigation window 202 is further described. In the view of FIG. 3e possible positions, e.g., positions 0, 1 . . . , 27, that may be occupied by a controlled digital character are shown with index numbers (i.e., 0 through 27) superimposed therein. Predefined paths, e.g., paths 226, 228, 230, 232 are illustrated in the view of FIG. 3e. The index numbers and predefined paths are not included in the navigation window 202 as shown in FIG. 3a but are useful in illustrating a feature that can be incorporated in apparatus 1000. Apparatus 1000 can be configured so that when a trainee makes a destination request using pointer controller 127 to click on a specific point of navigation window 202, interface module 14 sends the selected indexed location to the client avatar module 18. Trainee client computer 10 if permitted by client avatar module 18 transmits the selected indexed location as a destination request to server 100.

Figure 4A:
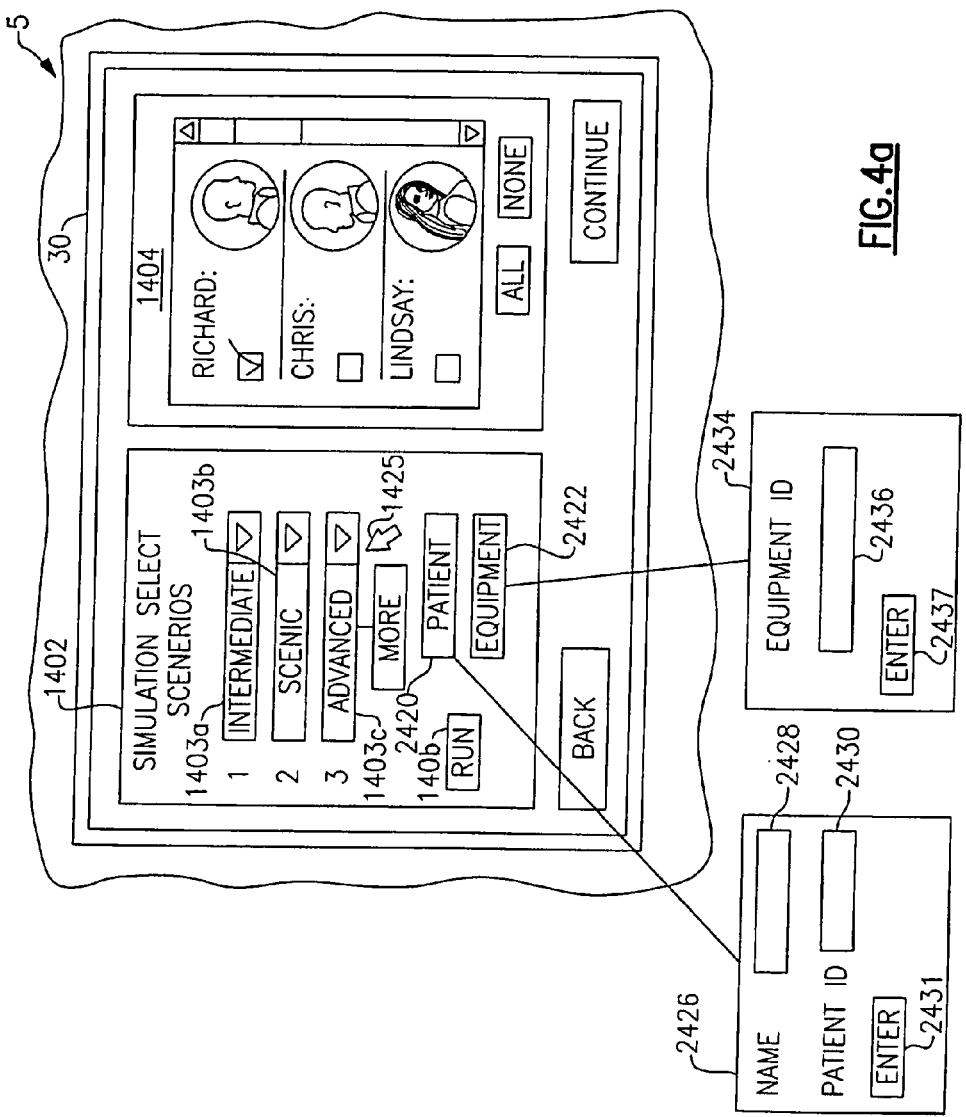
FIG. 4a is an exemplary graphical user interface display screen that may be rendered on a display of an administrator client computer during a simulation set up mode for setting up a simulation.

In resolving destination requests, path resolution module 40, which retains the predetermined indexed location and predetermined path data of FIG. 4a determines whether the indexed location is occupied. If the indexed location is not occupied, path resolution module 40 determines the shortest unimpeded path between the current location and the requested location of a controlled digital character, and commands trainee client computers 10-1, 10-2 . . . , 10-(N−1), 10-N to play a movement animation for the controlled digital character making the destination request in accordance with the shortest predetermined path information (that is, an animation routine is run to move the digital character along the selected predetermined path). The shortest path calculation is rapidly made since there are a limited number of predetermined paths. Further, a digital controlled character (controlled digital character) is caused to play an animation (run an animation routine) corresponding to movement along a predetermined path with use of limited data transfers (i.e., a single command to move along a predetermined path) between a server and client. Trainee client computers 10-1, 10-2 . . . , 10-(N−1), 10-N therefore are able to reliably play animations corresponding to movement request, in spite of such potential problems as limited computational speed of the server 100 and faults in the network connection between the server 100 and trainee client computers 10. It is seen that after server 100 sends an animation movement command to move a controlled digital character along a predetermined path, the animation routine can be run to move a controlled digital character along the predetermined path without there being required further data transfers between server 100 and client after the animation routine has commenced. In the time that an animation routine is run to move a controlled digital character along a path, each trainee client computer 10 can render tens to hundreds of frames on display 30 to create the motion animation without receiving any position data from server 100.

Referring now to non-trainee digital entity logic module 48 (NTDE logic module), non-trainee digital entity logic module 48 controls animation determining state changes and attribute (data) changes of a non-trainee digital entity of apparatus 1000. Non-trainee digital entity logic module 48 can include an object having a set of attributes and methods that can be messaged. When action resolution module 44 permits a controlled digital character to occupy a certain action state object (action state), an event can be triggered which is monitored for by non-trainee digital entity logic module 48. In response to such an event a message can be sent to an object of the non-trainee digital entity logic module 48 to update one or more attributes of the non-trainee digital entity including the state of the non-trainee digital entity. Also in response to such an event, non-trainee digital entity logic module 48 determines whether an animation routine for a model associated with the non-trainee digital entity is to be run. Apparatus 1000 can be configured so that non-trainee digital entity logic module 48 can determine that an animation routine should be run if an event results in a state change and can determine that an animation routine should be run independent of a state change. If non-trainee digital entity logic module 48 determines that a certain animation routine for a non-trainee digital entity logic module is to be run, non-trainee digital entity logic module 48 can send an animation command to client NTDE module 19 of each computer 10-1, 10-2 . . . , 10-(N−1), 10-N. As is indicated by FIG. 2b, client NTDE module 19 can include a table correlating a set of animation commands with a set of animation routines, enabling the trainee client computers to run an appropriate animation routine for a non-trainee digital entity when receiving an animation command from server 100. Like the animation routines run by client avatar module 18 such animation routines can run for a predetermined time period and trigger an event monitored for by server 100 when complete. A set of exemplary sample attributes and methods of an object of a non-trainee digital entity logic module 48 where a non-trainee digital entity represents a patient in crisis condition is presented in Table D.

TABLE D

| Attributes: |
| --- |
| State (healthy, not healthy, dead) |
| Current heart rate |
| Heart rate of patient if it were healthy |
| Breathing status |
| Heart status |
| Breathing rate |
| Diastolic blood pressure |
| Systolic blood pressure |
| Time the patient has been in crisis |
| Dictionary of medications applied and time they were given |
| Times of compressions given to patient |
| Times when air was squeezed from the BVM |
| Methods: |
| Update number of compressions |
| Update dictionary of compressions |
| Transition between states |

Apparatus 1000 can be configured so that a desired change of an attribute and/or animation of a non-trainee digital entity is produced conditionally on the condition that one or more controlled digital characters are controlled to occupy a certain action state or certain action states. For example, where a non-trainee digital entity represents a patient, non-trainee digital entity logic module 48 can be configured so that a heart rate of a represented patient improves when a defibrillation (defibrillate) action (Table C) is occupied by a controlled digital character. Non-trainee digital entity logic module 48 can also be configured so that a breathing rate of a represented patient improves when a "clear airway" action state is occupied by a controlled digital character. Non-trainee digital entity logic module 48 can also be configured so that an animation of a non-trainee digital entity changes when an action state of a controlled digital character is changed. For example, non-trainee digital entity logic module 48 can be configured so that when a defibrillation action state is occupied by a controlled digital character, a specific animation command corresponding to the action state is sent to trainee client computers 10-1, 10-2 . . . , 10-(N−1), 10-N. Specifically, non-trainee digital entity logic module 48 can be configured so that an animation routine to make a patient model move in a specific manner (e.g., to wave arms) is run when a defibrillation action state is occupied by a controlled digital character.

Apparatus 1000 can be configured so that a desired attribute and/or animation change of a non-trainee digital entity is produced conditionally on the condition that more than one controlled digital characters are controlled in a coordinated manner. For example, non-trainee digital entity logic module 48 can be configured so that in response to a first controlled digital character being controlled by a first trainee at a first computer e.g., computer 10-1 to occupy a clear airway action state in combination with a second controlled digital character being controlled by a second trainee at a second computer e.g., computer 10-2 to occupy a "squeeze bag-valve-mask-resuscitator" (BVM) action state, a breathing rate of the non-trainee digital entity changes to a desired level and an animation determining state of the non-trainee digital entity is changed so that a certain animation is played (e.g., an animation routine for the model is changed from a "not healthy" state animation routine in which the model shivers with eyes closed to a "healthy" state animation in which the model lies in a stable position with eyes open). In another example, non-trainee digital entity logic module 48 can be configured so that in response to a first controlled digital character being controlled by a first trainee at a first computer to occupy a "place backboard" action state in combination with a second controlled digital character being controlled by a second trainee at a second computer to occupy a defibrillation action state, a heart rate of the non-trainee digital entity changes to a desired level and an animation command is sent to client NTDE module 19 so that a certain animation is played (i.e., an animation routine for the non-trainee digital entity model can be run to make the model wave its arms). To the end that an animation routine run in client NTDE module 19 and/or an attribute change of a non-trainee digital entity is conditional on the condition that first and second controlled digital characters are controlled in a coordinated manner, an appropriately configured action tree can be provided in action resolution module 44. In particular, an action tree can be provided in action resolution module 44 having a first action node and a second event triggering action node, wherein occupation of the second event triggering action node is blocked unless the first action node is occupied. Action trees can be developed so that a desired attribute change and/or animation change of a non-trainee digital entity is yielded conditionally on the condition that 3, 4 or N controlled digital characters are controlled in a coordinated manner.

It has been mentioned that apparatus 1000 can be configured so that only certain action states trigger events that are monitored by non-trainee digital entity logic module 48. In a further aspect, apparatus 1000 can be configured so that a manner in which non-trainee digital entity logic module 48 responds to an event varies depending on a state of a non-trainee digital entity. For example, where a non-trainee digital entity represents a patient, the non-trainee digital entity can have several states including a healthy state, a not healthy state, and dead state. Apparatus 1000 can be configured so that: (i) if a defibrillation action state is occupied when a patient is in a healthy state, a certain vital sign attribute (e.g., heart rate) of the patient worsens (changes from a desirable to undesirable value); (ii) if a defibrillation action state is occupied when a patient is in a not healthy state, a vital sign attribute (e.g., heart rate) of the patient improves (changes from an undesirable to a desirable value); and (iii) if a defibrillation action state is occupied when a patient is in a dead state, a vital sign attribute (e.g., heart rate) remains the same (stays at 0). Apparatus 1000 can therefore include a digital entity having a multitude of possible responses to a common event. Where a non-trainee digital entity can have a multitude of possible responses to a common event the non-trainee digital entity can be regarded to an artificially intelligent (AI) digital entity. A set of animation routines that are enabled to be run by apparatus 1000 for a work subject model can also be differentiated depending on the state of a non-trainee digital entity. In Table E there are summarized various animation routines that can be run by apparatus 1000 during each of the various states of a non-trainee digital entity in the example where the non-trainee digital entity corresponds to a patient.

TABLE E

| State | Animation Routines | Texture |
|---|---|---|
| Healthy | idle_healthy<br>breathe_normal<br>mouth_yawn<br>mouth_open<br>mouth_close<br>eyelids_blink<br>eyelids_open<br>eyelids_close<br>defib_shock | skin_healthy<br>eyes_healthy |
| Troubled | idle_troubled<br>breathe_normal<br>breathe_heavy<br>cough_dry<br>cough_loose<br>convulse<br>mouth_open<br>mouth_close<br>eyelids_blink<br>eyelids_open<br>eyelids_close<br>defib_shock | skin_healthy<br>skin_pale<br>skin_flushed<br>eyes_healthy<br>eyes_bloodshot |
| Dead | idle_dead | skin-dead<br>eyes-dead |

Referring to Table E, apparatus 1000 can enable a different set of animation routines for a model corresponding to a non-trainee digital entity when a non-trainee digital entity changes state. Referring to the "textures" column of Table E, apparatus 1000 can also enable a different set of textures when changing state and a different set of textures for a model corresponding to a non-trainee digital entity when a non-trainee digital entity changes state. When a new state is entered and at other times during a state occupation (such as times where another animation routine is not running) apparatus 1000 can be configured to run an idle animation routine for the state. Apparatus 1000 can be configured to render state associated textures for a model throughout a time a certain state of a non-trainee digital entity corresponding to the model is occupied.

A virtual world having plurality of rendered models is shown in the view of FIG. 3d. The models rendered in the view of FIG. 3d include rendered models 304, 306, 308, 310, 312, 314 and 316 corresponding to controlled digital characters, rendered model 350 corresponding to a non-trainee digital entity (in the particular embodiment shown corresponding to a non-trainee digital character), rendered models 342 and 343 corresponding to equipment articles that can be moved or otherwise interacted with by control of a controlled digital character. The view of FIG. 3d also shows rendered model elements 344, 346, 374, and 372 and the room 376 which are programmed to not be interacted with and are therefore regarded as the "environment" of the digital world.

In order to render all models in their proper location, server 100 can include world module 45 and trainee client computer 10 can include client world module 22. World module 45 can be created on server 100 and may be mirrored onto each trainee client computer 10 in the form of client world module 22. World module 45 and client world module 22 define the environment of a digital (virtual) training world in order to maintain track of locations that are not permitted to be occupied. In addition, world module 45 and client world module 22 can maintain a record of the location of all equipment articles in a digital world so that they are rendered in proper positions. Further, client world module 22 can run animation routines for equipment articles. It should be noted that apparatus 1000 can be programmed so that a digital entity corresponding to an article of equipment has a multitude of possible responses to a common event. For example, an entity corresponding to an article of equipment can be programmed so that the entity (i) has states, and (ii) the response of the entity to a particular event depends upon the state. Where an entity corresponding to an equipment article can have a multitude of possible response to a common event the equipment article can be regarded as a non-trainee digital entity having artificial intelligence (AI).

Figure 3C:
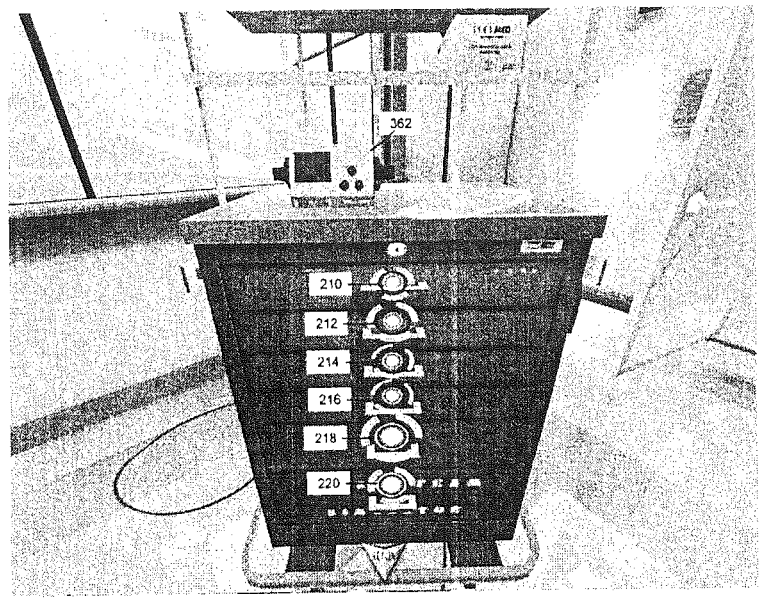
Figure 3D:
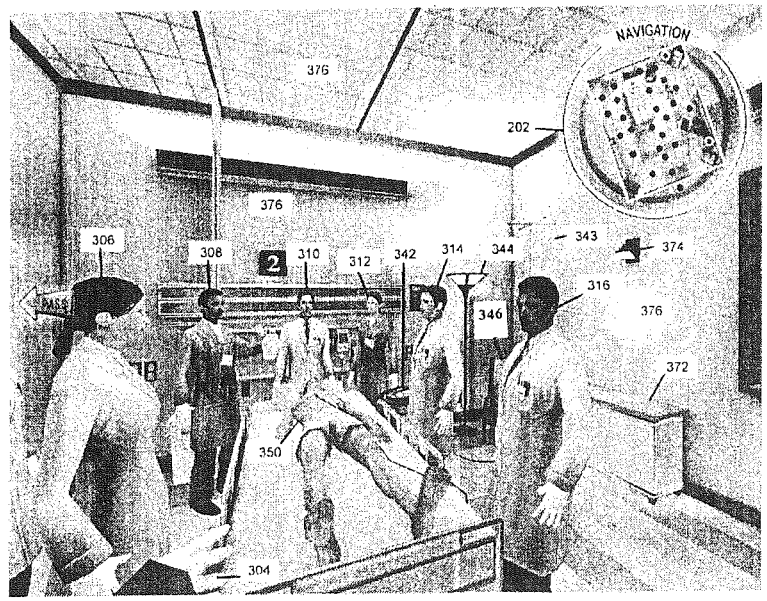
Figure 3E:
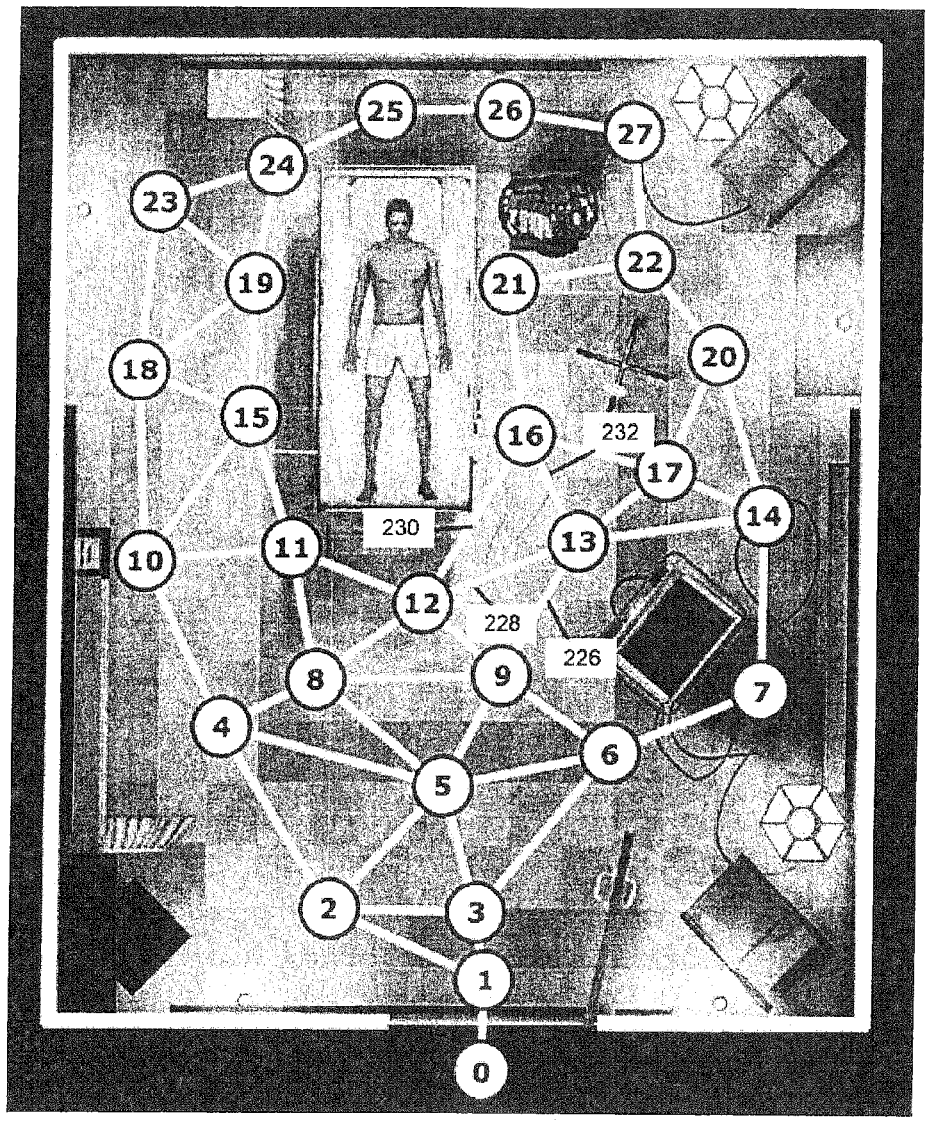
FIG. 3e is a destination map illustrating a path resolution feature in one specific embodiment.

In the view of FIG. 3c, there is shown a rendered model 362 corresponding to an equipment article in the form of a defibrillation machine. Apparatus 1000 can be configured so that the digital entity corresponding to rendered model 362 is a non-trainee digital entity having a multitude of possible responses to a common event and therefore may be regarded as AI digital entity. Logic for determining attribute changes including state changes, and animation routine changes of such a non-trainee digital entity can be incorporated into a non-trainee digital entity logic module.

Models can be defined for each digital entity introduced into a digital world, including each controlled digital character and each non-trainee digital entity. Such models can be created using modeling tools such as MAYA, a polygon-based modeling software package available from ALIAS. For each controlled digital character, model database 20 can store three models; a first person model, a third person model, and a map representation model. The models can be 3D models or 2D models. When a trainee enters a simulation, a third person model for that trainee can be loaded into trainee client computers other than the one the trainee is using in a manner that is consistent with characteristics of that trainee. When entering a simulation, a trainee client computer, e.g., computer 10-1 may present a trainee a graphical user interface display screen allowing the trainee to select a specific third person model consistent with characteristics of that trainee. Such characteristics can include, e.g., the role of the trainee in the team being trained (doctor, nurse), sex, height, etc. Model characteristics (including complete models) can be determined by extracting parameter data from a personnel database.

3D engines such as PANDA 3D and TORQUE have rendering modules for rendering 3D models onto a 2D display 30. Rendering module 28 processes data of each model node object and processes data of each model data in rendering each model on display 30. Referring to FIG. 3d, the rendered digital training world shown in FIG. 3d has a plurality of rendered 3D models. Rendered 3D model 304 corresponds to the controlled digital character controlled with use of the trainee client computer executing the rendering shown in FIG. 3d, while rendered models 306, 308, 310, 312, 314, 316 correspond to controlled digital characters controlled with use of other trainee client computers of apparatus 1000. The rendered training world also has rendered models such as rendered module 342 corresponding to an equipment article, and rendered model 350 corresponding to a non-trainee digital entity which in the particular embodiment illustrated with reference to the view of FIG. 3d is a model of a patient in a crisis condition. Rendering module 28 can render models of a digital world at a selected frame rate, e.g., 30 frames per second (FPS). Rendering module 28 can also render 2D models.

The set of models that are rendered by each trainee client computer 10-1, 10-2 . . . , 10-(N−1), 10-N of apparatus 1000 may not be identical. Specifically, for each controlled digital character of apparatus 1000, there can be provided a first person model and a third person model. When a trainee enters a simulation to establish a new controlled digital character for the apparatus, the trainee client computer controlled by that trainee can load the first person model for the newly established controlled digital character for rendering while the remaining trainee client computers 10 of apparatus 1000 can load the third person model of that character for rendering. A camera position for each trainee client computer 10 of apparatus 1000 is regarded as the position of the controlled digital character of that trainee client computer. Accordingly, each trainee client computer of apparatus 1000 can have a different camera position. The screen shot views of FIGS. 3a and 3b are views that can be displayed at first and second trainee client computers 10-1, 10-2 of apparatus 1000 at a given instant in time. The views show the same digital world but from different first person views.

The apparatus may be utilized to train workers in a variety of different use case application some of which are briefly summarized herein below.

Example 1

Apparatus 1000 can be used to train care giver trainees respecting care of a work subject in the form of a patient. A care giver model (e.g. doctor or nurse model) can be rendered for each care giver and a work subject model corresponding to a patient can also be rendered. A trainee client computer is provided for each trainee. Each trainee uses a user interface of a trainee client computer for controlling animation routine for the trainee model corresponding to himself. The apparatus can be programmed so that positive reinforcement animation routines for the patient work subject model can be run when a trainee executes a process properly and can be further configured so that negative reinforcement animation routines for the patient work subject model are run when a trainee executes a process improperly. For example, if a trainee controls a model to run the animation routine showing the model applying a breathing mask to the patient model at an appropriate time a positive reinforcement animation routine may be run for the patent work subject model (a breathe regularly animation routine may be run). The apparatus can be programmed to encourage team work among team members. For example, the apparatus can be programmed so that a positive reinforcing animation routine for the patient work subject model is run conditionally on the condition that first and second trainees control their respective trainee models in a pre-specified manner. Positive reinforcing and negative reinforcing textures can also be rendered for the patient work subject model. For example, when one or more trainees take appropriate action, textures may be rendered for the patient model so the patient has a healthy skin tone. When one or more patients take inappropriate action, textures may be rendered for the patient model so that that patient has an unhealthy skin tone.

Example 2

Apparatus 1000 can be used to train workers of a motor car speed race pit crew respecting a work subject in the form of an equipment article provided by a racing automobile machine (racing automobile). A trainee model can be provided for each trainee of the pit crew. A pit crew model can be rendered for each trainee pit crew member and a work subject model corresponding to a racing automobile can also be rendered. A trainee client computer is provided for each trainee. Each trainee uses a user interface of a trainee client computer for controlling animation routines for the trainee model corresponding to himself or herself. The apparatus can be programmed so that positive reinforcement animation routines for the automobile work subject model can be run when a trainee executes a process properly and can be further configured so that negative reinforcement animation routines for the work subject model are run when a trainee executes a process improperly. For example, if a trainee controls a model to run the animation routine showing the model removing tire bolts from an automobile model at an appropriate time a positive reinforcement animation routine may be run for the automobile work subject model (an animation routine showing the tires removed may be run). The apparatus can be programmed to encourage team work among team members. For example, the apparatus can be programmed so that a positive reinforcing animation routine for the racing automobile work subject model is run conditionally on the condition that first and second trainees control their respective trainee models in a pre-specified manner. For example an animation routine showing a tire being successfully installed on an axle may be run conditionally on the condition that trainee controlling trainee model to hold a tire model and trainee controlling a trainee model to operate a wrench time their action state requests in a pre-specified manner. Positive reinforcing and negative reinforcing textures can also be rendered for the patient work subject model.

Example 3

Apparatus 1000 can be used to train workers respecting a work subject in the form of an equipment article provided by a defibrillation machine. A trainee model can be provided for each trainee. A trainee model can be rendered for each trainee and a work subject model corresponding to a defibrillation machine can also be rendered. A trainee client computer is provided for each trainee. Each trainee uses user interface of a trainee client computer for controlling animation routines for the trainee model corresponding to himself or herself. The apparatus can be programmed so that positive reinforcement animation routines for the machine work subject model can be run when a trainee executes a process properly and can be further configured so that negative reinforcement animation routines for the machine work subject model are run when a trainee executes a process improperly. For example, if a trainee controls a model to run an animation routine showing the model pressing an appropriate set of buttons of the machine work subject model at an appropriate time a positive reinforcement animation routine may be run for the machine work subject model. Positive reinforcing textures may also be rendered. For example, if a trainee controls his associated model at an appropriate time, a positive reinforcing texture may be rendered, e.g., a texture to change a display of rendered model, e.g., display 819 (FIG. 8*b*) to display a desired output. The apparatus can be programmed to encourage team work among team members. For example, the apparatus can be programmed so that a positive reinforcing animation routine for the patient work subject model is run and/or texture rendered conditionally on the condition that first and second trainees control their respective trainee models in a pre-specified manner. For example a texture showing a machine work subject model having a desirable display output may be rendered on the condition that a first trainee controlling a trainee model to press a first set of buttons of the machine model and a second trainee controlling a trainee model to press a second set of buttons of the machine work subject model time their action state requests in a pre-specified manner. For training a worker respecting an equipment article of the type which can vibrate or which includes a motor, positive reinforcing animation routines can include animation routine to make a machine model vibrate, to make a motor turn, etc.

Example 4

Apparatus 1000 can be used to train workers respecting a work subject in the form of an equipment article of the type that can be assembled. A trainee model can be provided for each trainee. A trainee model can be provided for each trainee and a work subject model corresponding to an equipment article that can be assembled can also be rendered. Apparatus 1000 can be configured to train trainees with respect to a method for assembling the equipment article. At each new step of an assembly process, a new, formerly extraneous model may be associated with the work subject model by way of node object re-parenting as described herein. Thus, a work subject model grows as simulated assembly process is completed. A simulation can commence with extraneous models rendered at positions apart from an equipment article model. Hotspots can be superimposed on each extraneous rendered model, and each hotspot can represent an action request command to install the part represented by the extraneous model onto an equipment article. Apparatus 1000 can be programmed so that if a trainee selects a proper next model for assembly, a positive reinforcing model change is rendered, by the rendering of an enlarged equipment model including an original equipment model and the formerly extraneous model. If a trainee selects an improper next model for assembly, a negative reinforcing animation routine, e.g., causing equipment article model to break apart, leak fluid, emit sparks can be run. A simulation in which trainees are trained respecting assembly of an equipment article such as a machine equipment article can be programmed so that a new state of the model corresponds to each step of then assembly process. Accordingly, when state change command is initiated for the digital entity corresponding to the equipment article work subject model, a model change will be rendered.

It should be noted that apparatus 1000 can be configured so that at any time for any example described, there is run a positive reinforcing animation routine, rendered a positive reinforcing texture change, or model change that can be displayed at the time the reinforcing graphic is displayed. Positive reinforcing text on each trainee client computer of the apparatus, e.g., "STEP COMPLETED!," "GOOD JOB!," "EQUIPMENT NOW ASSEMBLED!" The positive reinforcing text can take the form of an alphanumeric text status display which displays the status of a work subject, e.g., vital signs, RPM, etc. The display of positive reinforcing text can be accompanied by an output of a positive reinforcing recorded voice message at each trainee client computer. Similarly, the display of a negative reinforcing graphic change can be accompanied by display of negative reinforcing text and negative reinforcing audio (e.g., voice) messages.

Features of apparatus 1000 are further described with reference to FIGS. 9*a*-9*d* showing screen shots illustrating advancing points of a simulation in which first and second trainees are initiating action requests, resulting in various animation routines being run, and texture changes. Throughout the views of FIGS. 9*a*-9*d* it is illustrated that a camera position for a view presented to an administrator at an administrator client computer 5, can be maintained so that a field of view of the perspective view presented to an administrator is larger than the field of view of the perspective view presented the trainees at the trainee client computers. Maintained as such an administrator can better observe the full set of destination and action requests granted to the various trainees.

Referring to FIG. 9*a* there is shown a common scene concurrently rendered by various rendering modules on the displays of an administrator client computer 5, a first trainee client computer 10, 10-1 and second trainee client computer 10, 10-2. On the display of an administrator client computer 5 there is rendered a rendered third person model 904 corresponding to a first trainee situated at the first client computer 10, 10-2, a rendered third person model 906 corresponding to a second trainee situated at a second trainee client computer, a rendered model 908 corresponding to a patient work subject and a rendered model corresponding to an equipment article work subject. On first trainee client computer 10, 10-1 there is rendered the above models in a different perspective view except for the third person model 904 corresponding to the first trainee. Rather than a third person model corresponding to the first trainee, there is rendered at the first trainee client computer a rendered first person model 905 corresponding to the first trainee on the first trainee client computer 10, 10-1. On second trainee client computer 10, 10-2 there is rendered out of the above models only rendered model 910 corresponding to an equipment article work subject model. However, at some later point in the simulation when the second trainee controls her model to change a camera view, models 904 and 908 will also be rendered. For preservation of a first person view at second client computer 10, 10-2 third person model corresponding to the second trainee will not be rendered at the second client computer 10, 10-2.

Referring to the rendered view at first trainee client computer 10, 10-1 of FIG. 9*a*, a hotspot 920 is superimposed on rendered work subject model 908. Hotspot 920 enables an action request to be initiated by the first trainee using the first trainee client computer. By actuating hotspot 920 using pointer 1425 the first trainee can initiate the action request command associated with the hotspot. Apparatus 1000 can be configured so that text describing an action associated with a hotspot is displayed in a mouse over when pointer 1425 is moved over the hotspot. In the example described, the words "Apply Defib Pads" is displayed in mouse over when pointer 1425 is moved over hotspot 920. When hotspot 920 is actuated a "Place defibrillator pads" action request is initiated. Other action requests that can be initiated by actuation of a hotspot, in a patient simulation embodiment, are summarized in Table C. In one embodiment, server 100, can receive the action request and if granted can send an animation routine command to client computers 5, 10, 10-1, 10, 10-2 to run a "place defibrillator pads" animation routine. Referring to FIG. 9*a*, a hotspot 922 is superimposed on rendered equipment model 922. Actuating hotspot 922 initiates a "use defibrillator" action request. The second trainee can actuate hotspot 922 using pointer 1425 to initiate a "use defibrillator" action request.

Figure 9B:
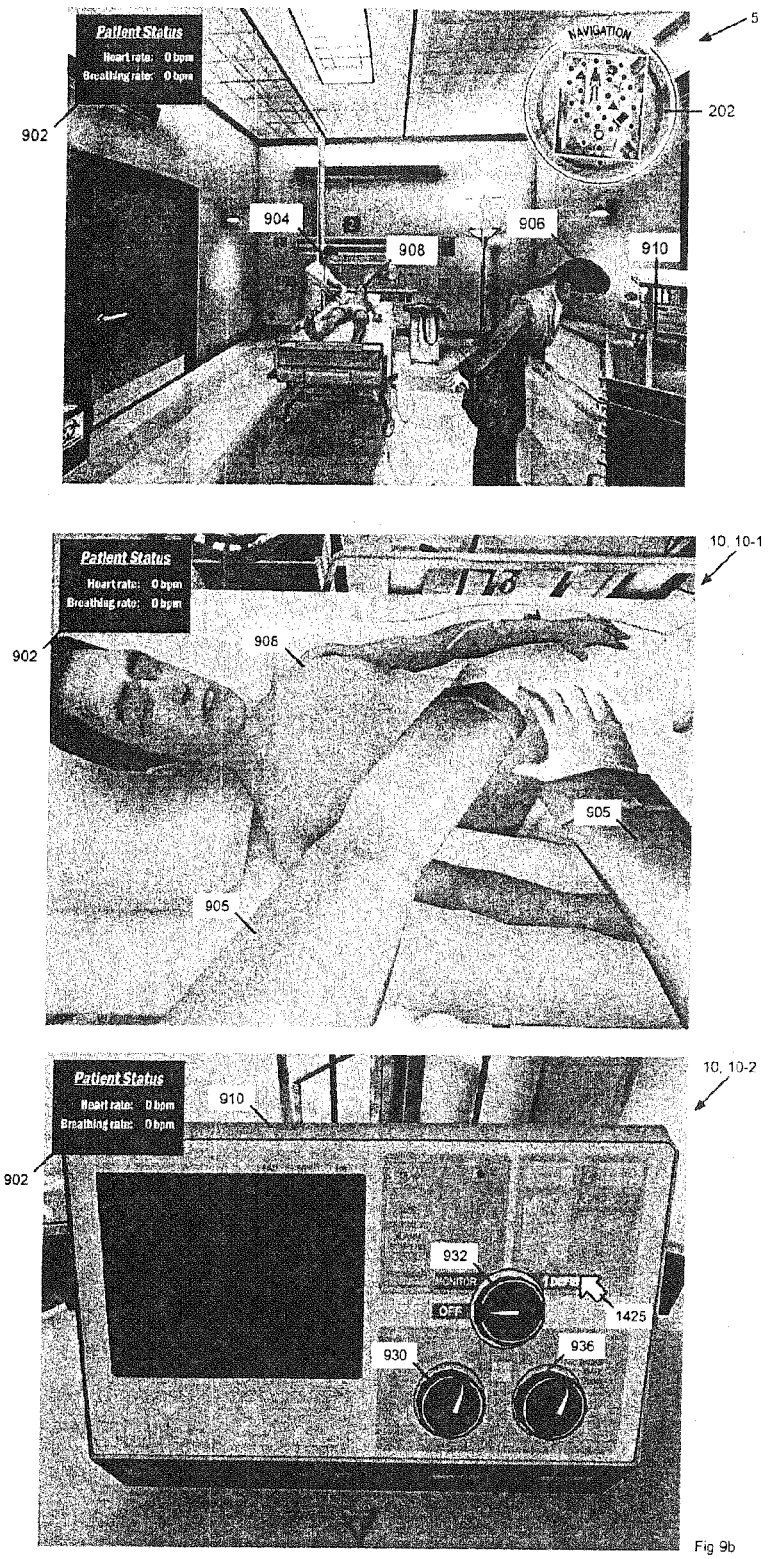
FIG. 9b are illustrative screen shot views illustrating concurrently rendered views of a common scene by an administrative client computer, a first trainee client computer, and a second trainee client computer, respectively, at a second point in a simulation.

Referring to FIG. 9*b*, views illustrating a place defibrillator pads" animation routine being run on various client computers are shown. On administrator client computer 5, rendered third person first trainee model 904 is rendered in accordance with a "place defibrillator pads" animation routine. On first trainee client computer 10, 10-1, rendered first person model 905 corresponding to the first trainee is rendered in accordance with a "place defibrillator pads" animation routine. Because the digital entity corresponding to rendered model 904 is not within a present camera view of second trainee client computer 10, 10-2 as depicted in FIG. 9*b*, second client computer 10, 10-2 can ignore a command to run a "place defibrillator pads" animation routine. However, if the digital entity corresponding to rendered model 904 were in the camera view of trainee client computer 10, 10-2, trainee client computer could run the animation routine being run by administrator client computer to produce the rendering as shown in the administrator client computer view of FIG. 9*b*. The rendering at the administrator client computer 5 indicates that an animation routine is being run responsively to a proper "use defibrillator" action request initiated by the second trainee. An animation routine corresponding the request running on the administrator client computer 5 results in rendered model 906 leaning toward rendered work subject model 910.

Still referring to FIG. 9*b*, textures of rendered work subject model 910 render knobs 930, 932, and 936 which can operate as hotspots. Apparatus 1000 can be configured so that when on/off knob 932 is actuated by the second trainee at second client computer 10, 10-2 using pointer 1425 a positive reinforcing texture can be rendered on a work subject model. Specifically, if knob 932 is actuated positive reinforcing texturing can rendered as shown in the second trainee client computer view depicted in FIG. 9*c*. Comparing the second trainee views of FIGS. 9*b* and 9*c* it is seen that positive reinforcing texture change can comprise textures that make the rendered model 910 to appear to enter an ON state. For example, textures create a lit up display in the view of FIG. 9*c*. Also additional control in the form of buttons 940, 942 become highlighted. Buttons 940, and 942 can operate as hotspots enabling trainee actuated action requests to be initiated.

Referring to the concurrently rendered views of FIG. 9*c*, apparatus can be configured so that actuation of rendered button 942 initiates an action request. Specifically, apparatus 1000 can be configured so that actuation of button 942 results in a "defibrillate" action request being initiated. Apparatus 1000 can be configured so that server 100 can receive a defibrillate action request and can send a corresponding shock animation routine for a patient work subject model to the administrator client computer 5, and to the trainee client computers 10, 10-1, 10, 10-2 if the defibrillate action state is permitted to be occupied. Apparatus 1000 can be configured so that a defibrillate action state is permitted to be occupied conditionally on the condition that another controlled digital character has occupied the "place defibrillator pads" action state after having taken the action described with reference to the first trainee. Accordingly, occupation of the defibrillation action state in the example described, and running of a corresponding positive reinforcing animation routine for a work subject model depends on first and second trainees operating in a coordinated pre-specified manner.

In FIG. 9c, the views of the administrator client computer 5 and the first trainee client computer illustrate model renderings in accordance with a positive reinforcing shock animation routine. An animation routine is run by administrator client computer 5, and by first trainee client computer 10, 10-1 to render patient work subject model 908 in a shock animation (note e.g., the position of the patient knee in FIG. 9c in relation to FIG. 9a).

Figure 9D:
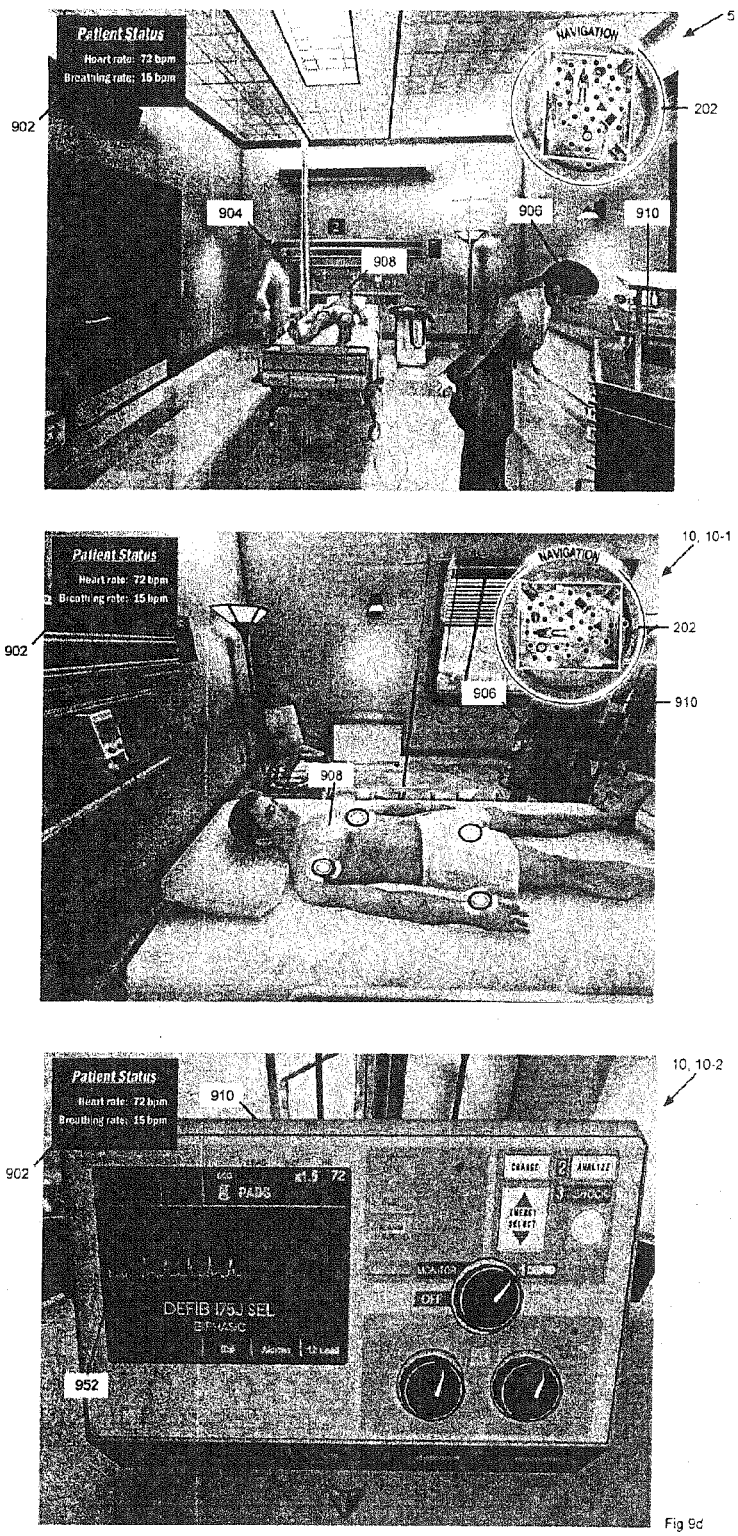
FIG. 9d are illustrative screen shot views illustrating concurrently rendered views of a common scene by an administrative client computer, a first trainee client computer, and a second trainee client computer, respectively, at a fourth point in a simulation.

With reference to the concurrently rendered views illustrated in FIG. 9d, further positive reinforcing texture changes and positive reinforcing displayed text information features which may be displayed responsively to one or more trainees taking correct action are described. Regarding positive reinforcing textures, it is seen that rendered model 910 is rendered at second client computer 10, 10-1 with additional textures indicating a positive result yielded by a proper patient defibrillation. Specifically, certain texture is rendered at display area 952 of rendered model 952 to indicate a stable vital sign condition, and to remove the previously displayed texture rendering of the "PRESS SHOCK" textual information message in display area 952. Regarding displayed text information, it is seen that administrator client computer 5, and trainee client computer 10, 10-1, and 10, 10-2 can continuously display status information window 902. Apparatus 1000 can be configured to so that the text information of status window 902 is updated to include improved vital sign reading information as indicated in FIG. 9d, if a defibrillate action is taken by a trainee.

III. Administrator Client Computer

A. Introduction

Exemplary embodiments of apparatus 1000 are shown in the views of FIGS. 1a-1g. In the view of FIG. 1b, an embodiment of apparatus 1000 is shown wherein trainee client computers 10 are disposed remote relative to one another and wherein central server 100 is disposed remote relative to trainee client computers 10. In the example of FIG. 1c, a similar embodiment is shown except that in addition apparatus 1000 includes a powerful, highly featured administrator client computer 5 for use by an administrator 6 administering a simulation. Administrator client computer 5 can be in communication with central server 100. Additional examples where an apparatus 1000 includes an administrator client computer are illustrated in FIGS. 1c-1f.

Referring to the views of FIGS. 1c-1g, a training apparatus 1000 can include a powerful administrator client computer 5 for use by an administrator 6 administering a simulation. Administrator client computer 5, among other elements, can have a rendering module 28 and a user interface that can include an input device 12, and a display 30. The administrator client computer 5 in one embodiment can be coupled to the central server 100. For purposes of rendering models on the display 30 of an administrator client computer 5 in the manner of the trainee client computers an administrator client computer can include the processing modules of the trainee client computers described herein. Specifically, an administrator client computer 5 can include an interface module 14, a client avatar module 18, a client non-trainee digital entity module 19, a client world module 22, and a rendering module 28 for rendering three dimensional models on a display 30. Each administrator client computer can also include an input device 12, a display 30 and model database 20. A user interface of administrator client computer 5 in one embodiment can include graphical user interface including buttons that can be selected with use of an input device in the form of pointer controller 127. A user interface of an administrator client computer 5 can have one or more control user interface display screens. Such control user interface display screens can be graphical user interface display screens. A user interface of an administrator client computer can be different from a user interface of a trainee client computer. A user interface of an administrator client computer can include at least one control user interface display screen which is not included in a trainee client computer, i.e., not presented on a trainee client computer display for viewing and use by a trainee using a trainee client computer during a simulation setup mode or a simulation run mode.

In embodiments including an administrator client computer 5, apparatus 1000 can render views on the display of the administrator client computer in the manner that it renders views on the displays of the one or more trainee client computers that can be included in apparatus 1000. For example, server 100 can be disposed to receive action and destination requests from various trainee client computers and at the time that it sends trainee model animation commands to each trainee client computer of the apparatus, it can also send an animation command to administrator client computer 5 so that the animation is also run on the administrator client computer at the time the routine is being run at the various trainee client computers. Also, when server 100 sends an animation command to each trainee client computer 10, 10-1, 10, 10-2, 10-(N−1), 10-N, to initiate running of an animation routine of a work subject model on the various trainee client computers, it can also send a work subject run animation routine to the administrator client computer 5 so that the administrator client computer 5 can run the animation routine for the work subject model at the time the routine is being run off the various trainee client computers. Administrator client computer 5 can store sufficient coordinate and camera position data to allow it to display the views being displayed on the various trainee client computers, and, in addition, an "administrator client view," different from each trainee client view. Administrator client computer 5 can also include additional models and additional animation routines so that it can support multiple views. While it is advantageous in some embodiments to configure server 100 to receive and process destination and action requests from various trainee client computers, and various commands for the administrator client computer, server 100 can be deleted and such functionality can be incorporated into one or more of the client computers 100. Further, while it is advantageous in some embodiments to configure server 100 e.g., to determine model characteristics, model textures, to store candidate model data, to distribute models to client computers requiring them to store a database for simulation data, to send queries and receive return parameters from databases, such functionality can also be distributed into one or more of the administrator and/or trainee client computers 5, 10.

B. User Interface

Figure 4B:
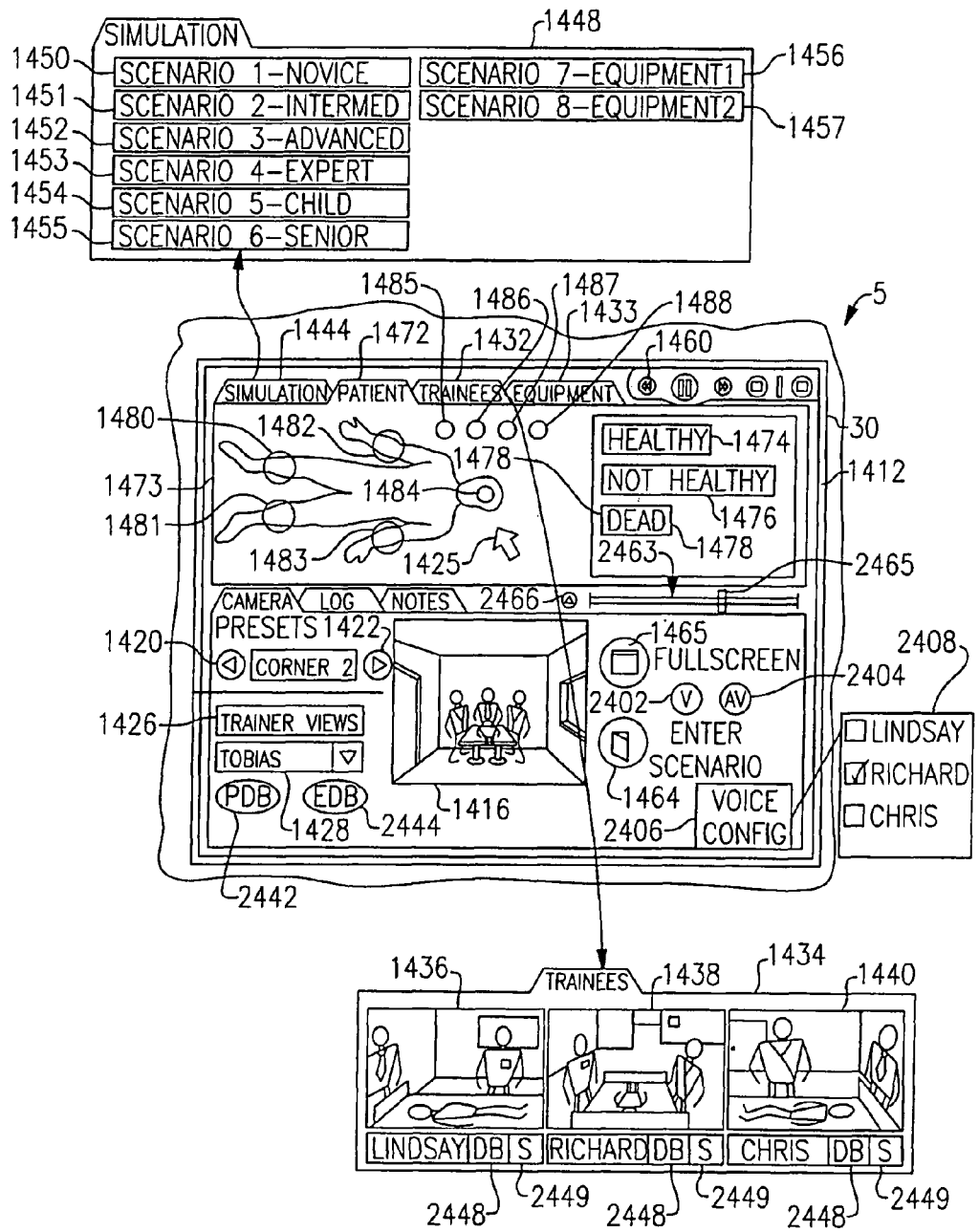
FIG. 4b is an exemplary graphical user interface display screen that may be rendered on a display of an administrator client computer during a simulation run mode characterized by animations for trainee models being responsive to commands initiated by a trainee using a user interface of a trainee client computer. An administrator may initiate commands using the user interface. Such commands may include a command to alter a present simulation, a command to change a view rendered on a display of the administrator client computer, and a command to enter an administrator character mode of operation.

An exemplary user interface of an administrator client computer is shown in FIG. 4a and FIG. 4b showing control user interface display screens that can be displayed on a display of an administrator client computer. In FIG. 4a there is shown a setup mode control interface graphical user interface display screen and in FIG. 4b there is shown a run mode control interface graphical user interface display screen. The display screen of an administrator client computer can be varied, for example, by actuating tab buttons so that new tab windows are displayed on a display to provide a new or updated display screen (screen display).

The administrator client computer 5 can render on its respective display 30 a scene of a present simulation including a rendering of a work subject model and a rendering of trainee models being trained. The administrator client computer 5 can be used by an administrator in a setup mode to set up a simulation and can be used in a simulation run mode to alter a simulation and to initiate various other commands. The apparatus 1000 can be configured to allow an administrator, by initiating commands using a user interface of an administrator client computer 5, to alter a simulation currently being run in a simulation run mode. Apparatus 1000 in a simulation run mode can be characterized by the apparatus being responsive to trainee initiated commands for controlling a trainee model. Such trainee initiated commands can be, e.g., destination requests and action requests as described herein. Such functionality allowing an administrator to alter a present simulation provides significant advantages. An administrator may wish to alter a simulation if an administrator by observation of the scene being rendered on its display 30 determines that training of a worker or team of workers will be improved by such altering. For example by observation of renderings on administrator client display 30 an administrator may determine that trainees are easily completing requirements of a current scenario and may wish to switch a present scenario of a current simulation to a more difficult scenario with more difficult requirements. Also, an administrator may determine that a current scenario is too difficult for present trainees and may wish to switch to an easier scenario.

Further aspects of a training apparatus 1000 in a particular embodiment are described with reference again to FIGS. 4a and 4b showing control user interface screen displays that can be displayed by administrator client computer 5 on a display thereof. In the view of FIG. 4a, an exemplary screen display that can be displayed on display 30 of administrator client computer 5 in a setup mode of operation is shown and described. In a setup mode of operation, an administrator can define characteristics of a simulation to be run. For example, a simulation can comprise one or more scenarios and utilizing area 1402 an administrator can define a sequence of scenarios to be run. Using field 1403a, an administrator can select an initial scenario of a simulation, and using fields 1403b and 1403c an administrator can select a sequence of scenarios to be run during operation in a simulation run mode. In area 1404 an administrator can view information respecting trainees that have registered to enter a simulation. By actuating button 1406 an administrator can drive apparatus 1000 from a setup mode of operation to a simulation run mode of operation in which client computers 10, 5 render on their respective displays models and run various animation routines for such models.

In a simulation run mode of operation an administrator can use a user interface of an administrator client computer to initiate a command to alter a simulation, to initiate a command to change a view rendered on its display, and to initiate a command to enter an administrator character mode of operation. An administrator can also use a user interface of an administrator client computer to display statistics respecting a current or past simulation and to view data of a personnel database.

C. Simulation Altering

In one embodiment, a command initiated by an administrator (using a user interface of administrator client computer 5) for altering a simulation during operation of the apparatus in a simulation run mode can be a command resulting in a state change of a non-trainee digital entity corresponding to a work subject. Such a command may be, e.g., a command to change a state of a non-trainee digital entity or a command to change a present scenario of a simulation currently being run. It has been described, e.g., with reference to Table D that apparatus 1000 can be programmed to maintain track of a state of a non-trainee digital entity with use of an object wherein an attribute of an object defines a state of a non-trainee digital entity. Accordingly, inherent in a state change of a non-trainee digital entity with such programming is an attribute change of an object. When a scenario is changed, the states of several non-trainee digital entities of a simulation can be changed. When there is state change of a non-trainee digital entity, there can be run an animation routine for work subject model associated with the state change of a non-trainee digital entity. The animation routine run can be different from the most previously run animation routine for the work subject model and can be a certain animation routine. When there is a state change of a non-trainee digital entity, there can also be rendered a texture for the work subject model that is different from the most previously rendered texture for the work subject model. The running of an animation routine for the work subject model and the rendering of a different texture for the work subject model responsively to a command for altering a simulation at a trainee client computer alerts a trainee at a trainee client computer to the fact that a present simulation has been altered. There can also be enabled, responsively to a state change command, a set of animation routines for the work subject model different from the set of animation routines enabled for the work subject model prior to initiation of the command to alter a simulation, and a set of textures for the work subject model different from the set of textures enabled for the work subject matter prior to the initiation of the command to alter a simulation.

Referring to the specific example described with reference to FIG. 1a, it was described that a non-trainee digital entity determining animation routines that can be run for a particular work subject model can have a plurality of "states" each defining a set of possible animation routines that can be run by apparatus 1000. For example, where a trainee is being trained with respect to a patient, a first set of animation routines may be run by apparatus 1000 when the non-trainee digital entity associated with a patient model is in a healthy state, a second set of animation routines may be run by apparatus 1000 when the non-trainee digital entity associated with a patient model is in a not healthy state and third set of animation routines may be run by apparatus when the non-trainee digital entity associated with a patient model is in a dead state. Such state associated animation routines are summarized in Table E herein. It is seen with reference to Table E that a set of animation routines that are enabled for running can be differentiated depending on which state of a non-trainee digital entity is currently active. It is seen further that each state can have an associated "idle" routine. Apparatus 1000 can be configured to run an "idle" routine when first entering a state. Apparatus 1000 can also be configured to run an "idle" routine whenever a remaining animation routine of the state is not running. Apparatus 1000 may also run a "blend" animation routine for a non-trainee digital entity when the non-trainee digital entity enters a new state. For example, if a new state requires a model corresponding to a non-trainee digital entity in a new position, i.e., changing from a standing position to sitting position, or to a different coordination position apparatus 1000 can run a blend animation routine. Referring to Table E, textures can also be differentiated between states of a non-trainee digital entity. When a non-trainee digital entity changes state, a model for the entity may be rendered with a different set of one or more textures. When a model is rendered with a different texture at the displays of various trainee client computers the trainees are alerted to the fact that a simulation has been altered by an administrator.

Apparatus 1000 can be configured so that a set of possible animation routines for a work subject model can be changed by actuation of a button of a display of an administrator client computer while a simulation is being run. It has been mentioned that a state change (and therefore an enabled animation routine set change) can also be made by requesting with use of trainee client computers the occupation of certain state changing occupation states. In the example where an administrator client computer is used to initiate an animation routine set change, such change can be initiated without any input at a trainee client computer and without an administrator initiating control of a controlled digital character.

Particular buttons of an exemplary user interface for initiated simulation altering commands are now described. Referring to tab button 1472, apparatus 1000 can be configured so that when tab button 1472 is actuated, tab window 1473 is presented to an administrator. Tab window 1473 in the embodiment shown includes state buttons 1474, 1476, and 1478, each corresponding to a possible state of a non-trainee digital entity corresponding to a work subject for which trainees are receiving training. Apparatus 1000 can be configured so that actuation of a button 1474, 1476, and 1478 initiates a state change command to change a state of a non-trainee digital entity. Since states can be maintained with use of objects, wherein object attributes define a state, a state change command herein can be regarded as an object attribute change command. When a state is changed, a certain animation routine associated with the state can be run, and a certain texture associated with a state for a work subject model can be rendered. A button corresponding to a presently active state can be highlighted. Such highlights will indicate to an administrator that actuating the button will not produce a state change. Actuating button 1474 when not highlighted causes a non-trainee digital entity corresponding to a work subject model to enter a healthy state. Activating button 1476 when not highlighted causes a non-trainee digital entity corresponding to a work subject model to enter a not healthy state. Actuating button 1478 when not highlighted causes a non-trainee digital entity corresponding to a work subject model to enter a dead state.

Referring to tab button 1444, apparatus 1000 can be configured so that when tab button 1444 is actuated, tab window 1448 is presented to an administrator user. Tab window 1448 includes designators 1450, 1451, 1452, 1454, 1455, 1456, 1457 for each scenario available in a current simulation. Referring to FIG. 4*b*, apparatus 1000 can be configured so that designator in window 1448 corresponding to a currently active scenario is highlighted. Apparatus 1000 can be configured so that when a specific button 1450, 1451, 1452, 1453, 1454, 1455, 1456, 1457 within window 1448 is highlighted, apparatus 1000 enters the scenario. In the example of FIG. 4*b*, several alternative scenarios are shown; e.g., "novice," "intermediate," "advanced," "expert," "child" "senior" "equipment1" and "equipment2". The novice, intermediate, advanced expert, child and senior scenarios in the example described relate to training of a patient work subject, whereas equipment1 and equipment 2 scenarios indicated relate to training of an equipment article such as a defibrillation machine. A child scenario may relate to training respecting a child patient and a senior scenario may relate to training respecting care giving to a senior patient. A child patient model may be selected and rendered if the child scenario is selected. A senior patient model may be selected and rendered if a senior scenario is selected.

In one embodiment, a simulation can comprise one or more scenarios. Each scenario can include (i) a set of initial states; (ii) a schedule of state changes (e.g. state changes with timeout periods); and (iii) rules for responding to user inputs such as input commands including destination and action requests initiated by a trainee. The set of initial states of a scenario can be a set of states for each non-trainee digital entity, including non-trainee digital entities for each of several work subject models, and additional states for additional digital entities of a simulation such as the defined environment of a simulation. Rules of a simulation can be differentiated between scenarios. Accordingly, when apparatus 1000 is controlled to enter a new scenario, a set of states can change including a state for a non-trainee digital entity corresponding to a work subject model. A state change for a non-trainee digital entity can cause a certain animation routine associated with the state change to be run. For example, if in a newly entered scenario entered in response to an administrator initiated command a patient non-trainee digital entity changes state from a healthy state to a not healthy state, an idle routine for the state will, at some point during operation in the state, be run (e.g., on the entering of the state or at some point thereafter).

A state change of a non-trainee digital entity may also result in a model change of the corresponding work subject model. For example, if a new state requires a formerly extraneous model to be associated with the work subject model, or a formerly associated model to be disassociated with the work subject model, there will be a model change when the model is rendered after the state change. In one example a work subject model may be a model corresponding to an equipment article and the training application may be an application wherein workers are trained respecting assembly of the equipment article. At each new step of an assembly process, a new, formerly extraneous model may be associated with the work subject model by way of node object re-parenting as described herein. Thus, a work subject model grows as simulated assembly process is completed. A simulation in which trainees are trained respecting assembly of an equipment article such as a machine equipment article can be programmed so that a new state of the model corresponds to each step of then assembly process. Accordingly, when state change command is initiated for the digital entity corresponding to the equipment article work subject model, a model change will be rendered. In reference to FIG. 4*b*, a model change may be rendered when a newly entered scenario requires a model different from a model rendered during a previously active scenario. New models may be rendered, e.g., when a "child" scenario is entered (requiring a child model) or when a "senior" scenario is entered requiring a senior model.

Figure 6G:
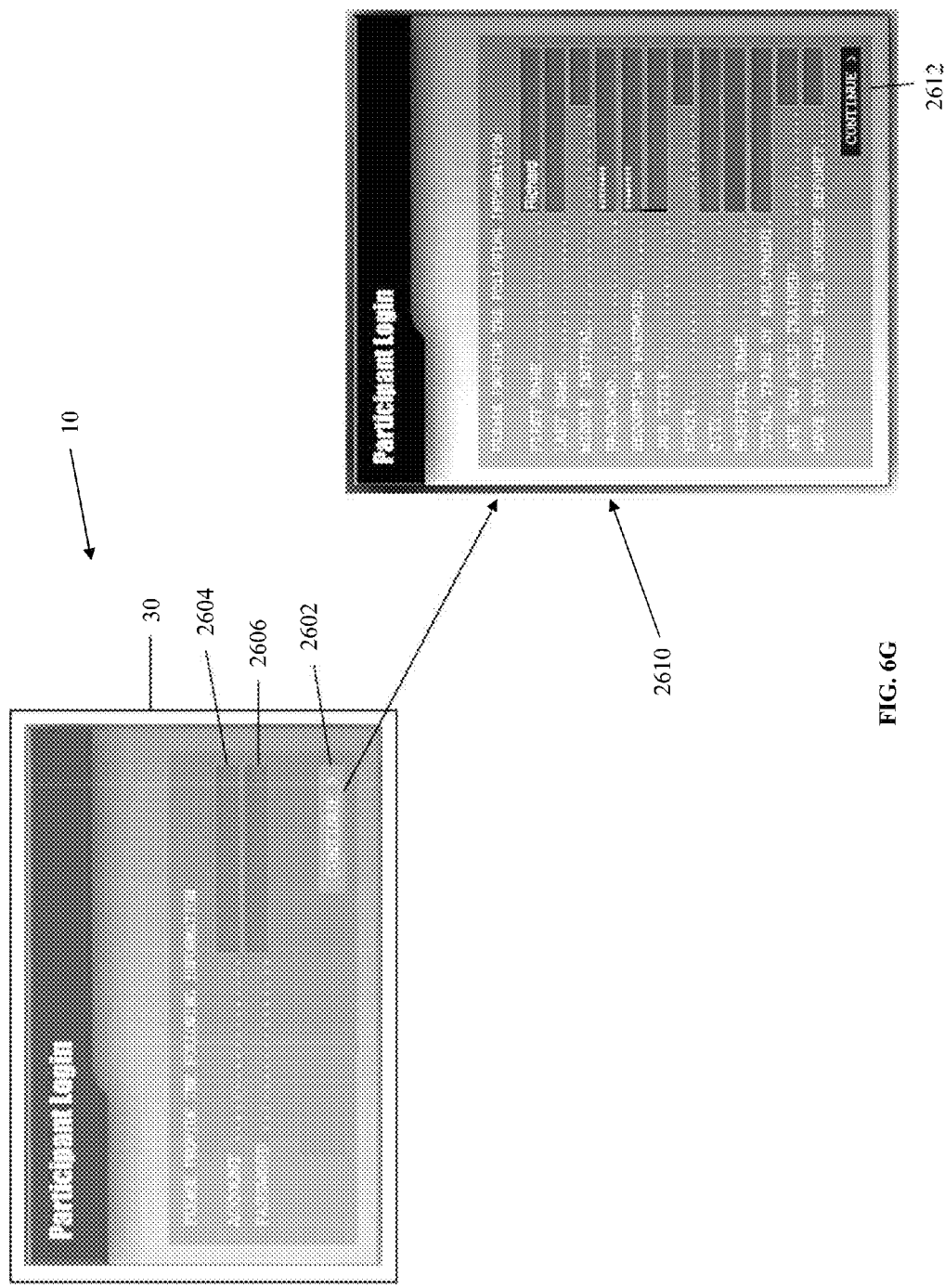
FIG. 6g is a graphical user interface screen display which can be rendered on a display of a trainee client computer during a simulation set up mode. Parameters can be entered into the graphical user interface. The entered parameters can be used to query a personnel database in order to return parameters from the personnel database, and parameters from the personnel database can be used to establish animation routines that are enabled for a trainee model, and to determine models and textures for a trainee model so that a trainee model can have an appearance closely correlated with the appearance of the actual trainee.
Figure 6H:
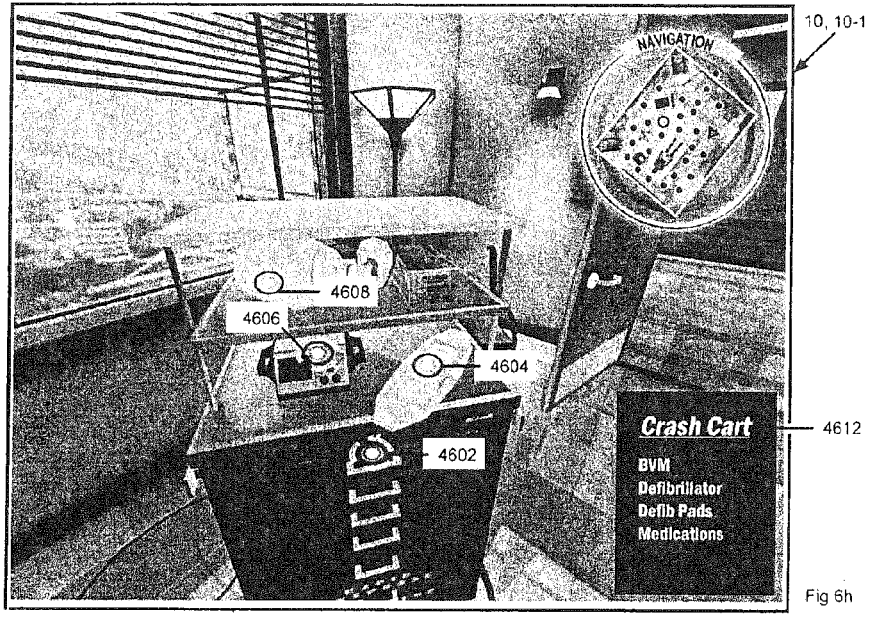
FIGS. 6h and 6i illustrate a series of screen displays that can be rendered at a trainee client computer before and after an administrator using an administrator client computer initiates a command to alter a simulation. A graphical user interface can change after an administrator initiates a simulation altering command.
Figure 6I:
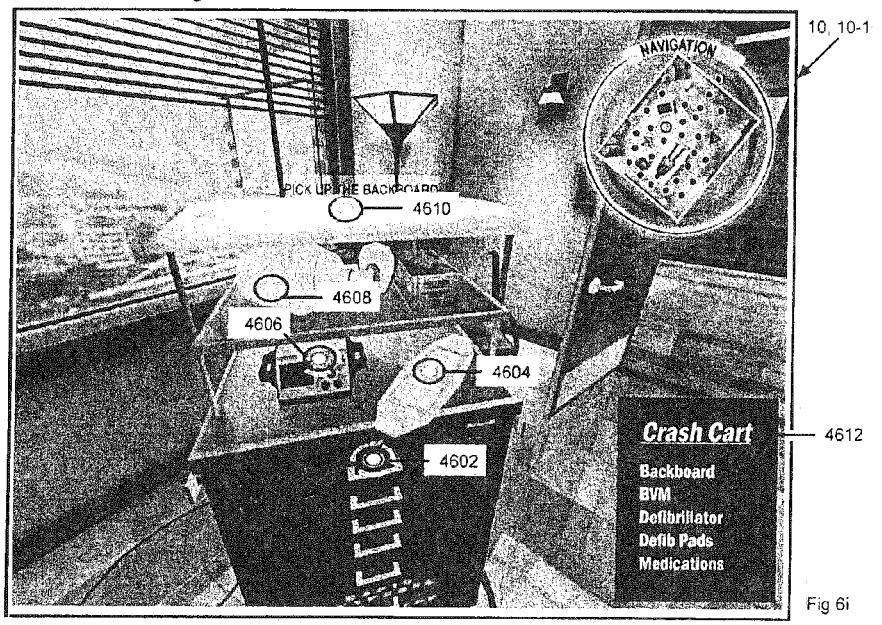

When an administrator initiates a command to alter a simulation, it has been described that a certain animation routine may be rendered on the client computers 5, 10 of an apparatus, and a new set of animation routines associated with a newly entered state may be enabled. In addition, when an administrator initiates a command and alters a simulation, a graphical user interface, and in some instances, only an output interface, of trainee client computers are changed. Referring to FIGS. 6*h* and 6*i*, screen displays displayed by a trainee client computer 10-1 before and after an administrator initiates a simulation altering command are shown. Before the command is initiated, trainee client computer 10-1 can render the scene as shown in FIG. 6*h* having four (4) hotspots for requesting a trainee model action state (i.e., for initiating an action request). After the command is initiated, trainee client computer 10-1 can render the scene as shown in FIG. 6*i*. The rendered scene has an additional, (a fifth) action state requesting hotspot 4610. A trainee client computer 10-1 can alter a rendered graphical user interface responsively to a simulation altering command, e.g., a command to change scenarios, and wherein the new scenario presented with additional control features (additional action request initiating hotspots in the example shown) for controlling a controlled digital character. Textual information displayed on a display can change in response to an initiation of a simulation altering command. For example, as shown in the views of FIGS. 6h and 6i with reference to equipment article status window 4612, the equipment listed in window 4612 can change responsively to an initiation of simulation altering command.

Comparing FIGS. 6h and 6i it is seen that the coordinate position and camera position defining the views of FIGS. 6h and 6i may not change when there is a simulation altering command, which can be as mentioned a command to change a state of a non-trainee digital entity or a command to change a scenario or a return to point command as will be described later herein. Apparatus 1000 can be configured so that when an administer initiates a command to alter a scenario, the apparatus can record administrator coordinate positions and camera positions as of the time of receipt of the command. After initiating of such a command apparatus 1000 can render trainee models at their coordinate positions as of the time of the receipt of the simulation altering command so that after initiation of a simulation altering command trainee models are rendered at the same position at which they were rendered at the time of initiation of the scenario change command. Camera positions as of the time of receipt of a scenario altering command initiated by an administrator can also be utilized by the various rendering modules of the client computers 5, 10 so that the camera views presented to trainees and the administrator are not changed by the initiation of a scenario altering command.

In addition to being configured to enable an administrator to initiate a state change command object attribute change command, and a change scenario command, apparatus 1000 can be configured to enable an administrator to initiate with use of a user interface a run animation routine command. Referring to the run mode control interface of FIG. 4b, the control interface can include animation routine buttons 480, 481, 482, 483, 484, 485, 486, 487, 488. Apparatus 1000 can be configured so that when a certain animation routine button is actuated, apparatus 1000 runs a certain animation routine such that a work subject model is rendered in accordance with the certain animation routine. Apparatus 1000 can be configured so that when a run animation command is initiated and received, there is caused no state change of the non-trainee digital entity corresponding to the work subject model. Thus, run animation routine commands can be initiated without changing a state list of a simulation. Run animation routines can be initiated by an administrator for the purpose of attracting the attention of, or to emphasize training lessons to trainees without changing a state; and therefore, without affecting a scoring of a simulation. Run animation routine commands can be accompanied by live voice messages input by an administrator as described herein. Referring to buttons 480, 481, 482, 483, 484, buttons 480, 481, 482, 483, 484, when actuated, cause an extremity specific animation routine to be run. When either of buttons 480, 481 are actuated, an animation routine to move a leg of a patient model is run. When either of buttons 482, 283 are actuated, an animation routine to move an arm of a patient model is run. When button 484 is actuated, an animation routine to move a head of a patient model is run. Each of buttons 1485, 1486, 1487, 1488, when actuated, causes a body (i.e., more than one extremity) animation routine to be run. For example, button 1485, when actuated, may initiate a run animation routine command to run an animation routine in which a patient model waves it arms. Button 1486, when actuated, may initiate a run animation routine in which an entire patient model shakes. Button 1487, when actuated, may initiate an animation routine in which a patient model stands up. Button 1488, when actuated, may initiate an animation routine in which a patient model collapses into a position in which the model appears to be dead, without actually entering the "dead" state, which can be entered by actuation of button 1478.

By rendering scenes utilizing coordinate and camera positions as of the time of receipt of the scenario altering command the experience of a real life training session respecting a work subject is approximated. Without maintaining a record of coordinate positions and camera positions, trainee positions could be expected to be rendered at an initialization position on the receipt of a command to change a scenario. In a real life training session including physical props such as patient dummies or equipment article, the view of trainee is not adjusted when a change is made to a physical prop. Also, the position of fellow trainees is not changed when there is a change to a physical prop. The maintaining of a coordinate and camera position from the time of initiation of a scenario change command enables trainees to better observe particular indicators of simulation change, such as an animation change, texture change or model change. It is noted that if a trainee is presented with a different view after initiation of a simulation change command by an administrator a trainee might be less likely to notice a particular animation change, texture change, or model change as a camera view change might distract attention from such changes.

Apparatus 1000 in the specific embodiment described with reference to FIG. 4b is configured to provide training with respect to two work subjects: a "patient" work subject and an equipment article work subject in the form of a defibrillation machine. Apparatus 1000 can maintain separate coordinate positions for each of the work subjects. In the example described scenarios 7 and 8, designated by buttons 1456, 1457, provide training primarily relative to an equipment article work subject while the remaining scenarios provide training primarily relative to a patient work subject. Apparatus 1000 can be configured so that when equipment scenario button 1456 is actuated during a simulation run mode with a patient scenario active, the model corresponding to the equipment article is rendered at the coordinate position of the patient model as of the time the change scenario command was initiated and trainee client computer camera positions as of the time of the change scenario commands are maintained.

Further, the coordinate positions of all trainee models can be maintained so that when scenario button 1456 is actuated with a patient scenario active, the rendering of a scene remains the same except an equipment article work subject model can be rendered on all client computers 5, 10, at coordinate position of a patient model as of the time of initiation and receipt of the change scenario command. Alternatively, apparatus 1000 can be configured so that if equipment scenario button 1456 is actuated with a patient scenario active, the coordinate and camera position of each trainee are automatically remapped to a position relative to the equipment work model position based on the relative position between the trainees coordinate and camera position and the patient work subject model position at the time of initiation of the change scenario command.

Referring to the graphical user interface control interface of FIG. 4b, the control interface can include equipment tab button 1433. Apparatus 1000 can be configured so that when tab button 1433 is actuated, there is displayed on display 30 of administrator client computer 5 a tab window similar to tab window 1473 except dedicated for enabling state changes of a non-trainee digital entity and/or animation changes for a model corresponding to such an entity. A tab window which is presented after button is actuated can include buttons providing the function of buttons 1474, 1476, 1478 for enabling initiation of state changing commands for an equipment article non-trainee digital entity, and buttons providing the function of buttons 1480, 1481, 1482, 1483, 1484, 1485, 1486, 1487, 1488 for enabling initiation of run animation commands for an equipment article work subject model without altering a state of a corresponding non-trainee digital entity.

D. Recording

In one embodiment apparatus 1000 can be configured to record a simulation to thereby create a history for a simulation. For recording a simulation, apparatus 1000 can create a record of initial states when first entering a scenario, and can update the record to include a time stamped state change entry each time there is an event triggering a state change. Accordingly, when the apparatus 1000 is commanded to return to a prior point of a scenario, the apparatus 1000 can determine a state set of the apparatus at any requested point in time by analyzing the time stamped state change entries together with the record of initial states. A recording of a simulation can also be provided by configuring apparatus 1000 to maintain a record of states of a simulation including time stamped entries time stamped at predetermined time intervals. For example, at 30 second time intervals apparatus 1000 can enter into such record a new time stamped entry for the record summarizing a set of states of the apparatus at a certain time. Accordingly, when apparatus 1000 is commanded to return a simulation to a certain selected time, apparatus 1000 can return the simulation to the prior time utilizing the time stamped entry of the record most closely correlated with the selected time.

Referring to the control interface depicted in FIG. 4b, a control interface can include time bar 2463. Apparatus 1000 can be configured so that an administrator can return a simulation to a prior point by moving marker 2465 on time bar 2463. Apparatus 1000 can be configured so that time bar 2463 is a time bar for a scenario currently being run. Apparatus 1000 can be configured so that a time bar for a previously run scenario of simulation can be displayed by actuation of return button 2466.

Apparatus 1000 can also be configured to buffer rendered frames that are displayed on display of the apparatus 1000 so that the frames can be displayed in reverse order when reverse button 1460 is actuated. Apparatus 1000 can be configured so that when reverse button 1460 is actuated the buffered frames are displayed in reverse order for the time that button 1460 is actuated. Apparatus 1000 can be configured so that when a pointer 1425 is removed from reverse button 1460, the simulation is returned to a point correlated with frame last displayed at the time of such removal. Apparatus 1000 can utilize a record, such as the previously described record including time stamped state change entries, or the record including time interval time stamped state set entries, when returning a simulation to a prior point. Among the states that can be recorded by an apparatus 1000 in a record for recording a simulation can be the coordinate positions and camera positions of controlled digital characters determining the rendering positions of trainee models and the camera views presented to trainees at the various trainee client computers. When a simulation is returned to a prior point trainee models can be rendered and camera positions used per the original coordinate position and camera positions at the prior point in time. In an alternative embodiment apparatus 1000 when commanded to return to a prior point of a simulation can render trainee models at the various client computers 5, 10 using controlled digital character position data as of the time of initiation of the return to prior point command. Apparatus 1000 can be configured to record coordinate and camera positions of controlled digital characters at the time of receipt of a "return to prior point" command. When command to return to a prior point is initiated by an administrator apparatus 1000 can render scenes at the various trainee client computers utilizing the controlled digital character coordinate positions and camera positions as of the time of initiation of the return to prior point command.

E. Voice

Apparatus 1000 can also incorporate voice technology. For example administrator client computer 5 can incorporate an acoustic input device 34 (e.g., a microphone) and trainee client computers 10 can each incorporate an acoustic output device 35 (e.g., a speaker). Further, administrator client computer 5, trainee client computers 10 and server 100 can include all software and hardware necessary to support voice over Internet protocol (VOIP) data communications between an administrator client computer 5 and each trainee client computer 10.

It will be seen that the combination of simulation altering functionality and voice technology can be highly useful. For example, during the running of a simulation one or more of the trainees may have made a simple avoidable mistake. An administrator may observe the mistake being made by observation of the action within rendered window 1416. On observing the mistake, the administrator can actuate, e.g., button 1460 or timing marker 1465 to return the simulation to previous point in the simulation, to essentially allow the one or more trainees to "try again." An administrator may also re-start a present scenario by actuating a highlighted button of window 1448 (the designator for the presently active scenario can be highlighted). Apparatus 1000 can be configured so that moving pointer 1425 away from marker 2465 or reverse button 1460, or by actuating a button window 1448, starts the simulation up again at the selected prior point in a simulation. However, prior to or just after altering a simulation, an administrator may elect to broadcast a voice message to trainees being trained with use of apparatus 1000 explaining the reason why the simulation was altered (e.g., halted and returned to a previous point). The administrator may also elect to explain, via a live voice message, a proper set of action state requests of a trainee (the inputs that one or more certain trainees should take in completing a simulation).

Referring to the control interface screen display of FIG. 4b, apparatus 1000 can include voice button 2402. Apparatus 1000 can be configured so that when voice button 2402 is actuated to highlight the button 2402, voice communications are enabled and an administrator can broadcast live voice messages to trainee client computers having trainees registered therein. Apparatus 1000 can be configured so that live voice messages can be sent selectively to a subset of trainees currently registered into a simulation. Apparatus 1000 can include voice configuration button 2406. Apparatus 1000 can be configured so that when voice configuration button 2408 is actuated an administrator is presented with a configuration menu 2408 allowing an administrator to designate trainee client computers for which live voice communications are enabled. An administrator can enable voice communications between the administrator client computer and the trainee client computer at which the trainee "Richard" is registered by checking the box next to the name "Richard" in the configuration window 2408. Thereafter, live voice messages are sent when an administrator speaks.

Figure 1F:
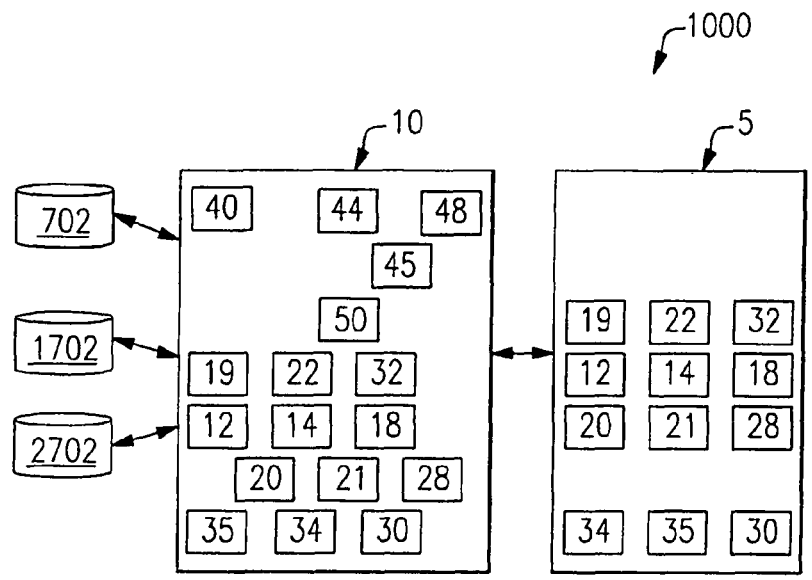
FIG. 1f illustrates another embodiment of an apparatus in which modules, which in other views are disposed in a central server, are disposed in a trainee client computer and in which a trainee client computer is in communication with an administrator client computer configured for use in setting up a simulation in a simulation set up mode and for use in altering a simulation in a simulation run mode.
Figure 1G:
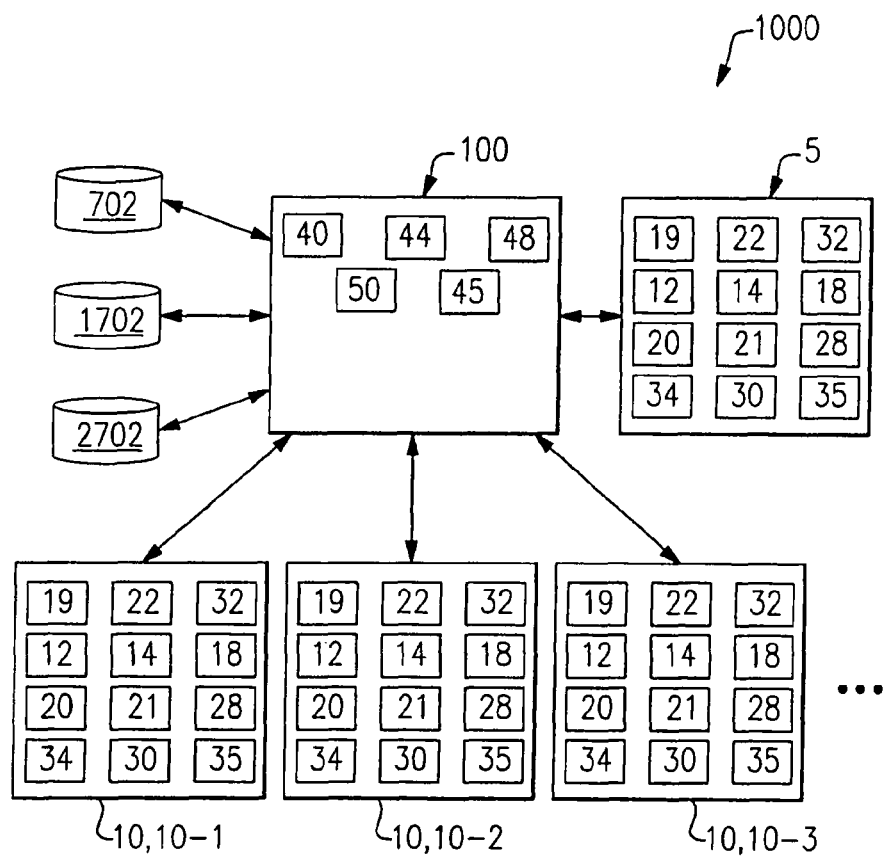
FIG. 1g illustrates another embodiment of an apparatus in which trainee client computers and an administrator client computer have audio input and output devices. Throughout the views of FIGS. 1a-1g, computers (including servers) depicted in separate boxes can be disposed externally relative to one another and spaced apart from one another. Computers (including servers) depicted as being disposed in different LANs are depicted as being disposed remotely (e.g., miles to thousands of miles) away from one another. All features discussed with reference to a limited number of the embodiments of FIGS. 1a-1g can be incorporated into any embodiment in which they are not discussed.

Trainees may also wish to send live voice messages to one or more fellow trainees and to an administrator. To the end that trainees can send live voice messages, trainee client computers 10 can incorporate acoustic input devices 34 and acoustic output devices, e.g., as shown in the embodiment of FIG. 1g. In one example, all trainee client computers 10, and the administrator client computer 5 can be provided by DELL Model M1210 and/or DELL Model M2010 laptop computers having built-in microphones and speakers. Further, each client computer 10, 5 can incorporate a WINDOWS XP or LINUX operating system and suitable VOIP software such as the TEAMSPEAK VOIP software suite available from TEAMSPEAK SYSTEMS. The trainee client computer 10 can be configured so that when live voice messages input by an associated trainee are input, the live voice messages are automatically broadcast to each other trainee client computer having a registered trainee and to administrator client computer 5.

Apparatus 1000 can be configured so that all trainees and the administrator can determine the trainee initiating the broadcast live voice message by observation of a rendered scene. Specifically, apparatus 1000 can be configured so that a voice highlight is rendered on displays of administrator and trainee client computers 5, 10 when a trainee broadcasts a live voice message so that trainee(s) and an administrator can discriminate which trainee is broadcasting the live voice message.

Referring to the concurrently rendered views of FIGS. 8a, 8b, and 8c, suppose that at the time views are being rendered, the first trainee at first trainee client computer 10-1 is broadcasting a live voice message. Apparatus 1000 can be configured so that at the time that the first trainee is broadcasting a live voice message, a voice highlight 820 can be rendered on the display of administrator client computer 5 and a second trainee client computer 10-2, and on other trainee client computers having a registered trainee so that the administrator and the trainees can discriminate, by observing the display, which trainee is broadcasting the live voice message. In the example of FIGS. 8a, 8b, and 8c, the voice highlight comprises an arrow and text with the words "talking" directed to a rendered model corresponding to the trainee broadcasting the live voice message. The name of the trainee talking can alternatively or additionally be displayed inside the arrow when a trainee talks. Server 100 can determine a name parameters by querying database 702 (column 717) by keying using an account number. A live voice message sent by a trainee could also be accompanied by a controlled rendering for the model corresponding to the trainee broadcasting the live voice message, as described previously in connection with an administrator broadcasting a live voice message, to create the appearance by way of animation or controlled texturing, that the model corresponding to the trainee sending the voice message is talking. Functionally enabling trainees to discriminate by visual observation which trainee is communicating a live voice message is particularly advantageous where trainee and/or administrator client computers are disposed remote from another as in the view of FIG. 1c, and the users are not in live view of one another.

Apparatus 1000 can also be configured so that trainees can selectively send live voice messages to a subset of the users of client computers of the apparatus. Each trainee client computer can include a user interface display screen feature such as described in connection with button 2406 and 2408 enabling a trainee at a trainee client computer to select a subject of trainees to which to send a voice message. Such user interface features can also be configured to enable the selection or de-selection of an administrator client computer for sending of a live voice message.

F. Administrator Character

In one embodiment, an apparatus can include an administrator character mode of operation. In one embodiment an apparatus can be configured so that a user administrator can enter an administrator character mode of operation by initiating a command using a user interface of an administrator client computer 5. When the administrator character mode of operation is entered an administrator model corresponding to an administrator can be rendered on the trainee client computers 10 of apparatus 1000 and on the administrator client computer 5. The apparatus 1000 can be configured so that an administrator can control animations of the administrator model in the manner of a trainee controlling a trainee model. Apparatus 1000 can be configured so that unless an administrator character mode of operation is entered, apparatus 1000 does not activate and does not render any administrator model corresponding to an administrator.

While the explaining by an administrator of to be taken steps with use of a live voice message may be sufficient to convey proper steps of a process, it may be advantageous to incorporate additional functionality into apparatus 1000 for purposes of enhancing the capacity of apparatus 1000 to convey information to a trainee. In one embodiment, apparatus 1000 can include an administrator character mode of operation. In an administrator character mode of operation a controlled digital character is activated for the administrator together with a model for the administrator and associated animation routines for the administrator model. When an administrator character mode of operation is entered, an administrator may control animations and associated state occupations of the administrator model in the manner of trainee controlling a controlled digital character as described herein. In the specific example described with reference to FIG. 4b, an administrator character mode of operation can be entered by actuating button 1464. When button 1464 is actuated, apparatus 1000 enters an administrator character mode of operation.

An administrator character mode of operation is useful in demonstrating a proper procedure to be carried out relative to a work subject. An administrator can enter the administrator character mode of operation, and then make various action state requests when in the mode to cause certain animation routines of the administrator model to be run. Apparatus 1000 can be configured so that when an animation routine of an administrator model is run on each client computer 5, 10, a work subject model is rendered in accordance with the animation routine on the display of each client computer 10, 10-1, 10 (N−1), 10-N such that the trainee at each trainee client computer can observe the proper procedure.

By activating voice communications at the time an administrator character mode of operation is active an administrator can be communicating live voice messages to one or more trainees while controlling a controlled digital character and animation routines of a corresponding administrator model. Referring to the control interface of FIG. 4b, a control user interface can include an animated voice button 2404. Apparatus 1000 can be configured so that when animated voice button 2404 is actuated with the administrator character mode of operation active, apparatus 1000 controls scene renderings at the various client computers 5, 10 so that an administrator character model renders at various client computers the appearance of talking when live voice messages are sent. Such control can be provided with use of mouth movement animation routines and/or with use of controlled texturing. In addition to or in place of controlling scene renderings so that a model corresponding to a character has the appearance of "talking." Apparatus 1000 can be configured so that when an administrator sends a live voice message, text is displayed on the display of each trainee client computer receiving the message indicating that an administrator is sending a live voice message. Such text indicating that an administrator is sending a live voice message enables trainees at the various trainee client computers to determine, by observation of the display on their respective trainee client computers, that the live voice message being received has been sent by the administrator and not by a fellow trainee. Referring to the trainee client computer screen display of FIGS. 8b and 8c, apparatus 1000 can be configured so that trainee client computers 10, 10-1 and 10, 10-2 display the text "ADMINISTRATOR TALKING" at area 830 selectively at the time that an administrator sends a live voice message so that the trainees at the first and second trainee client computers can determine that the administrator, not a fellow trainee, has sent the live voice message. Apparatus 1000 can be configured so that if animated voice button 2404 is actuated at the time that an administrator character mode is not active, and the work subject is a character such as a patient, scene renderings are controlled at various client computers so that the work subject model has the appearance of talking when live voice messages are sent from administrator client computer 5.

G. Viewing

A training apparatus 1000 can be configured so that an administrator can initiate commands using a user interface of an administrator client computer 5 to change a view of a scene currently being rendered on a display of the administrator client computer. In one embodiment, by initiating a certain command using a user interface of an administrator client computer 5, an administrator can cause a rendering module of an administrator client computer 5 to render on a display of the administrator client computer 5 the view currently being rendered for observation by a trainee by a rendering module of a certain trainee client computer. By initiating another certain command using the user interface of an administrator client computer, an administrator can cause the rendering module of the administrator trainee client computer to contemporaneously render on its display the views currently being rendered on each client computers 10 having a presently logged in trainee.

Exemplary screen displays that can be rendered by an apparatus 1000 in a simulation run mode of operation are described with reference to FIG. 4b. In a simulation run mode it has been mentioned that a first client computer 10-1 can be displaying a first perspective first person view of a scene and at the time that such a scene is being rendered, a second client computer 10, 10-2 can be rendering a second perspective view of the common scene being rendered by the first trainee client computer 10, 10-1. At the time that the first and second trainee client computers are rendering first and second first person views of a common scene, a rendering module of administrator client computer 5 can be rendering a third perspective view of the common scene. Exemplary screen displays that may be concurrently rendered by an administrator client computer 5, and first and second trainee client computers 10-1, and 10-2 are illustrated in the screen display views of FIGS. 8a, 8b, and 8c. By way of example, at a certain time during operation of apparatus 1000 in a simulation run mode, first client computer 10, 10-1 can render a scene as shown in FIG. 8b, a second client computer 10, 10-2 can render a scene as shown in FIG. 8c, and an administrator client computer 5 can render a scene as shown in FIG. 8a. Each of the views of FIGS. 8a-8c represent a common scene and each can be rendered concurrently. Referring to FIG. 8a, the rendered scene rendered on a display of an administrator client computer 5 includes a rendered model 810 corresponding to a first trainee, a rendered model 814 corresponding to a second trainee, and a rendered model 818 corresponding to a work subject, in the example shown is an equipment article in the form of a defibrillator machine. The common scene rendered at first trainee client computer 10-1 is a first person view of the scene in the perspective view of the first model. The rendered scene at first trainee client computer in the specific example included rendered work subject model 818. On second client computer 10, 10-2 being observed by a second trainee there is rendered a rendered first trainee model 810, and a rendered work subject model 818.

Referring to window 1412 of the exemplary run mode screen display of FIG. 4b, window 1412 includes a plurality of buttons whose functionality is herein described. In a default mode in one embodiment, administrator client computer 5 in window 1416 can display a perspective view of a scene concurrently rendered by first client computer 10, 10-1 and second client computer 10, 10-2 but the perspective view being rendered in window 1416 is different from the respective perspective views being rendered on first and second trainee client computers. Also, apparatus 1000 can be configured so that apparatus 1000 maintains a camera at such a camera position so that an administrator view presented in window 1416 has a larger field of view than the field of view concurrently rendered at the trainee client computers 10, thus assuring that an administrator can comprehensively observe animation routines run for models during a simulation. An embodiment wherein an administrator client computer 5 and a pair of trainee client computers concurrently render first, second and third perspective views of a common scene is illustrated in FIGS. 8a, 8b, and 8c. Apparatus 1000 can be configured so that by actuation of button 1420 or button 1422 a view in window 1416 changes. Apparatus 1000 can be configured so that actuation of button 1420 or button 1422 toggles between various views such as a first camera view, a second camera view, a third camera view, and a fourth camera view. In the case a rectangular room is being rendered, the first through fourth camera views can represent camera positions at the four upper corners of the rendered room. By actuation of button 1420 or button 1422, an administrator can also toggle into a view of each trainee model. By actuating button 1465, a command is initiated to render a full screen view on display 30 of administrator client computer 5. A full screen view is illustrated in FIG. 8a. A back button 1468 can be displayed when the full screen view is displayed, allowing an administrator to return to the screen display of FIG. 4b.

Apparatus 1000 can be configured so that by highlighting trainee view button 1426 a trainee view is rendered in window 1416 of administrator client computer 5, i.e., the view presently being displayed on a selected one of the trainee client computers 10 of apparatus 1000. The selected one client computer can be selected using data entry field 1428. Apparatus 1000 can also be configured so that trainee views are also rendered by actuation of tab button 1432. Apparatus 1000 can be configured so that when button 1432 is actuated tab window 1434 is displayed. Tab window 1434 includes windows 1436, 1438, 1440 in which are rendered the views currently being rendered at each respective client computer 10 of apparatus 1000. In the example described with reference to FIG. 4b, there can be three trainees currently being trained with use of apparatus 1000. Accordingly, there are rendered three views within the window of tab window 1434.

H. Command Differentiation

Still referring to an embodiment of apparatus 1000 incorporating an administrator client computer, a user interface of an administrator client computer can be configured to be different from the user interface of each trainee client computer and can include control interface screen displays and/or control buttons not among those included in a user interface of at least first or second trainee client computers. Further, apparatus 1000 can be configured so that a set of commands that can be initiated using a user interface of an administrator client computer can be different from a set of commands that can be initiated using a user interface of a trainee client computer. Apparatus 1000 can be configured so that commands that can be initiated with use of a user interface of an administrator client computer include commands that are not among a set of commands that can be initiated with use of a user interface of either of at least a first or second trainee client computer having the trainee user interface. Referring to Table F, Table F lists exemplary command sets which can be initiated with use of an administrator user interface of an administrator client computer and with use of a trainee user interface of an apparatus's trainee client computers respectively. In one embodiment, the command set list for the user interface of the trainee client computers is a complete command set list.

TABLE F

| Administrator Client Computer | | Trainee Client Computers 10, 10-1, 10-(N-1), 10-N | |
|---|---|---|---|
| Command | Result | Command | Result |
| Change state (change object attribute) | Changes a state of a non-trainee digital entity by changing an object attribute. An animation routine for a work subject model can be run responsively to the state change. | Destination Request | If request is granted, causes movement animation to be run for trainee model corresponding to trainee that initiates command. Can result in a state change and/or animation routine for work subject model to be run. |
| Change scenario | Changes multiple states. An animation routine for a work subject model can be run responsively to the state change. | Action Request | If request is granted, causes action animation routine to be run for trainee model corresponding to trainee initiating command. Can result in a state change and/or animation routine for work subject model to be run. |
| Run animation routine | Runs an animation routine for a work subject model without changing a state. | | |
| Change view (e.g., trainee1 view, trainee2 view, multiple trainee views) | Changes a present view presented on a display of an administrator client computer | | |
| Administrator character Destination request Action Request | Causes an administrator character mode of operation to be entered and provides to an administrator commands that can be initiated by the one or more trainees. Enables destination request commands and action request commands to be initiated using administrator client computer user interface | | |
| Reverse | Causes reverse play of previously rendered display screen | | |
| Return to point | Causes return of simulation to prior point | | |
| Personnel database view | Causes formatted display screen to be displayed with data from personnel database | | |

TABLE F-continued

| Administrator Client Computer | | Trainee Client Computers 10, 10-1, 10-(N-1), 10-N | |
|---|---|---|---|
| Command | Result | Command | Result |
| Patient database view | Causes formatted display screen to be displayed with data from patient database | | |
| Equipment Article Database View | Causes formatted display screen to be displayed with data from equipment article database | | |

It is seen with reference to Table F that a set of commands which can be initiated in a simulation run mode with use of a user interface of an administrator client computer can be more expansive than a set of commands that can be initiated with use of a user interface of a trainee client computer of the apparatus. Further, the set of one or more commands that can be initiated in a simulation run mode with use of a trainee user interface of a trainee client computer can be less expansive than a set of commands that can be initiated with use of an administrator user interface of an administrator client computer. The set of one or more commands that can be initiated with use of an administrator user interface can include commands that are not among a set of commands that can be initiated with use of a user interface of a trainee client computer. For example, a user interface of an administrator client computer can be configured so that "a change object attribute" command may be initiated with use of the administrator user interface. A change object attribute command can result in an animation routine for a work subject model to be run without initiation of destination request command or action request command. In the example of Table F, a trainee can cause an animation routine for a work subject model to be run by initiating an action request command with use of a trainee user interface. Restricting the set of commands which can be initiated with use of a trainee client computer can be advantageous since such restricting can assure that a trainee does not control a simulation in a manner that would be unfairly favorable to the trainee. Accordingly, restricting a set of commands available to a trainee ensures that a simulation score of a trainee is an accurate indicator of performance of the trainee. While not indicated in the specific example of Table F, (where an administrator has access to a destination request command and an action request command by initiating a command to enter an administrator character mode of operation), it can be advantageous in some embodiments so that a set of commands that can be initiated with use of trainee user interface include commands that are not among commands that can be initiated with use of a user interface of an administrator client computer. In one embodiment, a user interface of each trainee client computer can enable the initiation of the restricted and limited set of commands listed in Table F, and a user interface of the administrator client computer can enable the initiation of all of the commands that have been discussed herein in relation to the administrator client computer.

IV. Integration of Databases

As indicated in the embodiment depicted views of FIGS. 1c-1g, apparatus 1000 can also include and be in communication with a personnel database 702 including parameters and additional information. The personnel database 702 can include parameters such as name, sex, position, salary, date of birth, educational attainment, simulation scores, type of personnel (e.g., employee or contractor and the like). The personnel database 702 can be a legacy database pre-existing the installation of a central server 100, trainee client computers 10, and administrator client computer 5 into the apparatus 1000. In another example, personnel database 702 can be stored in central server 100. The personnel database 702 can be an enterprise database such as a corporation employee database, a government agency database, or other personnel database such as a hospital database for storing information respecting workers at a certain hospital, wherein the workers do not have a common corporate affiliation. With reference to the view of FIG. 1c, personnel database 702 can be incorporated into a server 120 maintained by an enterprise commissioning use of apparatus 1000 for training workers. As will be described in further detail herein, apparatus 1000 can also include and be in communication with work subject databases 1702, 2702, which like database 702, can be legacy enterprise databases pre-existing the installation of server 100, and client computers 5, 10. Apparatus 1000 can incorporate client software for viewing in formatted form, data of each of databases 702, 1702, 2702. Workstation computers 802 can be legacy workstation computers that have been configured to view data of databases 702, 1702, 2702 prior to the installation of server 100, and client computers 5, 10.

Figure 7A:
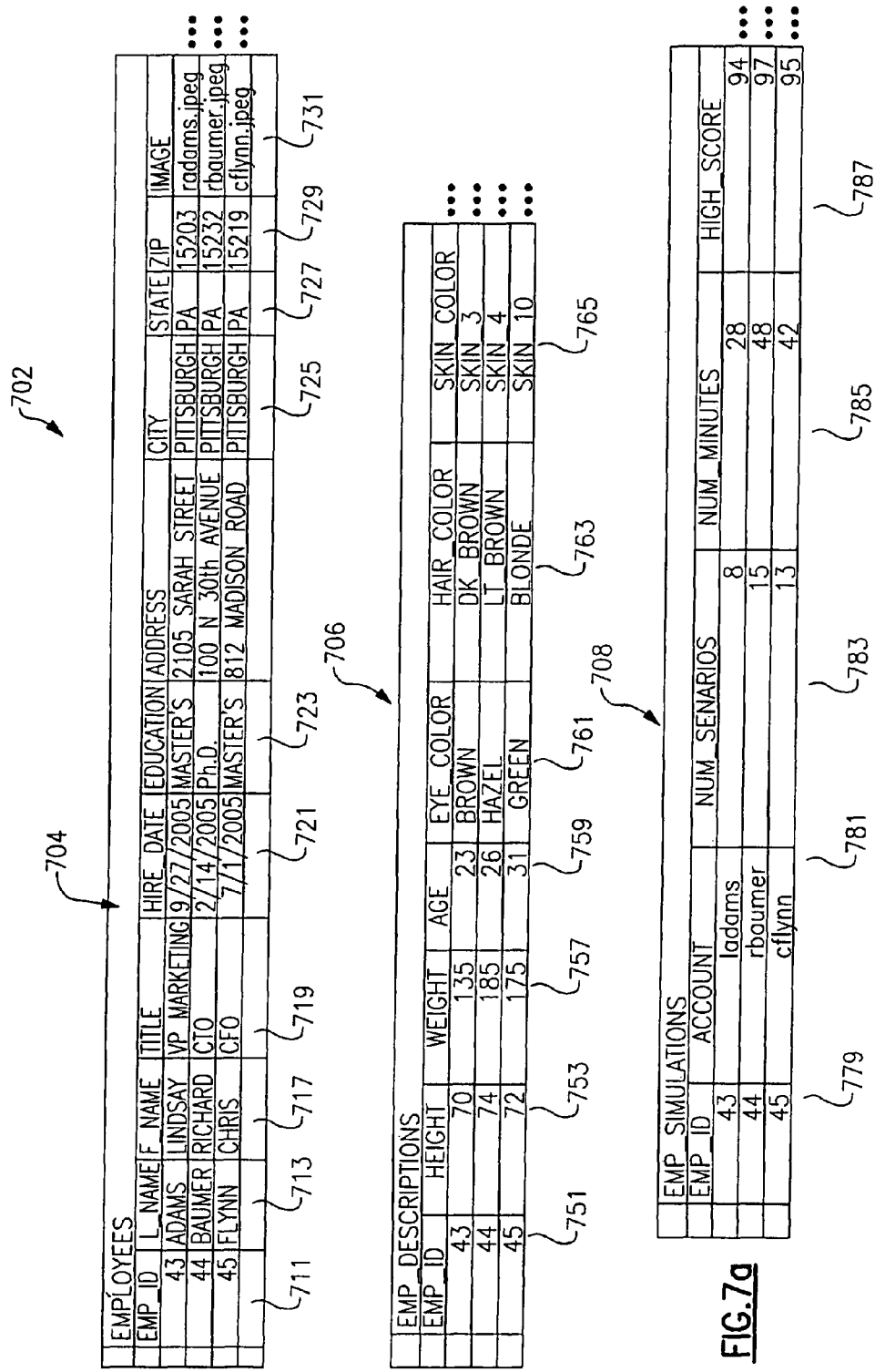
FIG. 7a illustrates an exemplary structure for a personnel database. A personnel database can be a multi-table relational database. Data can be extracted from a personnel database for setting up a simulation.

A representation of enterprise personnel database 702 is shown in FIG. 7a. Database 702 can be a multiple related database as shown in FIG. 7a. Database 702 can include multiple tables such as table 704, table 706, and table 708. Table 704 in the example shown is a main table, table 706 is a physical characteristic table and table 708 is a simulation table. In the example shown, database 702 can be a legacy database pre-existing the installation of clients 5, 10 and server 100 into apparatus 1000. However, in the example shown, the legacy database is updated to include a new table 708, summarizing data determined from personnel being trained with use of apparatus 1000.

Information can be extracted from the personnel database 702 and can be used by apparatus 1000. Information extracted from personnel database 702 can be utilized in setting up a simulation. In one example, information extracted from the personnel database 702 can be utilized to determine a set of possible animation routines of a trainee model. In another example, information extracted from a personnel database can be used to determine a characteristic of a trainee model. A rendered trainee model can, therefore, have an appearance automatically determined by data extracted from a personnel database. A recollection of a trainee as well as an attention intensity of a trainee can be expected to improve if there are rendered models of trainees having appearances that closely resemble the actual appearances of such trainees.

In one embodiment, models rendered on client computers 5, 10 can be built by server 100 prior to being distributed to client computers 5, 10. Parameters can be extracted from database 702 in the following manner. A trainee can be presented with a trainee registration screen display as shown in FIG. 6g enabling a trainee to register into a training simulation which is currently running or which is yet to be run. A trainee can enter a unique training simulator account number into data entry field 2602, and can enter a password into field 2606. If a pre-existing account number and password are entered, server 100 can be allowed to query database 702. When continue button 2602 is actuated, apparatus 1000 can be configured so that if an account number has not been entered and continue button 2602 is actuated, data entry window 2610 can be displayed. Regarding data entry window 2610, apparatus 1000 can be configured to allocate an account number to a trainee when information in the data entry fields of window 2610 is entered and continue button 2612 is actuated. Apparatus 1000 can be configured to prompt a trainee for a password if continue button 2602 is actuated without a password being entered. Referring to database 702, database 702 can be established so that an account number parameter is the primary key of table 708, wherein employee ID is a foreign key of table 708 and the primary key of tables 704, 706. Apparatus 1000 can be configured so that when an account ID parameter has been entered into field 2604, and continue (register) button 2602 has been actuated, server 100 can send a Structured Query Language (SQL) command to database 702 querying database 702 using the account number primary key in order to return one or more parameters from database 702 for use in determining enabled and disabled animation routines for the registering trainee, and/or model characteristics and/or textures for the registering trainee. Such parameters can be, e.g., a job title parameter, a salary parameter, an age, (DOB) parameter, a date of hire parameter, an educational parameter, or a simulation score parameter.

It has been described that trainees can make action state requests using input device 12 and that animation routines of a trainee model can be run on the successful occupation of an action state by a controlled digital character. In one embodiment, apparatus 1000 can be configured so that the set of enabled animation routines for trainee models of apparatus 1000 is differentiated between the various models of the network 500. In one embodiment, certain controlled digital characters can be granted powers that are not granted to certain other controlled digital characters. To implement such programming certain action states, and their associated animation routines can be disabled for certain controlled digital characters and enabled for other controlled digital characters.

Apparatus 1000 can be configured to utilize information extracted from personnel database 702 in determining whether to enable or disable action states associated animation routines of a controlled digital character. In one example, server 100 can utilize a job title parameter from database 702 in determining whether to enable an animation routine for a particular controlled digital character. In another example, server 100 can be configured to utilize a salary parameter in determining whether to enable and animation routine for a particular controlled digital character. In another example server 100 can be configured to utilize a simulation score parameter in determining whether to enable and animation routine for a particular controlled digital character. For example, server 100 can query database 702 using an account number parameter to return a simulation score parameter (column 787) to determine animation routines that are enabled for a model corresponding to a trainee entering into a simulation. In another example server 100 can be configured to utilize a date or birth (age) parameter in determining whether to enable and animation routine for a particular controlled digital character. In another example, server 100 can be configured to utilize an education attainment parameter (e.g., high school, college, advanced degree) in determining whether to enable and animation routine for a particular controlled digital character. In another example, server 100 can be configured to utilize a date of hire parameter in determining whether to enable an animation routine for a particular controlled digital character.

Differentiation between animation routines that are enabled for various trainee models of apparatus 1000 provides significant advantages. It may be desirable to restrict action states and associated animation routines for certain types of trainees. Such restricting can be useful in reminding a trainee that the trainee is not permitted to take a certain action outside of a training simulation. Apparatus 1000 can be configured so that apparatus 1000 displays on a display of a trainee client computer an error message (e.g., "REQUESTED ACTION NOT PERMITTED") where a trainee requests an action that is not permitted by apparatus 1000.

In one embodiment, all models of apparatus 1000 are generic pre-formed models. In another embodiment, apparatus 1000 is configured to establish models for apparatus 1000 in such manner that the models automatically take on physical characteristics of a trainee registering into a simulation. In one specific embodiment, server 100 can be configured to construct trainee and work subject models, and distribute such models to client 5, 10 prior to their rendering. Server 100 can be configured to utilize information extracted from personnel database 702 in determining a characteristic of a model corresponding to a trainee. Server 100 can utilize such information in determining a characteristic of a model for a certain trainee and/or textures for a model prior to distributing a model to client computers 5, 10 which require the model. A characteristic of a model can be, e.g., a complete model where a parameter is used to select a candidate model from a set of candidate models or a model feature when a model is built by compositing multiple model features. Information which can be extracted from personnel database 702 for use in determining a model characteristic and/or for determining a texture for a model can include, e.g., a job title parameter, a sex (male or female) parameter, a height parameter, an age parameter, a hair color parameter, an eye color parameter, and a date of birth (age) parameter. A personnel database 702 can also include a reference to an image in column 731 associated with a particular person and apparatus 1000 can utilize such an image in building a model for specific trainee.

In one embodiment, server 100 can store male and female versions of models corresponding to a plurality of different job titles. For example, in the patient example, server 100 can store a male doctor model, a female doctor model, a male nurse model and a female nurse model and can incorporate a table correlating the models with various sex and job title parameters. In order to select the correct base model for a trainee registering into a simulation, server 100 can query database 702 to determine the sex and job title of the trainee utilizing a parameter (e.g., an account number) entered into the display screen of FIG. 6g, and then can query the server table to select the correct table. Color variations, e.g., eye color, hair color, skin color can be accomplished by varying textures applied to models. Server 100 can store a plurality of different textures for each of eye color, hair color, skin color, and a table can be included in server 100 correlating the various textures with parameters of database 702. Such a table can be queried using parameter data to return texture.

In one example, apparatus 1000 stores a plurality of candidate faces for trainee models. Apparatus 1000, in selecting one of the candidate faces for a trainee model, can extract an image file reference from column 731 of personnel database 702, access the referenced image file, process the image file to derive a set of signature components for the image file, compare the signature components to stored signature components of the set of candidate faces, and select a candidate face as the face of the built model utilizing best fit selection methodology. The described method for determining animation routines, model characteristics and textures for a trainee model can be used to determine animation routines, model characteristics and textures of an administrator model of an administration character mode of operation.

Apparatus 1000 can also include and be in communication with or more work subject databases 1702, 2702. In the embodiments of FIGS. 1c-1g, apparatus 1000 includes a database 1702 relating to a person and equipment article database 2702 relating to an equipment article. Database 1702 can be a patient database where a work subject model relates to a patient. Database 1702 can be a legacy database pre-existing the installation of server 100, and client computers 5, 10. Database 2702 can also be a legacy database pre-existing the installation of server 100, and client computers 5, 10. Database 1702 can be a patient database storing information regarding actual patients by a hospital or other patient care center. Database 2702 can be an equipment database storing information regarding actual equipment articles for which trainees are receiving training. Apparatus 1000 can utilize information from one or more of database 1702 and database 2702 in setting up a simulation. Apparatus 1000 can be utilized to train trainees respecting medical processes to be carried out with respect to an actual patient to receive care so that care givers can practice a treatment on a virtual patient corresponding to a live patient prior to encountering a live patient. Referring to the setup screen display of FIG. 4a, the setup screen display can include patient button 2420. Actual patient data can be used to set up a simulation so that the simulation can provide training with respect to an actual patient. Apparatus 1000 can be configured so that when patient button 2420 is actuated, window 2426 is displayed having a name data entry field 2428 and a patient ID data entry field 2430. When data is entered into one or more of the fields 2428, 2430 and enter button 2431 is actuated, server 100 can send an SQL command to query database 1702 keying database 1702 using the entered data for returning parameters from database 1702 for use in setting up a simulation. Parameters that can be returned to server 100 for use in setting up a simulation include a sex (male or female) parameter, a DOB parameter, and various vital signs parameters, e.g., BPM, body temperature and the like. Server 100, which can set up simulation rules and models prior to distribution to various client computers 5, 10, can utilize parameters extracted from database 1702 in determining which of set of animation routines are enabled or disabled for a patient work subject model, and can also utilize parameters from database 1702 in determining models and/or model textures for work subject model. For example, server 100 can utilize age (DOB) and sex (male or female) parameters in both enabling animation routines in determining a characteristic of a model and/or texture of a model. A different set of animation routines may be enabled for older patients that are not enabled for a younger patient. For example, a set of rules of a simulation can be differentiated based on an age parameter from patient database 1702.

Under a first set of rules corresponding to a first age, a first set of animation routines may be enabled under a second set of rules corresponding to a second age, a second set of animation routines can be enabled. Also server 100 can store a stock set of patient models for patients of various ages and sexes and can select the model most closely correlated with age and sex parameters from patient database 1702.

Apparatus 1000 can also include and be in communication with an equipment article database 2702 such as a database of equipment articles for which trainees are receiving training. Server 100 can be configured to extract data from database 2702 in setting up a simulation by establishing animation routines that are enabled or disabled for an equipment article work subject model and for determining at least one characteristic of a model for an equipment article work subject model utilizing parameters from database 2702. For example, apparatus 1000 can be configured so that a set of animation routines enabled for an equipment article work subject model are differentiated based on a model number parameter. Apparatus 1000 can be configured so that if an administrator actuates equipment button 2422, window 2434 including equipment ID field 2436 is presented. If an equipment ID is entered into field 2433 and enter button 2437 is clicked on, server 100 can send an SQL command to database 2702 querying database 2702 utilizing the entered ID data to return one or more parameters to server 100 for use in setting up a simulation. One parameter can be an equipment model number. Server 100 can be configured to establish a set of animation routines that are enabled or disabled for a work subject model based on a model number parameter extracted from database 2702. For example, rules of a simulation can be differentiated based on equipment model number and a set of enabled animation routines for a work subject model can be differentiated based on which set of rules are enabled. Server 100 can also determine at least one characteristic of a model and/or model texture utilizing one or more parameters extracted from database 2702. For example, server 100 can store a plurality of stock models and textures or each of a plurality of model numbers, and can extract model number parameter from database in the manner described for use in selecting the appropriate model and texture.

A representation of a patient database is shown in FIG. 7c. A representation of an equipment article database is shown in FIG. 7d. Administrator client computer 5 can include client software for viewing data of database 1702. The client software can format data of database for viewing as indicated in the formatter window of FIG. 7e. Administrator client computer 5 can also include client software for viewing data of database 2702. Such client software can format data of database 2702 for viewing as indicated by the formatted window view of FIG. 7f.

Figure 7B:
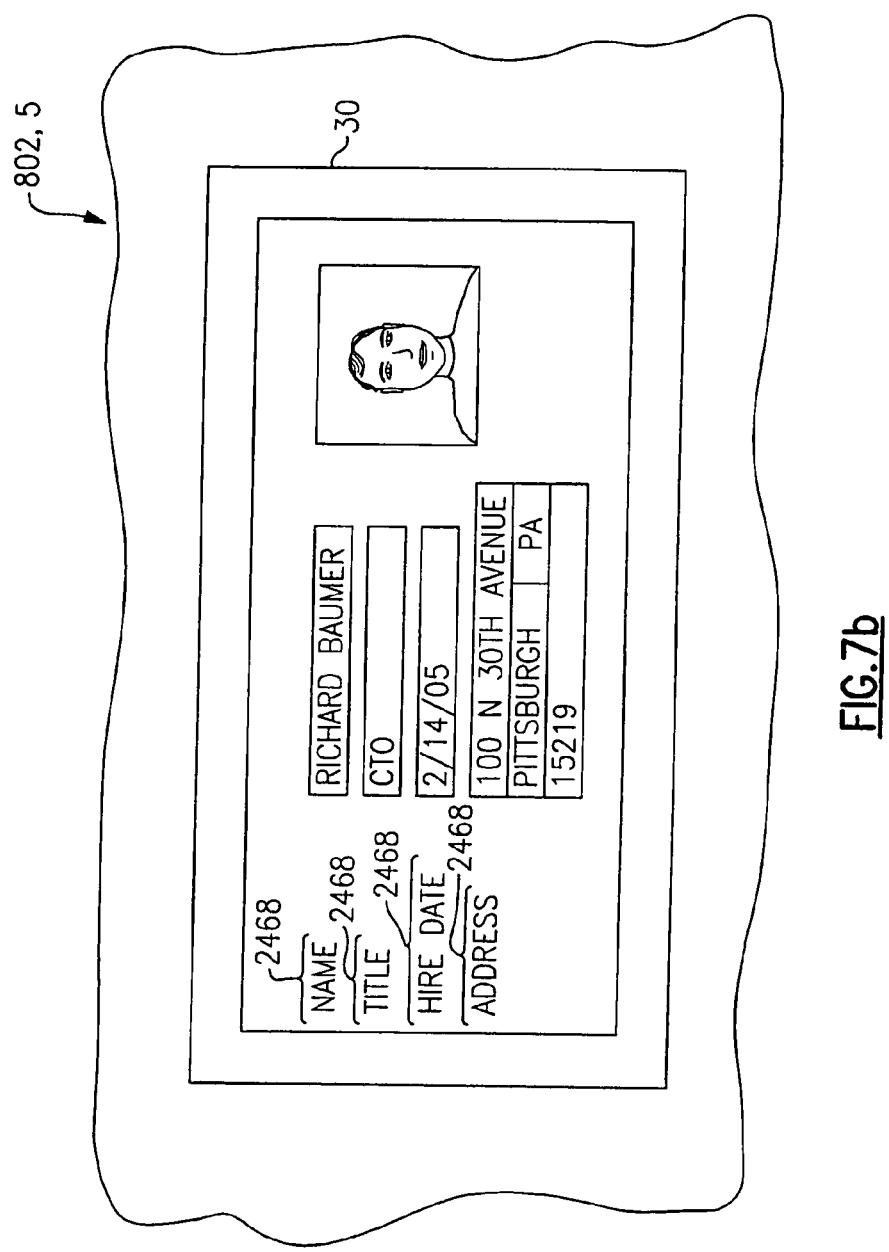
FIG. 7b is an exemplary screen display of a computer having client software for presenting a formatted view of contents of a personnel database. Prior to installation of trainee client computers, a central server and an administrator client computer, various work station computers in communication with a legacy personnel database can have software for presenting a formatted database view as shown in FIG. 7b. Such database client software for viewing contents of a database can be incorporated in an administrator client computer of a training apparatus so that an administrator working at an administrator client computer can view content of the database at any time during operation in a simulation run mode. The data displayed in formatted screen view of FIG. 7b may display parameters used in setting up a simulation (e.g., in establishing enabled/disabled animation routines and/or models and/or textures of a trainee model) and may also include parameters not used in setting up a simulation.

Referring to the run mode control interface display screen of FIG. 4b a run mode administrator control interface can include patient database button 2442 and equipment database button 2444. Apparatus 1000 can be configured so that if button 2442 is actuated, an administrator is presented with the formatted database data viewing screen of FIG. 7e which can be displayed on display 30 of administrator client computer 5 on a single actuation of button 2442. The formatted database data viewing screen display of FIG. 7e can display parameter data that is utilized in the setting up of a simulation together with parameter data that is not utilized in the setting up of a simulation. Apparatus 1000 can be configured so that if button 2444 is actuated an administrator is presented with the formatted database data viewing screen of FIG. 7f which is displayed on the display 30 of administrator client computer 5 on a single actuation of button 2444. The formatted database data viewing screen display of FIG. 7f can display parameter data from database 1702 that is utilized in the setting up of a simulation together with parameter data that is not utilized in the setting up of a simulation. Apparatus 1000 can be configured so that when apparatus 1000 displays a database parameter data viewing screen window as shown in any one of FIGS. 7b, 7e, and 7f, apparatus 1000 displays the window in such a position on a screen so as not to interfere with the viewing of a window being displayed at the time the command to initiate the viewing of the database data viewing window was received. Accordingly, an administrator can view database data side by side a rendered scene of the present simulation. With further reference to FIG. 4b, a run mode control interface of administrator central can also include simulation database viewing button 2449. Apparatus 1000 can be configured so that when button 2449 is actuated, an administrator can be presented with a formatted view of data being recorded during a current simulation. For example, apparatus 1000 can be configured so that when button 2449 is actuated for a particular trainee, a display window including the data presented in the view of FIG. 6b is presented on the display of the administrator client computer for the particular trainee. Formatted database data viewing screens as referred to herein can display data in a formatted manner, e.g., with parameters being displayed at specific relative positions of a display window, and possibly with explanatory text 2460, 2468 explaining parameters displayed at certain positions within a display window. Explanatory text of a formatted database data viewing screen display can include parameter specific explanatory text 2648 describing a specific parameter and global explanatory text 2460.

A run mode control interface of an administrator client computer can also include trainee database buttons 2448. Apparatus 1000 can be configured so that if button 2448 is actuated, an administrator is presented with the formatted database data viewing screen of FIG. 7b which is displayed on display 30 of administrator client computer 5 on a single actuation of button 2448. The formatted database data viewing screen display of FIG. 7b can display parameter data from database 702 that is utilized in the setting up of a simulation together with parameter data that is not utilized in the setting up of a simulation.

The inclusion of database viewing buttons 2442, 2444, 2448, 2449 into a run mode control interface of administrator client computer 5 provides significant advantages. An administrator may wish to quickly toggle into database views in order to determine whether to alter a simulation. For example, in viewing data of a patient database 1702, an administrator may notice that an actual patient in the real world responded in a certain way to a certain treatment and may wish to manually force that actual result in a simulation even if in conflict with presenting actual rules of the simulation. An administrator may also note in viewing data from database 2702 that a certain machine responded in a certain way to certain services applied to the machine in the real world and may wish to manually force a certain simulation change in view of that actual response. An administrator may also view data from database 702, and may which to manually force a simulation change in view of that data. For example, an administrator may note that a particular trainee is very highly paid and may wish to make a simulation more difficult in view of that information, or easier if the trainee is low paid and has little experience.

While it has been described that server 100 can query databases 702, 1702, 2702, apparatus 1000 can be configured so that another computer queries one or more of databases 702, 1702, 2702 for parameters for use in setting up a simulation, e.g., administrator client computer 5 or a trainee client computer 10.

V. Network Integration

Referring to the view of FIG. 1b, apparatus 1000 can be incorporated into a wide area network. Server 100 can be located at a server center 410 disposed remote (e.g., miles to thousands of miles) with respect to each trainee client computer 10-1, 10-2 . . . , 10-(N−1), 10-N, and each trainee client computer 10-1, 10-2 . . . , 10-(N−1), 10-N shown as being provided by a plurality of portable laptop PCs, can be disposed remote with respect to each other trainee client computer. Each trainee client computer can be included in a local area network (LAN) as is indicated by LAN 422, LAN 424, and LAN 426. Server 100 can be spaced apart from each trainee client computer 10 and each client 10 computer 10 can be spaced apart from each other trainee client computer. Apparatus 1000 can be configured so that one trainee, e.g., trainee 510-1, 510-2, 510-3 controls each client controller, e.g., computer 10-1, 10-2, 10-3. While each trainee client computer is shown in the particular embodiment as being provided by a single PC having a single housing, each trainee client computer can have processing modules distributed in different housings, e.g., different PCs. Server 100 and LANs 422, 424, and 426 via suitable gateways 610 may be in communication over an IP network 620, which in one embodiment is the Internet. Server 100 and trainee client computers 10-1, 10-2 . . . , 10-(N−1), 10-N can, in the alternative, all be incorporated in a common local area network. For example, server 100 and computers 10-1, 10-2 . . . , 10-(N−1), 10-N can be incorporated in a local area network installed at a hospital or manufacturing facility. Apparatus 1000 can also have a plurality of additional servers such as server 110 and server 120. Servers 100, 110, 120 can each be constituted by one or more computers. In one embodiment, each server 100, 110, 120 is a plurality of linked PCs. In another embodiment, each server 100, 110, 120 is a blade center. Server 110 can be server that is part of LAN 412 which is maintained by the software developer developing the software of server 100 and clients 10, while server 120 can be a server located at LAN 414 which is maintained by a business entity using apparatus 1000 to train a workforce team. Each LAN 410, 412, 414, 422, 424, and 426 can be disposed remote (e.g., miles to thousands of miles) with respect to each other LAN. In another aspect, apparatus 1000 can be configured so that server 100 generates performance scores for each trainee who has entered a simulation and produces a performance report. The scoring of each trainee can be based on how well the trainee cooperated with other trainees during the simulation. For example, a trainee may be allocated a point for each incident in which the trainee controlled a controlled digital character in a coordinated manner with another trainee to yield a desired attribute change and/or animation change of a non-trainee digital character. Apparatus 1000 can be configured so that at the end of a simulation, server 100 automatically sends a report summarizing the performance of each trainee of a simulation to server 120 being maintained by a business entity using apparatus 1000 to train a workforce team. Also, apparatus 1000 can be configured so that at the end of a simulation, server 100 automatically sends a report summarizing the performance of each trainee of a simulation to server 110. After analysis by personnel at LAN 412, personnel at LAN 412 may forward the report to server 120.

In the view of FIG. 1c, an embodiment of apparatus 1000 similar to the embodiment of FIG. 1b is shown. In the embodiment view of FIG. 1c, apparatus 1000 includes administrator client computer 5 and personnel database 702. Apparatus 1000 further includes work station computers 802 disposed in LAN 414 for accessing and viewing information stored in personnel database 702. A substantially locally installed embodiment of apparatus 1000 is shown in the view of FIG. 1*d*. In the embodiment depicted in the view of FIG. 1*d*, a worker training computer network 500 including server 100, trainee client computers 10 and administrator client computers are disposed in LAN 414 at a facility operated and maintained by an enterprise commissioning the use of apparatus 1000 in the training of workers associated with the enterprise. In the embodiment of FIG. 1*d*, a remote component of apparatus 1000 is provided by LAN 412 including developer server 110 which is situated in a facility maintained by a developer of specialized software of apparatus 1000. Personnel at LAN 412 can send software updates to worker training computer network 500 over IP network. In the embodiment of FIG. 1*e* a cellular network implementation is illustrated. In the embodiment of FIG. 1*e*, server 100 is disposed at LAN 412 situated at a developer facility. Trainee client computers 10, 10-3, 10, 10-4, 10, 10-5 are in wireless communication with server 100 by way of a cellular network 630, such as a GSM/GPRS network which is in communication with IP network 620 coupled to LAN 414. Administrator client computer 5 can be disposed at LAN 414 situated at a facility maintained by an enterprise, such as a business entity commissioning the use of apparatus 1000 for training. Administrator client computer 5 can be in communication with server 100 located remotely in relation thereto by way of IP network 620. Trainee client computers 10, 10-3, 10, 10-4, 10, 10-5 in the embodiment of FIG. 1*e* can be provided by mobile cellular telephones. Trainee client computers 10, 10-1, and 10, 10-2 are disposed in a common LAN 5 with administrator client computer 5. In the views of FIGS. 1*d* and 1*e*, at least one client computer 5, 10 is shown as being in wireless communication with server 100 and, therefore, with another client computer via access point 125, such as an IEEE 802.11 access point, shown as being connected to a LAN bus.

Server 100 in any of the embodiments described can be deleted and the processing modules of server 100 can be incorporated in a trainee client computer. An embodiment for use in training one or more trainees at a single trainee client computer is shown in FIG. 1*f*. In the embodiment of FIG. 1*f*, apparatus 1000 includes a single client computer 10 incorporating modules disposed in server 100 of FIG. 1*a* and an administrator client computer 5 in communication with the trainee client computer.

VI. Data Logging

It may be useful to score the performance of trainees being trained with use of apparatus 1000. In a further aspect, apparatus 1000 can be configured to generate a log file summarizing actions of each controlled digital character executed in response to receipt of control inputs initiated by trainees controlling the various controlled digital characters. Apparatus 1000 can also be configured to parse data from a log file and to generate a displayable report summarizing actions of a set of digital characters and/or of digital characters individually. A page (form) of a report can break down and summarize actions recorded in a log file chronologically, by digital character and/or by action category. In one embodiment server 100 can be configured to generate a log file, parse data from the log file and build a report summarizing data of a log file for each simulation executed. When a report has been generated server 100 can distribute a report that has been built to each trainee client computer 10-1, 10-2, 10-(N−1), 10-N for observation by the individual trainees situated at the respective trainee client computers 10-1, 10-2, 10-(N−1), 10-N. A report and/or a log file for each simulation can also be sent to or made available for access by any computer of apparatus 1000 external to server 100. A generated report can have a proprietary format and can be viewable with use of a proprietary viewer. A generated report can also utilize open standard file formats and can be viewable with use of a browser program. In one example, a report can comprise a set of hyperlinked .HTML files viewable with a browser program. All computers of apparatus 1000, including server 110 and server 120 can have viewers capable of viewing reports generated by apparatus 1000.

In FIG. 5*a* there is shown a printout of the contents of a log file, which may be provided with use of a text file. Suitable text file formats can include unformatted text file formats and formatted text files such as .XML. In the illustrative example of FIG. 5*a*, each entry of the log file includes four or more parameters: a time stamp parameter, a character parameter, an action parameter, and one or more "additional information" parameters which further characterize a recorded action. For example where an action is pulse taking, "TakeLeftRadialPulse" an additional parameter can be the pulse reading e.g., "72.0." Apparatus 1000 and particularly server 100 can be configured to monitor for the receipt of control inputs input into apparatus 1000 by trainees situated at the respective trainee client computers 10-1, 10-2, 10-(N−1), 10-N. Actions monitored for by apparatus for entry into a log file, when initiated by a trainee can result in a particular animation of the model corresponding to the trainee initiating the action being run. Apparatus 1000 can also record into the log file state changes of a non-trainee digital entity. Where the apparatus including a non-trainee digital entity includes a representation of a patient, the apparatus 1000 can record into the log file state changes of a patient.

Exemplary screenshots illustrating possible screen displays of a report that can be generated by apparatus 1000 by parsing data of a log file are shown in FIGS. 6*a*-6*f*. Where a log file resides on server 100, a software module for parsing data from the log file can also reside on server 100. Apparatus 1000 can be configured so that display of a report can be requested during a simulation or after a simulation, or configured so that a report is automatically displayed during a simulation or after a simulation. Reports summarizing completed simulations can be archived for later analysis.

Referring to FIGS. 6*a*-6*f*, a report displayed by apparatus 1000 can include a plurality of tabs. In the illustrative examples of FIG. 5*a*, and FIGS. 6*a*-6*e* reference is made to an embodiment wherein apparatus 1000 is used for training patient care givers such as doctors and nurses, rendered models of which are illustrated in the view of FIG. 3*d*. A report such as the report described with reference to FIGS. 6*a*-6*e* can be displayed by each trainee client computer 10-1, 10-2, 10-(N−1), 10-N. Actuating one of tabs 1602, 1604, 1606, 1608, 1610, 1612 changes a screen display of the report.

When overview tab 1602 is actuated, the screen display of FIG. 6*a* can be shown on the particular trainee client computer (i.e., one of trainee client computers 10-1, 10-2, 10-(N−1), 10-N) at which the tab 1602 has been actuated. In the overview screen display of FIG. 6*a* there is displayed data summarizing overall team performance. In area 1620 there can be displayed the names of the trainees currently being trained with use of apparatus 1000 which can also be names for the controlled digital characters corresponding to the trainees being trained. In area 1622 there can be displayed a listing of important events of the simulation. In area 1624 there can be displayed a designator for the state of a non-trainee digital entity of apparatus 1000, in area 1626 there can be displayed timing information and in area 1628 there can be displayed an overall performance score for the workforce team being trained. Various algorithms can be provided for calculating an overall workforce team score. An algorithm for calculating workforce team score can take into account such information as the presence or absence of an action being taken by a controlled digital character, the timing of an action or actions taken by one or more controlled digital characters (for example some actions can be carried out either too slowly or too rapidly), coordination of action between two or more controlled digital characters, the state of a non-trainee digital entity, and/or the score of the team in a variety of action categories, to be described herein.

Referring to FIG. 6*b*, FIG. 6*b* shows a screen display that can be displayed by apparatus 1000 when personal tab 1604 is actuated. When personal tab 1604 is actuated by a certain trainee situated at a certain trainee client computer 10-1, 10-2, 10-(N-1), 10-N, a summary of actions taken by the controlled digital character corresponding to the trainee making the actuation can be displayed. A summary of actions can be presented in area 1630. While not shown in the screen display of FIG. 6*b* a score can be presented on the screen display indicating a performance score for the controlled digital character and trainee controlling that character. Such a score can be based on e.g., whether the controlled digital character executed a certain action or set of actions, and timing of completion of a certain action. When parsing data from the log file and processing the data for utilization in a report, apparatus 1000 can convert command designators for actions recorded into friendly name designators through table lookup.

Referring to FIG. 6*c*, FIG. 6*c* shows a screen display that can be displayed by apparatus 1000 after circulation tab 1606 is actuated. Circulation in the specific embodiment of a patient care simulator can be regarded as an action category. Ventilation tab 1608 (button) and treatment tab 1610 correspond to additional action categories in the specific example of a patient care simulation. With reference to a specific embodiment of a patient care simulator, actions under the category of "circulation" include chest compression actions. Actions under the category "ventilation" includes "apply BVM mask." Actions under the category "treatment" include shocking a patient, and administering medication to a virtual patient including medications applied by way of a syringe. Referring to FIG. 6*d*, FIG. 6*d* shows a screen display that can be displayed by apparatus 1000 when ventilation tab 1608 is actuated. Referring to FIG. 6*e*, FIG. 6*e* shows a screen display that can be displayed by apparatus 1000 when tab 1610 is actuated.

Referring again to FIG. 6*c*, FIG. 6*c* shows a screen display summarizing chest compressions executed by controlled digital characters under the control of trainees during a simulation. In area 1638 there can be displayed a summary of compression actions executed by controlled digital characters of a simulation. In area 1640 there can be displayed a total compression time (the total time during a simulation in which a virtual patient's chest was compressed). In area 1642 there can be displayed a designator designating a percentage of time during a simulation during which a chest of virtual patient was compressed. At area 1646 there can be displayed an overall team performance score in a circulation category of performance. Such a score can be based on a variety of factors such as total time of compression and the percentage of time of compression.

Referring to FIG. 6*d*, FIG. 6*d* shows a screen display summarizing ventilation actions of controlled digital characters during a simulation. In area 1652 there can be displayed a summary ventilation actions of controlled digital characters of a simulation. In area 1654 there can be displayed a designator designating the total time during a simulation during which a virtual patient received ventilation assistance and in area 1656 the percentage of time during which a virtual patient received ventilation assistance. In area 1660 there can be displayed an overall team performance score in the ventilation category of performance. Such a score can be based on a variety of factors such as total time of ventilation and the percentage of time of ventilation.

Referring to FIG. 6*e*, FIG. 6*e* shows a screen display summarizing medication actions executed by controlled digital characters during a simulation under the control of trainees. In area 1664 there can be displayed a summary of medication actions of controlled digital characters of a simulation. In area 1668 there can be displayed a designator indicating the total number of shocks administered to a virtual patient during a simulation, and in area 1670 there can be displayed a time after commencement of simulation at which a virtual patient received a first shock. In area 1674 there can be displayed an overall team performance score in the medication category of performance. Such a score can be based on a variety of factors such as types of medication administered to a virtual patient, the timing of administration of the medications, the number of shocks administered and timing between various shocks.

It is seen from the exemplary screen displays of FIGS. 6*a*-6*e*, that a report can summarize and display summarized data by chronology, controlled digital character and/or by action type.

When tab 1612 is actuated, apparatus 1000 can display a screen display as shown in FIG. 6*f* having data entry fields 1682, 1684, 1686, 1688 enabling a trainee to respond to displayed questions, or to record notes regarding the simulation. The screen display of FIG. 6*f* displays various questions prompting a trainee to enter data into various data entry fields 1682, 1684, 1686, 1688. With prompt 1681 a trainee is prompted to type in text data into field 1682 describing the trainee's view of her own performance in the simulation. With prompts 1683 and 1685 a trainee is prompted to type in text data into field 1684 and field 1686 text describing the trainee's view (opinion) of the performance of the trainee's team members during the simulation. With prompt 1687 a trainee is prompted to record any desired notes regarding the simulation.

Apparatus 1000 can be configured so that log files and the reports generated from the log files can be accessed by a person using any computer of apparatus 1000 including any trainee client computer 10-1, 10-2, 10-(N-1), 10-N, server 110, and server 120. In one embodiment each computer of apparatus 1000 can incorporate an IP protocol stack and each computer of apparatus 1000 can be IP addressable. Further each computer of apparatus 1000 can incorporate a suitable user interface such that a person situated at any computer of apparatus 1000 including server 110 and server 120 can utilize the user interface of the computer at which the person is situated to initiate a File Transfer Protocol (FTP) command to request server 100 to send the log file and/or a report generated from each log file to the requesting computer. It has been mentioned that server 110 can represent a server maintained and operated by a business entity developer developing the software of server 100 and trainee client computers 10-1, 10-2, 10-(N-1), 10-N, and that server 120 can represent a server maintained and operated by a business entity utilizing apparatus 1000 to train a workforce team. In addition or in the alternative, server 100 can be configured so that after generating a log file and report generated from the log file for each simulation executed, server 100 automatically broadcasts either or both of the log file and the report generated from the log file to each computer of apparatus 1000 including server 110 and server 120.

Server 100 can be configured to send data determined by running a simulation to personnel database 702. For example server 100 can maintain for each trainee, a record of all scores achieved by the trainee achieved during each simulation participated in. Apparatus 1000 can be configured so that when a simulation is complete, server 100 compares a current simulation score to previous simulation scores for the trainee to determine whether the current score is the highest score for the trainee. Apparatus 1000 can be configured so that if the current score is the highest score for the trainee, server 100 can send the simulation score parameter to database 702 together with a command to update the high score parameter at column 787 for the particular trainee.

A small sampling of the apparatuses systems and methods that are described and defined herein is as follows:

A1. A computer based training apparatus comprising: (a) a plurality of trainee client computers each having a display and retaining a plurality of models; (b) a central server in communication with each of said trainee client computers; (c) wherein each trainee client computer is configured to render on its respective display said plurality of models, one of said models being a model corresponding to a patient; and (d) wherein said apparatus is configured so that at a certain time at which said first trainee client computer presents a first camera view of said patient a second trainee client computer of said plurality of trainee client computers presents a second camera view of said patient. A2. The computer based tray apparatus of claim A1, wherein said plurality of models are a plurality of 3D models. A3. The computer based tray apparatus of claim A1, wherein said plurality of models are a plurality of 2D models.

B1. A computer based training apparatus comprising: (a) a plurality of trainee client computers each having a display and retaining a plurality of three dimensional models, the apparatus having first and second controlled digital characters and at least one autonomous digital entity; (b) a rendering module incorporated in each of said plurality of trainee client computers configured to render three dimensional models onto a display of its associated trainee client computer; (c) a central server in communication with each of said trainee client computers; (d) wherein said autonomous digital entity is programmed so that a desired state change of said autonomous digital entity is produced conditionally in response to said first and second controlled digital characters being controlled to perform a coordinated set of actions with respect to said autonomous digital entity. B2. The computer based training apparatus of B1, wherein said desired state change results in a certain animation of said autonomous digital entity being rendered. B3. The computer based training apparatus of B1, wherein said at least one autonomous digital entity is an autonomous character. B4. The computer based training apparatus of B1, wherein said at least one autonomous digital entity is a representation of a patient. B5. The computer based training apparatus of B1, wherein said autonomous digital entity is a representation of a patient and wherein said controlled digital characters are representation of patient care givers.

C1. A computer based training apparatus for training first and second trainees of a workforce team, said computer based training apparatus comprising: (a) a central server; (b) first and second controlled digital characters and at least one autonomous digital entity, said apparatus being configured so that said first and second controlled digital character are controlled respectively by first and second trainees being trained with use of said apparatus; (c) a first trainee client computer in communication with said central server having a display and retaining a plurality of three dimensional models, said first trainee client computer having a first input device and being configured to control said first controlled digital character; (d) a second trainee client computer in communication with said central server also having a display and retaining a plurality of three dimensional models, said second trainee client computer having a second input device and being configured to control said second controlled digital character, wherein said plurality of three dimensions models of said first and second trainee client computers include a model corresponding to said autonomous digital entity; and (e) a rendering module incorporated in each of said first and second trainee client computers configured to render three dimensional models onto a display of its associated trainee client computer.

D1. A computer apparatus comprising: (a) a trainee client computers having a display and retaining a plurality of three dimensional models, the three dimensional (3D) models including an autonomous digital entity 3D model and a controlled digital character 3D model, the trainee client computer retaining a motion animation routine for moving the controlled digital character along a predetermined path; (b) a central server in communication with said trainee client computer, the central server storing a plurality of indexed destination, and being responsive to a destination request from said trainee client computer to move a controlled digital character to one of said indexed destinations; (c) wherein each trainee client computer is configured to render on its display at least one of said 3D models; and (d) wherein said apparatus when receiving said destination request determines a predetermined path for motion of said controlled digital character, and sends a command to said trainee client computer to run a motion animation routine along said predetermined path.

E1. A computer based training apparatus comprising: (a) a plurality of trainee client computers each having a display and retaining a plurality of three dimensional models, each client controller being controlled by a different trainee; (b) a central server in communication with each of said trainee client computers; (c) an additional records storing server remote from each of said central server and said central server; (d) wherein each trainee client computer is configured to render on its respective display said plurality of three dimensional models, at least one of said models corresponding to a controlled digital character, and at least one of said models corresponding to an autonomous digital character, said apparatus being programmed so that a desired attribute change and/or animation change of said autonomous digital character is produced when at least two of said controlled digital characters are controlled in a coordinated manner with respect to said autonomous digital entity; (e) wherein said apparatus is configured so that said apparatus calculates a score for each of said trainees and automatically sends a record including said score to said records storing server at a termination of a training simulation.

F1. A computer based training apparatus comprising: (a) a plurality of trainee client computers each having a display and retaining a model corresponding to an autonomous digital entity, each of said plurality of trainee client computers being controlled by a different trainee, each trainee having a different set of characteristics, said apparatus further having a controlled digital character corresponding to each trainee; (b) a central server in communication with each of said trainee client computers; (c) wherein each trainee client computer is configured to render on its respective display model corresponding to said autonomous digital entity, and (d) wherein at least one of said trainee client computers is configured so that a model corresponding to a controlled digital character of said apparatus can have characteristics corresponding to trainee controlling the controlled digital character. F2. The computer based training apparatus of 10, wherein said characteristics include role and sex.

G1. A computer based training apparatus comprising: (a) at least one trainee client computer having a display, and an input device, said at least one trainee client computer retaining a plurality of models; (b) a central server in communication with said at least one trainee client computer; (c) an autonomous digital entity representing a patient, said autonomous digital entity having associated vital sign data; (d) a controlled digital character controlled with use of said input device; (e) wherein said at least one trainee client computer is configured to render on its respective display said plurality of three dimensional models, one of said models being a model corresponding to said patient, and (f) wherein said apparatus is configured so that said vital sign data associated with said autonomous digital entity can change in response to an input to control said controlled digital character being input with use of said input device.

H1. A computer based training apparatus for training first and second trainee patient care givers, the training apparatus comprising: (a) a plurality of trainee client computers each having a display and retaining a plurality of three dimensional models, the plurality of three dimensional models including at least two care giver models and a patient model, the apparatus being configured so that each of said first and second trainee patient care givers can control an animation of a patient care giver model; (b) a rendering module incorporated in each of said plurality of trainee client computers configured to render three dimensional models onto a display of its associated trainee client computer; (c) a central server in communication with each of said trainee client computers; (d) wherein said apparatus is programmed so that an animation routine of said patient model is run conditionally on the condition that said first and second trainee care givers input controls into said apparatus in a pre-specified manner.

I1. A computer based system for training first and second trainees in relation to a work subject, the computer based system comprising: (a) first and second trainee client computers each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a user interface for enabling said first trainee to initiate communications controlling animation routines of said first trainee model, the second trainee client computer having a user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model; (b) a central server in communication with each of said trainee client computers, the central server receiving communications from said first and second trainee client computers and sending run animation commands to said first and second trainee client computers responsively to said communications; (c) an administrator client computer in communication with said central server, the administrator client computer also having a display and a rendering module for rendering three dimensional models, the administrator client computer having distributed therein said first trainee model, said second trainee model and said work subject model, the rendering module of said administrator client computer rendering said common scene and having a user interface, the computer based system being configured so that by initiating a communication using said user interface of said administrator client computer an administrator can cause, during a simulation run mode, one or more of the following: (i) a certain animation routine for the work subject model to be run; (ii) a certain texture for the work subject model to be rendered; (iii) a change in a user interface one of said trainee client computers; and (iv) a model change of said work subject model. I2. The computer based system of I1, wherein said computer based system is configured so that said computer based system maintains a coordinate position and camera position of controlled digital characters at a time at which said communication by said administrator is initiated, and utilizes said coordinate position and said camera position in rendering a scene at said first and second client computers after said communication by said administrator is initiated. I3. The computer based system of I1, wherein said rendering module of said administrator client computer is further configured so that said administrator client computer can render at said certain time a perspective third person view of said common scene different from said first and second first person perspective views and including renderings of said work subject model, and of said first and second trainee models. I4. The computer based system of I1, wherein said administrator client computer is configured so that by using a user interface of said administrator client computer during a simulation run mode, an administrator can cause said administrator client computer to render on its respective display at said certain time said first perspective first person view. I5. The computer based system of I1, wherein said administrator client computer is configured so that by using said user interface of said administrator client computer during a simulation run mode, an administrator can cause said administrator client computer to render on its respective display at said certain time said first perspective first person view and said second perspective first person view. I6. The computer based system of I1, wherein said computer based system is configured record a simulation, and wherein said administrator client computer is configured so that by using said user interface of said administrator client computer during a simulation run mode, an administrator client computer can cause said computer based system to return to prior point of said simulation. I7. The computer based system of I1, wherein said computer based system is configured record a simulation, and wherein said administrator client computer is configured so that by using said user interface of said administrator client computer during a simulation run mode, an administrator client computer can cause said computer based system to return to prior point of said simulation, wherein said computer based system is configured so that said administrator client computer is equipped with an audio input device and said client computers are equipped with audio output device, the computer based system being configured so that said administrator can input voice message into said audio input device for output at said audio output devices. I8. The computer based system of I1, wherein said administrator client computer is configured so that by using said user interface of said administrator client computer during a simulation run mode, an administrator can cause said computer based system to enter an administrator character mode of operation, wherein during said administrator character mode of operation said rendering modules of said first and second trainee client computers render on their respective displays an administrator model corresponding to said administrator, and wherein further during said administrator character mode of operation an administrator can control animation routines of said administrator model. I9. The computer based system of I1, wherein said system is configured so that trainee can initiate a communication cause a movement animation to be run by actuating a hotspot displayed on a trainee client computer.

J1. A computer based system for training first and second trainees in relation to a work subject, the computer based system comprising: (a) first and second trainee client computers each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a user interface for enabling said first trainee to initiate communications controlling animation routines of said first trainee model, the second trainee client computer having a user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model; (b) a central server in communication with each of said trainee client computers, the central server receiving communications from said first and second trainee client computers and sending run animation commands to said first and second trainee client computers responsively to said communications; (c) wherein said computer based system is configured to receive information extracted from a personnel database retaining data respecting said first trainee, the work force training computer network being configured to utilize said information extracted from said personnel database in determining at least one of (i) set of possible animation routines that can run for said first trainee model, and (ii) a characteristic of said first trainee model. J2. The computer based system of J1, wherein said computer based system utilizes said information extracted from said external personnel database in determining a set of possible animation routines that can be run for said first trainee mode. J3. The computer based system of J1, wherein said computer based system utilizes said information extracted from said external personnel database in determining a set of possible animation routines that can be run for said first trainee mode, the information being selected from the group consisting of an experience parameter, a job title parameter, a salary parameter, an educational attainment parameter, an age parameter, and a sex parameter. J4. The computer based system of J1, wherein said computer based system utilizes said information extracted from said external personnel database in determining a characteristic of said first trainee model. J5. The computer based system of J1, wherein said computer based system utilizes said information extracted from said external personnel database in determining a characteristic of said first trainee model, the information being selected from the group consisting of a job title parameter, a sex parameter, a height parameter, an age parameter, a hair color parameter, an eye color parameter, and an image file representing said first trainee. J6. The computer based system of J1, wherein said personnel database is a legacy database pre-existing installation of one or more of said first and second trainee client computers, and said central server. J7. The computer based system of J1, wherein said computer based system further comprises an administrator client computer. J8. The computer based system of J7, wherein said personnel database is a legacy database pre-existing installation of one or more of said first and second trainee client computers, said central server, sand said administrator client computer.

K1. A method for using a personnel database including personnel information, the personnel database being in communication with an enterprise computer having client software for viewing data of said personnel database, said method including the steps of: providing a computer based system having a central server, a first trainee client computer for use by a first trainee and a second trainee client computer for use by a second trainee, the computer based system having a first trainee model corresponding to said first trainee, a second trainee model corresponding to said second trainee, and a work subject model corresponding to a work subject, the first trainee client computer having a user interface for use by said first trainee, and said second trainee client computer having a user interface for use by said second trainee, the first and second trainee client computers having respective rendering modules for concurrently rendering scenes including renderings of said work subject model in first and second perspective views; extracting information from personnel database; utilizing said information extracted from said personnel database in determining at least one of a set of possible animation routines that can be rendered by said computer based system for said first trainee model and a characteristic of said first trainee model; running a simulation with use of said computer based system; scoring a performance of said first trainee during said simulation to determine a simulation performance parameter of said first trainee; and sending said simulation performance score to said personnel information so that said simulation performance score can be viewed by a user of said enterprise computer.

L1. A computer based system for training first and second trainees in relation to a work subject, the computer based system comprising: (a) first and second trainee client computers each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a user interface for enabling said first trainee to initiate communications controlling animation routines of said first trainee model, the second trainee client computer having a user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model; (b) a central server in communication with each of said trainee client computers, the central server receiving communications from said first and second trainee client computers and sending run animation commands to said first and second trainee client computers responsively to said communications; (c) wherein said computer based system is configured to receive information extracted from an external database retaining data respecting said work subject, the work force training computer network being configured to utilize said information extracted from said external database in determining a set of possible animation routines for said work subject mode that can be run by said computer based system.

M1. A computer based system for training first and second trainees in relation to a work subject, the computer based system comprising: (a) first and second trainee client computers each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a user interface for enabling said first trainee to initiate communications controlling animation routines of said first trainee model, the second trainee client computer having a user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model; (b) a central server in communication with each of said trainee client computers, the central server receiving communications from said first and second trainee client computers and sending run animation commands to said first and second trainee client computers responsively to said communications; (c) an administrator client computer for use by an administrator in communication with said central server, the administrator client computer also having a display and a rendering module for rendering three dimensional models, the administrator client computer having distributed therein said first trainee model, said second trainee model and said work subject model, the rendering module of said administrator client computer rendering said common scene and having a user interface.

N1. A computer based system for training first and second trainees in relation to a work subject, the computer based system comprising: (a) first and second trainee client computers for use by trainees each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a first trainee user interface for enabling said first trainee to initiate communications controlling animation routines of said first trainee model, the second trainee client computer having a second trainee user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model; (b) a central server in communication with each of said trainee client computers, the central server receiving communications from said first and second trainee client computers and sending run animation commands to said first and second trainee client computers responsively to said communications; (c) an administrator client computer for use by an administrator, the administrator client computer being in communication with said central server, the administrator client computer also having a display, an administrator user interface and a rendering module for rendering three dimensional models, the administrator client computer having distributed therein said first trainee model, said second trainee model and said work subject model, the rendering module of said administrator client computer rendering said common scene and having a user interface; (d) wherein said administrator user interface is configured differently from said first trainee user interface and said second trainee user interface, and wherein said computer based system is configured so that at least one communication can be initiated by an administrator utilizing said administrator user interface that is not among communications that can initiated by said first trainee utilizing said first trainee user interface or by said second trainee utilizing said second trainee user interface. N2. The computer based system of N1, wherein said at least one communication comprises a communication selected from the group consisting of a state change command, a scenario change command, a command to return to a previous point, a command to reverse play previous frames, a command to display a view presently rendered on said first trainee client computer, a command to simultaneously render views presently being rendered on said first and second client computers, a command to enter an administrator character mode of operation, a command to enable voice communications between said administrator client computer and each of said trainee client computers, a command to selectively enable voice communications between said administrator client computer and said first trainee client computer, and a command to run a voice animation when communicating voice messages. N3. The computer based system of N1, wherein said at least one communication comprises a plurality of communications including: a state change command, a scenario change command, a command to return to a previous point, a command to reverse play previous frames, a command to display a view presently rendered on said first trainee client computer, a command to simultaneously render views presently being rendered on said first and second client computers, a command to enter an administrator character mode of operation, a command to enable voice communications between said administrator client computer and each of said trainee client computers, a command to selectively enable voice communications between said administrator client computer and said first trainee client computer, and a command to run a voice animation when communicating voice messages.

O1. A computer based system for training a trainee in relation to a work subject, the computer based system comprising: (a) at least one trainee client computer for use by said trainee, the at least one trainee client computer having a display and a rendering module for rendering three dimensional models, the computer based system including a work subject model distributed into said at least one trainee client computer, the computer based system being configured to run a plurality of animation routines for each of said first trainee model, wherein during a simulation run mode said rendering module of said at least one trainee client computer renders a perspective view of said work subject model; (b) an administrator client computer for use by an administrator, the administrator client computer having a display, and an administrator user interface.

P1. A computer based system for training a trainee in relation to a work subject, the computer based system comprising: (a) at least one trainee client computer for use by said trainee, the at least one trainee client computer having a display and a rendering module for rendering three dimensional models, the computer based system including a work subject model distributed into said at least one trainee client computer, the computer based system being configured to run a plurality of animation routines for a trainee model corresponding to said trainee, wherein during a simulation run mode said rendering module of said at least one trainee client computer renders a perspective view of said work subject model; (b) an administrator client computer for use by an administrator in communication with said at least one trainee client computer, the administrator client computer having a display, and an administrator user interface; (c) wherein said computer based system is configured so that a model rendered on said at least one trainee client computer when voice communications are sent from said administrator client computer has the appearance of talking. P2. The computer based system of P1, wherein said model for which voice animations are run is an administrator model. P2. The computer based system of P1, wherein said model for which voice animations are run is a work subject model.

Q1. A computer based system for training at least one trainee in relation to a work subject, the computer based system comprising: (a) at least one trainee client computer for use by said at least one trainee, the at least one trainee client computer having a display and a rendering module for rendering three dimensional models, the computer based system including a work subject model distributed into said at least one trainee client computer, the computer based system being configured to run a plurality of animation routines for each of said first trainee model, wherein during a simulation run mode said rendering module of said at least one trainee client computer renders a perspective view of said work subject model; (b) a trainee model corresponding to a trainee being trained; (c) an administrator client computer for use by an administrator, the administrator client computer having a display, and an administrator user interface; (d) wherein said computer based system is configured to extract a first at least one parameter from a first database for use in determining at least of (i) animation routines that can be run and (ii) model and/or texture data for said work subject model; and (e) wherein said computer based system is configured to extract a second at least one parameter from a second database for use in determining at least of (i) animation routines that can be run and (ii) model and/or texture data for said trainee model.

R1. A computer based system for use in training a worker in relation to a work subject, the computer based system comprising: a trainee client computer including a display and rendering module for rendering on said display a work subject model corresponding to said work subject, the trainee client computer further having a trainee user interface; wherein said system is in communication with a work subject database, and wherein said system is configured to determine at least one of (i) a set of animation routines that are enabled for said work subject model, (ii) a characteristic of said work subject model and (iii) a texture for said work subject model by extracting data from said work subject database. R2. The computer based system of R1, wherein said database is a legacy patient database. R3. The computer based system of R1, wherein said database is a legacy equipment article database.

S1. A computer based system for use in training first and second trainees in relation to a work subject, the computer based system comprising: (a) a first trainee client computer for use by said first trainee, said first trainee client computer having a user interface, a display and a rendering module for rendering a second trainee model corresponding to said second trainee on said display; (b) a second trainee client computer for use by said second trainee, said second trainee client computer having a user interface, a display and a rendering module for rendering a first trainee model corresponding to said first trainee on said display; (c) wherein said computer based system is in communication with a personnel database, and wherein said computer based system is configured to determine at least one of (i) a set of animation routines that are enabled for said first trainee model; (ii) a characteristic of said first trainee model; (iii) a texture for said first trainee model by extracting data from said personnel data in communication with said computer based system. S2. The computer based system of S1, further including a central server. S3. The computer based system of S1, wherein said personnel database is a legacy database. S4. The computer based system of S1, wherein said personnel database is disposed in computer external from each of said first trainee client computer and said second trainee client computer. S5. The computer based system of S1, wherein said personnel database is disposed in a computer remote from said first trainee client computer and said second trainee client computer.

T1. A computer based system for training a trainee in relation to a work subject, the computer based system comprising: (a) a trainee client computer having a display and a rendering module for rendering a work subject model corresponding to said work subject on said display; (b) an administrator client computer in communication with said trainee client computer; (c) wherein said trainee client computer has a trainee user interface enabling a trainee to initiate a first set of communications for receipt by said system; and (d) wherein said administrator client computer has an administrator user interface enabling an administrator to initiate a second set of communications for receipt by said system.

U1. A computer based system for training a trainee in relation to a work subject, the computer based system comprising: (a) a trainee client computer having a display and a rendering module for rendering on said display a work subject model corresponding to said work subject; (b) an administrator client computer in communication with said trainee client computer; (c) wherein said trainee client computer has a trainee user interface enabling a trainee to initiate a first set of communications each of which when initiated can result in a certain animation for said work subject model being run; (d) wherein said administrator client computer has an administrator user interface enabling an administrator to initiate a second set of communications each of which when initiated can result in a certain animation for said work subject model being run; and (e) wherein said second set of communications includes at least on communication that is not included in said first set of communications. U2. The computer based system of U1, wherein said first set of communications includes and action request command and wherein said second set of communications includes an object attribute change command.

V1. A computer based system comprising: (a) a first client computer for use by a first user, the first client computer having a display and a rendering module; (b) a second client computer for use by a second user, the second client computer having a display and a rendering module; (c) a third client computer for use by a third user, the third client computer having a display and a rendering module; (d) wherein said computer based system is configured so that said first, second and third client computers can contemporaneously render a common scene, wherein there is rendered at said first client computer models corresponding to said second and third users, wherein there is rendered at said second client computer models corresponding to said first and third client computers, and wherein there is rendered at said third client computer models corresponding to said first and second users; (e) wherein said computer based system supports live voice communications between said first second and third client computers; and (f) wherein rendering of said first second and third models is controlled to include a voice highlight indicating which of said users is presently communicating a live voice message. V2. The computer based system of V1, wherein said computer based system is for use in training workers. V3. The computer based system of V1, wherein said voice highlight includes a message indicating a name of user presently communicating a live voice message. V4. The computer based system of V1, wherein said voice highlight includes a graphic feature rendered in proximity with a model corresponding to a user presently communicating a live voice message. V5. The computer based system of V4, wherein said graphic feature is an arrow directed to a model corresponding to a user presently communicating a live voice message. V6. The computer based system of V1, wherein said voice highlight includes an animation and/or texture control to create the appearance that a model corresponding to a user presently communicating a live voice message is talking.

W1. A computer based system for training first and second trainees in relation to a work subject, the computer based system comprising: (a) a first trainee client computer having a display and a rendering module rendering on said display a work subject model corresponding to said work subject; (b) a second trainee client computer having a display and a rendering module rendering on said display a work subject model corresponding to said work subject, the rendering module of said second client computer also rendering a model corresponding to said first trainee; (c) an administrator client computer in communication with said trainee client computer; (d) wherein said trainee client computer has a trainee user interface enabling a trainee to initiate action requests which can result in animation routines for said model corresponding to said first trainee being run; and (e) wherein said administrator client computer has an administrator user interface enabling an administrator to initiate a communication for changing, without causing an animation routine for a trainee model to be run, an object attribute determining a set of enabled animation routines for said work subject model.

X1. A computer based system comprising: (a) at least one client computer having a display for rendering at least one model on said display; (b) wherein said system is in communication with at least one data base; (c) wherein said system is configured to extract a first set of at least one parameter from said at least one database for use in determining at least one of an animation routine for said at least one model, a characteristic of said at least one model, and a texture for said at least one model; and (d) wherein said at least one client computer includes client software for enabling viewing of parameters of said at least one database not among said first set of at least one parameter. X2. The computer based system of X1, wherein said at least one client computer is an administrator client computer. X3. The computer based system of X1, wherein said computer based system is for use in training a worker. X4. The computer based system of X1, wherein said at least one client computer includes a user interface enabling a user to initiate a command to cause display of parameters of said database, while there is rendered on said display said at least one model. X5. The computer based system of X1, wherein said at least one database includes a personnel database. X6. The computer based system of X1, wherein said at least one database is a work subject database. X7. The computer based system of X1, wherein said at least one database includes a personnel database and a work subject database.

Y1. A computer based system for training first and second trainees in relation to a work subject, the computer based system comprising: (a) first and second trainee client computers each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a user interface for enabling said first trainee to initiate communications controlling animation routines of said first trainee model, the second trainee client computer having a user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model; (b) wherein said computer based system is configured to receive information extracted from a personnel database retaining data respecting said first trainee, the computer based system being configured to utilize said information extracted from said personnel database in determining at least one of (i) set of possible animation routines that can run for said first trainee model, and (ii) a characteristic of said first trainee model; (c) an administrator client computer in communication with said first and second trainee client computers, the administrator client computer also having a display and a rendering module for rendering three dimensional models, the administrator client computer having distributed therein said first trainee model, said second trainee model and said work subject model, the rendering module of said administrator client computer rendering said common scene and having a user interface, the computer based system being configured so that by initiating a communication using said user interface of said administrator client computer an administrator can cause, during a simulation run mode, one or more of the following: (i) a certain animation routine for the work subject model to be run; (ii) a certain texture for the work subject model to be rendered; (iii) a change in a user interface one of said trainee client computers; and (iv) a model change of said work subject model. Y2. The computer based system of Y1, further including a central server facilitating said communication between said administrator client computer and said first and second trainee client computers.

Z1. A computer based system comprising: an administrator client computer having a user interface entity at least one of the following to be initiated by an administrator: (i) a reverse communication; (ii) a return to point communication; (iii) view database communication; (iv) change view communication; (v) a state change communication; (vi) a scenario change communication; a trainee client computer having a user interface enabling a trainee to initiate a certain set of communications, the certain set of communications not including at least one of (i), (ii), (iii), (iv), (v), and (vi).

AA1. A computer based system for training workers relative to a work subject, the computer based system comprising: (a) a first trainee client computer having a display and a 3D rendering module for rendering 3D models on said display; (b) a second trainee client computer having a display and a 3D rendering module for rendering 3D models on said display; (c) the first and second trainee client computers having trainee user interfaces enabling initiation of a restricted first set of commands; (d) an administrator client computer having an administrator user interface enabling initiation of an expanded second of commands; (e) wherein said computer based system is configured so that said first second and administrator client computers concurrently render respective first, second, and third different perspective views of a common scene, the third perspective view including a rendering of third person models corresponding to said first and second trainees, the first perspective view including a rendering of a third person model corresponding to said second trainee but not including a rendering of a third person model corresponding to said first trainee, and said second perspective view including a rendering of a third person model corresponding to said first trainee but not including a rendering of a third person model corresponding to said second trainee. AA2. The computer based system of AA1, wherein a camera position of said administrator client computer is maintained so that a field of view of said third perspective view is larger than a field of view of either of said first or second perspective view.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

We claim:

1. A computer based system for training first and second trainees in relation to a work subject, the computer based system comprising:
   (a) first and second trainee client computers each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run plurality of animation routines for each of said first trainee model, said second trainee model, and said work subject model, the first trainee client computer having a user interface for enabling said first trainee to initiate communications controlling animation routines of said first trainee model, the second trainee client computer having a user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second trainee client computer including a rendering of said work subject model;
   (b) wherein said computer based system is configured so that said computer based system is in communication with a personnel database retaining data respecting said first trainee, the computer based system being configured to utilize information extracted from said personnel database in determining a characteristic of said first trainee model, wherein said information extracted from said personnel database includes an image file representing said first trainee.

2. The computer based system of claim 1, wherein said computer based system utilizes said information extracted from said personnel database in determining a set of possible animation routines that can be run for said first trainee model.

3. The computer based system of claim 1, wherein said computer based system utilizes said information extracted from said personnel database in determining a set of possible animation routines that can be run for said first trainee model the information being selected from the group consisting of an experience parameter, a job title parameter, a salary parameter, an educational attainment parameter, an age parameter, and a sex parameter.

4. The computer based system of claim 1, wherein said computer based system utilizes said information extracted from said personnel database in determining a characteristic of said first trainee model, the information being selected from the group consisting of a job title parameter, a sex parameter, a height parameter, an age parameter, a hair color parameter, an eye color parameter.

5. The computer based system of claim 1, wherein said personnel database is a legacy database pre-existing installation of one or more of said first and second trainee client computers.

6. The computer based system of claim 1, wherein said computer based system further comprises an administrator client computer.

7. The computer based system of claim 6, wherein said personnel database is a legacy database pre-existing installation of one or more of said first and second trainee client computers, and said administrator client computer.

8. The computer based system of claim 1, wherein said computer based system determines a face of said first trainee model based on a processing of said image file representing said first trainee.

9. The computer based system of claim 1, wherein said computer based system has an administrator model distributed into said second trainee client computer corresponding to an administrator, and wherein said computer based system utilizes an image file corresponding to said administrator in determining a characteristic of said administrator model.

10. A computer based system for training first and second trainees in relation to a work subject, the computer based system comprising:
(a) first and second trainee client computers for use by trainees each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a first trainee user interface for enabling said first trainee to initiate communications controlling animation routines of said first trainee model, the second trainee client computer having a second trainee user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model;
(b) an administrator client computer for use by an administrator, the administrator client computer having a display, an administrator user interface and a rendering module for rendering three dimensional models, the administrator client computer having distributed therein said first trainee model, said second trainee model and said work subject model, the rendering module of said administrator client computer rendering said common scene and having a user interface;
(c) wherein said administrator user interface is configured differently from said first trainee user interface and said second trainee user interface, and wherein said computer based system is configured so that at least one communication can be initiated by an administrator utilizing said administrator user interface that is not among communications that can initiated by said first trainee utilizing said first trainee user interface or by said second trainee utilizing said second trainee user interface, wherein said computer based system is operative so that responsively to a communication initiated by an administrator using said administrator user interface a set of actions that can be activated by the first trainee using the first trainee user interface of the first trainee client computer changes from a first set to a second set.

11. The computer based system of claim 10, wherein said at least one communication comprises a communication selected from the group consisting of a state change command, a scenario change command, a command to return to a previous point, a command to reverse play previous frames, a command to display a view presently rendered on said first trainee client computer, a command to simultaneously render views presently being rendered on said first and second client computers, a command to enter an administrator character mode of operation, a command to enable voice communications between said administrator client computer and each of said trainee client computers, a command to selectively enable voice communications between said administrator client computer and said first trainee client computer, and a command to run a voice animation when communicating voice messages.

12. The computer based system of claim 11, wherein said at least one communication comprises a command to enter an administrator character mode of operation.

13. The computer based system of claim 11, wherein said at least one communication comprises a command to selectively enable voice communications between said administrator client computer and each of said trainee client computers.

14. The computer based system of claim 10, wherein said at least one communication comprises a plurality of communications including: a state change command, a scenario change command, a command to return to a previous point, a command to reverse play previous frames, a command to display a view presently rendered on said first trainee client computer, a command to simultaneously render views presently being rendered on said first and second client computers, a command to enter an administrator character mode of operation, a command to enable voice communications between said administrator client computer and each of said trainee client computers, a command to selectively enable voice communications between said administrator client computer and said first trainee client computer, and a command to run a voice animation when communicating voice messages.

15. The computer based system of claim 10, wherein prior to the communication initiated by an administrator, there is rendered on said display of said first trainee client computer a first number of action request initiating hotspots, and wherein subsequent to the communication initiated by an administrator there is rendered a second number of action request initiating hotspots, and wherein the first number is not equal to the second number.

16. A computer based system for training first and second trainees in relation to a work subject, the computer based system comprising:

(a) first and second trainee client computers each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a user interface for enabling said first trainee to initiate communications controlling animation routines of said first trainee model, the second trainee client computer having a user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model;

(b) an administrator client computer in communication with said first and second trainee client computers, the administrator client computer also having a display and a rendering module for rendering three dimensional models, the administrator client computer having distributed therein said first trainee model, said second trainee model and said work subject model, the rendering module of said administrator client computer rendering said common scene and having a user interface, the computer based system being configured so that by initiating a communication using said user interface of said administrator client computer an administrator can alter a simulation being run during a simulation mode in a manner that is in conflict with rules of the simulation.

17. The computer based system of claim 16, further including a central server facilitating said communication between said administrator client computer and said first and second trainee client computers.

18. The computer based system of claim 16, wherein the computer based system is configured so that by initiating a communication using said user interface of said administrator client computer an administrator can cause, during a simulation run mode, a certain animation routine for the work subject model to be run.

19. The computer based system of claim 16, wherein the computer based system is configured so that by initiating a communication using said user interface of said administrator client computer an administrator can cause, during a simulation run mode, a certain texture for the work subject model to be rendered.

20. The computer based system of claim 16, wherein the computer based system is configured so that by initiating a communication using said user interface of said administrator client computer an administrator can cause, during a simulation run mode, a change in a user interface of one of said trainee client computers.

21. The computer based system of claim 16, wherein the computer based system is configured so that by initiating a communication using said user interface of said administrator client computer an administrator can cause, during a simulation run mode, a model change of said work subject model.

22. The computer based system of claim 16, wherein the computer based system is configured so that by initiating a communication using said user interface of said administrator client computer an administrator can cause an animation routine to be run without alternating a state list of the simulation.

23. A computer based system for training first and second trainees in relation to a work subject, the computer based system comprising:

(a) first and second trainee client computers each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a user interface for enabling said first trainee to initiate communications controlling animation routines of said first trainee model, the second trainee client computer having a user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model;

(b) an administrator client computer having a display and a rendering module for rendering three dimensional models, the administrator client computer having distributed therein said first trainee model, said second trainee model and said work subject model, the rendering module of said administrator client computer rendering said common scene and having a user interface, the computer based system being configured so that by initiating a communication using said user interface of said administrator client computer an administrator can cause, during a simulation run mode, one or more of the following: (i) a certain animation routine for the work subject model to be run; (ii) a certain texture for the work subject model to be rendered; (iii) a change in a user interface one of said trainee client computers; and (iv) a model change of said work subject model;

wherein said administrator client computer is operative to render at said certain time a perspective third person view of said common scene different from said first and second first person perspective views and including renderings of said work subject model, and of said first and second trainee models.

24. The computer based system of claim 23, wherein said computer based system is configured so that said computer based system maintains a coordinate position and camera position of controlled digital characters at a time at which said communication by said administrator is initiated, and utilizes said coordinate position and said camera position in rendering a scene at said first and second client computers after said communication by said administrator is initiated.

25. The computer based system of claim 23, wherein said administrator client computer is configured so that by using a user interface of said administrator client computer during a simulation run mode, an administrator can cause said administrator client computer to render on its respective display at said certain time said first perspective first person view.

26. The computer based system of claim 23, wherein said administrator client computer is configured so that by using said user interface of said administrator client computer during a simulation run mode, an administrator can cause said administrator client computer to render on its respective display at said certain time said first perspective first person view and said second perspective first person view.

27. The computer based system of claim 23, wherein said computer based system is configured record a simulation, and wherein said administrator client computer is configured so that by using said user interface of said administrator client computer during a simulation run mode, an administrator client computer can cause said computer based system to return to prior point of said simulation.

28. The computer based system of claim 23, wherein said computer based system is configured record a simulation, and wherein said administrator client computer is configured so that by using said user interface of said administrator client computer during a simulation run mode, an administrator client computer can cause said computer based system to return to prior point of said simulation, wherein said computer based system is configured so that said administrator client computer is equipped with an audio input device and said client computers are equipped with audio output device, the computer based system being configured so that said administrator can input a voice message into said audio input device for output at said audio output devices.

29. The computer based system of claim 23, wherein said administrator client computer is configured so that by using said user interface of said administrator client computer during a simulation run mode, an administrator can cause said computer based system to enter an administrator character mode of operation, wherein during said administrator character mode of operation said rendering modules of said first and second trainee client computers render on their respective displays an administrator model corresponding to said administrator, and wherein further during said administrator character mode of operation an administrator can control animation routines of said administrator model.

30. The computer based system of claim 23, wherein said system is configured so that a trainee can initiate a communication cause a movement animation to be run by actuating a hotspot displayed on a trainee client computer.

31. The computer based system of claim 23, wherein said perspective third person view at said certain time comprises a field of view larger than a field of view each of the first and second first person views at said certain time.

32. The computer based system of claim 23, wherein said computer based system maintains a field of view of said perspective third person view rendered at said administrator client computer at a size larger than a concurrently rendered field of view at each of the first trainee client computer and second trainee client computer.

33. A computer based system for training first and second trainees in relation to a work subject, the computer based system comprising:
(a) first and second trainee client computers each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a user interface for enabling said first trainee to initiate communications controlling animation routines of said first trainee model, the second trainee client computer having a user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model;
(b) an administrator client computer, the administrator client computer also having a display and a rendering module for rendering three dimensional models, the administrator client computer having distributed therein said first trainee model, said second trainee model and said work subject model, the rendering module of said administrator client computer rendering said common scene and having a user interface;
(c) wherein said administrator client computer is configured so that by using a user interface of said administrator client computer during a simulation run mode, an administrator can cause said administrator client computer to render on its respective display at said certain time said first perspective first person view so that there is displayed on said display of said administrator client computer at said certain time a same perspective view being displayed on said display of said first trainee client computer.

34. The computer based system of claim 33, wherein said computer based system is configured so that said computer based system maintains a coordinate position and camera position of controlled digital characters at a time at which a communication by said administrator is initiated, and utilizes said coordinate position and said camera position in rendering a scene at said first and second client computers after said communication by said administrator is initiated.

35. The computer based system of claim 33, wherein said rendering module of said administrator client computer is further configured so that said administrator client computer can render at said certain time a perspective third person view of said common scene different from said first and second first person perspective views and including renderings of said work subject model, and of said first and second trainee models.

36. The computer based system of claim 33, wherein said administrator client computer is configured so that by using said user interface of said administrator client computer during a simulation run mode, an administrator can cause said administrator client computer to render on its respective display at said certain time said first perspective first person view and said second perspective first person view.

37. The computer based system of claim 33, wherein said computer based system is configured to record a simulation, and wherein said administrator client computer is configured so that by using said user interface of said administrator client computer during a simulation run mode, an administrator client computer can cause said computer based system to return to prior point of said simulation.

38. The computer based system of claim 33, wherein said computer based system is configured record a simulation, and wherein said administrator client computer is configured so that by using said user interface of said administrator client computer during a simulation run mode, an administrator client computer can cause said computer based system to return to prior point of said simulation, wherein said computer based system is configured so that said administrator client computer is equipped with an audio input device and said client computers are equipped with audio output devices, the computer based system being configured so that said administrator can input a voice message into said audio input device for output at said audio output devices.

39. The computer based system of claim 33, wherein said administrator client computer is configured so that by using said user interface of said administrator client computer during a simulation run mode, an administrator can cause said computer based system to enter an administrator character mode of operation, wherein during said administrator character mode of operation said rendering modules of said first and second trainee client computers render on their respective displays an administrator model corresponding to said administrator, and wherein further during said administrator character mode of operation an administrator can control animation routines of said administrator model.

40. The computer based system of claim 33, wherein said system is configured so that a trainee can initiate a communication cause a movement animation to be run by actuating a hotspot displayed on a trainee client computer.

41. The computer based system of claim 33, wherein said administrator client computer is configured so that by using said user interface of said administrator client computer during a simulation run mode, an administrator can cause said administrator client computer to render on its respective display at said certain time said second perspective first person view so that there is displayed on said display of said administrator client computer at said certain time a same perspective view being displayed on said display of said second trainee client computer.

42. The computer based system of claim 33, wherein said administrator client computer is configured so that by using said user interface of said administrator client computer during a simulation run mode, said administrator can cause said administrator client computer to render on its respective display at said certain time said first perspective first person view and said second perspective first person view so that there is displayed on said display of said administrator client computer at said certain time a same perspective view being displayed on said display of said first trainee client computer and on said display of said second trainee client computer.

43. The computer based system of claim 33, wherein said user interface of said administrator client computer is configured differently from said user interface of said first trainee client computer and said user interface of said second trainee client computer, and wherein said computer based system is configured so that at least one communication can be initiated by an administrator utilizing said user interface of said administrator client computer that is not among communications that can initiated by said first trainee utilizing said user interface of said first trainee client computer or by said second trainee utilizing said user interface of said second trainee client computer.

44. A computer based system for training first and second trainees in relation to a work subject, the computer based system comprising:
 (a) first and second trainee client computers each having a respective display and a rendering module for rendering three dimensional models, the computer based system including a first trainee model distributed into said second trainee client computer corresponding to said first trainee, a second trainee model distributed into said first trainee client computer corresponding to said second trainee, and a work subject model distributed into said first and second trainee client computers corresponding to said work subject, the computer based system being configured to run a plurality of animation routines for each of said first trainee model, said second trainee model, and said work subject model, the first trainee client computer having a first trainee user interface for enabling said first trainee to initiate communications controlling animation routines of said first trainee model, the second trainee client computer having a second trainee user interface for enabling said second trainee to initiate communications controlling animation routines of said second trainee model, wherein during a simulation run mode said rendering modules of said first and second trainee client computers render on said displays of said first and second trainee client computers at a certain time different perspective first and second first person views of a common scene, the first perspective first person view rendered on said display of said first trainee client computer including a rendering of said work subject model, the second perspective first person view rendered on said display of said second computer including a rendering of said work subject model;
 (b) an administrator client computer having a display and a rendering module for rendering three dimensional models, the administrator client computer having distributed therein said first trainee model, said second trainee model and said work subject model, the rendering module of said administrator client computer rendering said common scene and having an administrator user interface, wherein said administrator user interface is configured differently from said first trainee user interface and said second trainee user interface, and wherein said computer based system is configured so that at least one communication can be initiated by an administrator utilizing said administrator user interface that is not among communications that can initiated by said first trainee utilizing said first trainee user interface or by said second trainee utilizing said second trainee user interface;
 (c) wherein said computer based system is operative so that said rendering modules of said first and second trainee client computers render on their respective displays an administrator model corresponding to said administrator.

45. The computer based system of claim 44, wherein said computer based system is configured so that said computer based system maintains a coordinate position and camera position of controlled digital characters at a time at which said communication by said administrator is initiated, and utilizes said coordinate position and said camera position in rendering a scene at said first and second client computers after said communication by said administrator is initiated.

46. The computer based system of claim 44, wherein said rendering module of said administrator client computer is further configured so that said administrator client computer can render at said certain time a perspective third person view of said common scene different from said first and second first person perspective views and including renderings of said work subject model, and of said first and second trainee models.

47. The computer based system of claim 44, wherein said administrator client computer is configured so that by using a user interface of said administrator client computer during a simulation run mode, an administrator can cause said administrator client computer to render on its respective display at said certain time said first perspective first person view.

48. The computer based system of claim 44, wherein said computer based system is configured to record a simulation, and wherein said administrator client computer is configured so that by using said user interface of said administrator client computer during a simulation run mode, an administrator client computer can cause said computer based system to return to a prior point of said simulation.

49. The computer based system of claim 44, wherein said computer based system is configured record a simulation, and wherein said administrator client computer is configured so that by using said user interface of said administrator client computer during a simulation run mode, an administrator client computer can cause said computer based system to return to a prior point of said simulation, wherein said computer based system is configured so that said administrator client computer is equipped with an audio input device and said client computers are equipped with audio output device, the computer based system being configured so that said administrator can input a voice message into said audio input device for output at said audio output devices.

50. The computer based system of claim 44, wherein said administrator client computer is configured so that by using said user interface of said administrator client computer during a simulation run mode, an administrator can cause said computer based system to enter an administrator character mode of operation, wherein during said administrator character mode of operation said rendering modules of said first and second trainee client computers render on their respective displays said administrator model corresponding to said administrator, and wherein further during said administrator character mode of operation an administrator can control animation routines of said administrator model.

51. The computer based system of claim 44, wherein said system is configured so that a trainee can initiate a communication cause a movement animation to be run by actuating a hotspot displayed on a trainee client computer.

52. The computer based system of claim 44, wherein the computer based system is configured so that by using said administrator user interface an administrator can cause said computer based system to enter an administrator character mode of operation in which said rendering modules of said first and second trainee client computers render on their respective displays an administrator model corresponding to said administrator, wherein said computer based system is configured so that said first and second trainee client computers do not render on their respective displays an administrator model corresponding to said administrator unless said computer based system has entered said administrator character mode of operation.

53. The computer based system of claim 44, wherein said computer based system is operative so that during said simulation run mode said administrator can control an animation routine run for said administrator model to demonstrate a proper procedure performed in relation to the work subject.

54. The computer based system of claim 44, wherein said computer based system is operative so that said administrator can transmit live voice messages to said first trainee computer wherein said computer based system is further operative so that during said simulation run mode said administrator model is rendered in a manner to result in an appearance of a rendered administrator model talking when live voice messages are transmitted by said administrator.

* * * * *